(12) United States Patent
Qiu

(10) Patent No.: US 7,490,031 B1
(45) Date of Patent: Feb. 10, 2009

(54) MECHANIZATION OF MODELING, SIMULATION, AMPLIFICATION, AND INTELLIGENCE OF SOFTWARE

(76) Inventor: Gang Qiu, 20910 Pepper Tree La., Cupertino, CA (US) 95014

( * ) Notice: Subject to any disclaimer, the term of this patent is extended or adjusted under 35 U.S.C. 154(b) by 807 days.

(21) Appl. No.: 10/707,295

(22) Filed: Dec. 3, 2003

Related U.S. Application Data

(60) Provisional application No. 60/430,824, filed on Dec. 3, 2002.

(51) Int. Cl.
*G06F 9/45* (2006.01)
(52) U.S. Cl. ............................. 703/22; 703/26; 703/27
(58) Field of Classification Search ............... 703/22, 703/26, 27, 13; 715/709
See application file for complete search history.

(56) References Cited

U.S. PATENT DOCUMENTS

| 5,475,843 | A | | 12/1995 | Halviatti et al. |
| 5,485,600 | A | | 1/1996 | Joseph et al. |
| 5,745,738 | A | | 4/1998 | Ricard |
| 6,020,886 | A | * | 2/2000 | Jacober et al. ............ 715/709 |
| 7,360,159 | B2 | * | 4/2008 | Chailleux ................... 715/709 |
| 2002/0109736 | A1 | | 8/2002 | Chailleux |

OTHER PUBLICATIONS

Tsai et al., "A noninterference monitoring replay mechanism for real-time software testing and debugging", IEEE Transactions on Software Engineering, vol. 16, Issue 8, Aug. 1990, pp. 897-916.*

Mi et al., "A knowledge-based environment for modeling and simulating software engineering processes", IEEE Transactions on Knowledge and Data Engineering, vol. 2, Issue 3, Sep. 1990, pp. 283-289.*
W.Ross Ashby,"An Introduction to Cybernetics, Chapter 13, Regulating the Very Large System and Chapter 14, Amplifying Regulation", pp. 244-272, 1957, London Chapman & Hall Ltd.
D. C. Engelbart,"Augmenting Human Intellect: A Conceptual Framework, II. Conceptual Framework",http://sloan.stanford.edu/mousesite/EngelbartPapers/B5_F18_ConceptFrameworkPt2.h 1962.

(Continued)

*Primary Examiner*—Kamini S Shah
*Assistant Examiner*—Herng-Der Day

(57) ABSTRACT

The invention models software as a physical device with causality. It develops interaction between software and user in a software dynamic system that connects software or modeled software with a software controller. The software is modeled with its input/output behavior on a discrete sampling domain and is controlled by the controller in a modeling software dynamic system while its behavior is observed real-time to identify its model. The modeled software is controlled by the same controller in a simulation software dynamic system, which can be augmented programmatically. Augmentations integrated with the controller construct a software amplifier coupling the modeled software and user interactively and automatically. The modeled software represents domain knowledge simulated in the augmented system as software intelligence. A software-2 including the modeled software, the software controller, and augmentations is created. Software-2 integrated with real-time communication distributes over Internet with a Master-Machine-Learner loop as a new interactive media.

140 Claims, 57 Drawing Sheets

OTHER PUBLICATIONS

E. A. Lee and P. Varaiya, "Structure and Interpretation of Signals and Systems, Chapter 1, Sysgnals and Systems", pp. 1-43, Addison Wesley, 2003.

Philip Barnard, Jon May, David Duke, and David Duce, "Systems, Interactions, and Macrotheory", ACM Transactions on Computer-Human Interaction, vol. 7, No. 2, pp. 222-262, Jun. 2000.

Center for Hybrid and Embedded Software Systems, "Chess: Center for Hybrid and Embedded Software Systems", Apr. 2004, http://chess.eecs.berkeley.edu/.

Microsoft, "Microsoft TestBasic Reference, Screen Library Procedures", Printingout from Feb. 1994, Apr. 94 MSSDK CDs.

* cited by examiner

O(k) = D(k) + C(k)

D(k)     + C(k)     =     O(k)

550

```
Public class PlayButtonActuator extends ButtonActuatorModel
```
{

551

```
public PlayButtonActuator()
{
        super("Play");
}
```

552

```
void playBiped(int numberOfStates)
{
Rectangle r;                                      553

APIProbe ap=new APIProbe(this,numberOfStates);
        r=clickButton();
        ap.probe();
}
```
— 555

554

```
Rectangle clickButton()
{
        return super.command(MOUSECLICK);
}
```

Mechanization of indexation

Mechanization of extension

MECHANIZATION OF MODELING, SIMULATION, AMPLIFICATION, AND INTELLIGENCE OF SOFTWARE

CROSS REFERENCE TO RELATED APPLICATIONS

This application claims the benefit of provisional patent application Ser. No. 60/430,824, filed Dec. 3, 2002, entitled "Mechanization of the modeling, simulation, amplification and intelligence of the software" by inventor Gang Qiu.

COPYRIGHT STATEMENT

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF INVENTION

1. Technical Field

The invention relates to modeling and simulating software systematically. More particularly, the invention relates to a system and method for modeling, simulating and augmenting software, its user intelligence and their interaction based on software dynamic system representation techniques.

2. Description of Prior Art

The fundamental principle of software is to model and simulate the processes of human thinking, doing and living, including some that have not existed before. In the quest to understand the world around us, every professional rank turns increasingly to the software for modeling and simulation. Whether phenomena are natural or artificial, scientific or entertaining, physical or mental, they all can be modeled and simulated by software. Software is already being used to model and simulate the tiny forces binding molecules, the flights of aircrafts, the creative imagination of artists, the stability of machinery designs, and the behavior of complex systems. Instead of engaging in the actual, physical process to study the underlying phenomena, models are identified and created to substitute the real ones and conducted as a simulated process on computers without the constraint of cost and feasibility required to run a physical process. Software becomes a universally accepted representation of all kinds of domain knowledge. Software developers strive to develop better models for their professional fields and to improve efficiency of software operations, yet still must struggle to find a representation mechanism for the software itself.

The majority of software built and released belongs to the category of interactive software that requires user's intelligence to operate and control. Despite the advancement in user interface technologies, running the software interactively still poses a big challenge that demands the initiative, the selection, the interpretation, and the decision for the user to overcome. For example, a task running Microsoft® Excel to optimally allocate business resources involves the intimate knowledge of linear programming principles as well as the skill of molding that knowledge into the crowded Excel user interface (FIG. 1A). For a novice user 10, he may stumble at any stage 12 for the lack of understanding either the domain or the software operational knowledge. On the other hand, an expert user 20 commanding the same software and the task may attain his goals 22 skillfully (FIG. 1B).

In stark contrast to the software's origin from a rigid modeling and simulation of universal phenomena, software and its user intelligence and their interactions hardly are investigated systematically in a commensurable way. Instead, the software industry resorts to traditional means, such as books, manuals, videos, or multimedia slides and presentations, to represent the most complex and challenging intellectual process that happens right on its own turf.

The method widely used today to simulate a software operation is to capture or record and replay screenshots for a multimedia slide show.

To capture the screenshots, it requires the software to be controlled by a human user or other means to perform some tasks.

One that is based on typical manual capture and edit methods is well documented in a U.S. patent application Ser. No. 10/121,117. It requires a human to manually operate the software while the software display on screen is captured manually. After the screenshots are captured, it goes through a manual authoring process to put together a multimedia slide. The primitive nature decides that it can only author some basic graphic user interface operations such as selecting a menu, clicking a button, and so on in a short multimedia slide show, which may last only tens or hundreds of screenshots.

As software is running on computers, it is natural to develop an external program or script to automate the tasks. The next one that is based on the technique used extensively in software automatic test field and adapted later for capturing screenshots can be best represented by Microsoft® Test product and varieties in the art earliest since the 90 s. First, it controls the software being captured by applying some synthesized input commands through a script to drive the software into a specific state. Next, the software display is captured by taking a screen image. Finally, the captured screen image is compared with a baseline screen image that is known to be valid. It runs through the process to capture and compare multiple frames of screen images. The method adapted for capturing screenshots uses the basic steps above except forgoing the final step of comparison.

No matter what methods, manual or scripted are used to capture screenshots, the final product as produced in the art is a video for replaying. However, by treating the software as a visual effect without a mechanism only capable of churning out those colorful bits, the essential system information that is powered by the software, its controlling host and their interaction is lost permanently. Without any model or structure that enables the interaction between the software and its controlling host being modeled, identified and simulated, so much of the programmatic events and actions embodied in the underlying process all degenerate into unrelated dumb bits.

The techniques to control the software by an external program as a temporary means to control the software in order to capture screenshots are not new in the art. The external controlling program used during capture is discarded and no longer serves any further purpose in replay. Therefore, the control structure that facilitates the interactive dynamics between the software and the controlling program is destroyed irreparably.

Still, the ad-hoc nature of these screenshot methods prevents the methods from capturing and simulating highly complex interactive processes between the software and experts. For example, using a CAD software to design a machine, an animation software to master a 3D title, it involves not only a complex software but also complex strategies from experts to drive the software to attain goals. The strategies often involve tedious but precise human motor movements in the software work-space. The process may take tens of thousands or even more screenshots to record in a temporal dimension. It may also demand accuracy to perform functions within a range of a few pixels on screen in a spatial dimension.

The methods performed by current art concentrate on showing simple user interface features, procedures and functions of the software, but ignore the fact that the software and its controlling host is a holistic unity, and the use of the software to perform a task in an interactive process is just as important as the use of tools to control phenomena which is modeled and simulated by the software already.

Without a structure and a mechanism to represent the interactive process holistically, current art is unable to model and simulate the complex temporal and spatial relationships embodied in the process. The ways of designing a machine, a chip, a 3D title or using software to perform a job, are still mainly locked in the minds of those highly intelligent experts.

Thus, it is clear that the fundamental missing in current art is a framework that can systematically represent the software that runs on digital computers, its user who controls the software, and a dynamic process that interacts between them. If the software is in the business of modeling and simulating every conceivable natural and artificial phenomenon, then why can it not heed its own calling to model and simulate its very own cause—the software, its best user intelligence, and their interactions in software. Therefore a software representation system that can model and simulate the software systematically just as the software can model and simulate its underlying domain, is highly desirable.

There is a research field in system science called Hybrid Dynamic Systems that is studied extensively in academia. The central goal for research is to bridge the gap between computer science and systems science by developing the foundations of a modern systems science that is simultaneously computational and physical. One of the studied topics is modeling the software as a component in a hybrid system, in which physical processes are controlled by control algorithms that are implemented in the software. Unfortunately, the hybrid systems only address the interaction between the software and conventional physical processes, not between the software and its human users.

Also, without the system framework to represent the software, a huge intellectual value that is built into the software is unutilized. More than trillions of dollars worth of software that has touched all possible humankind endeavors has been introduced over the last quarter of the century. Software contains content embodying the underlying domain knowledge that is programmed and distributed in the binary formats of EXE and DLL files. Unlike traditional artificial intelligence in which people refer to knowledge in the forms of documents, e-mails, databases, and conversations with a human expert that have static textual expressions, the knowledge embodied in software is binary as well as tacit, intangible, dynamic, and of an interactive computational process, which is impossible to be represented by current art.

OBJECTS OF INVENTION

As appreciated, a systematic framework to represent the software, its best user intelligence and their interaction in software is desirable. In other words, to invent a new software representation system, in which the software can be modeled and simulated as a physical device with causality, its best user intelligence can be modeled as a software controller and their interaction can be modeled and simulated as a software dynamic process, is highly desirable.

Therefore, it is an object of the present invention to model and identify a model of the software precisely and accurately under control of the software controller in a software modeling process and simulate the identified model of software under control of the same software controller in a software simulation process as a new software.

It is another object of the present invention to augment the software simulation process with additional computation power so that the augmented system is able to
   (a) engage a human interaction into the software simulation process to imitate the best expert intelligence modeled in the software controller;
   (b) provide index and search capabilities to run the software simulation process selectively;
   (c) extend the software simulation process programmatically to transform and enhance the simulated software experience;
   (d) construct a new software amplification system to magnify the modeled software and the user intelligence;
   (e) construct a new software intelligence system to represent the domain knowledge programmed in the software.

It is yet another object of the present invention to create a new class of software, software-2 that includes the model of the software, the software controller, and the software augmentations.

It is still another object of the present invention to integrate the software-2 with real-time communication and distribute the software-2 over the Internet that runs as a giant simulation machine with new Master-Machine-Human loop as a new interactive mechanism, a virtualized software-2 as a new software media.

It is one further object of the present invention to create a new education system based on the invented software media that models the software as its sole content and source of the intelligence and co-simulated in real-time over the Internet.

These and other objects and advantages that will later become more apparent to one skilled in the art upon further reading of the following description are achieved in the manner to be hereinafter described in greater detail.

SUMMARY OF INVENTION

Accordingly, the present invention models the interactive software S running on digital computers as a physical device with causality. It develops the process of interaction between the software and its human user in a plant-controller servomechanism similar to the processes that system science and engineering apply to physical processes. A software controller is developed to model user intelligence. A software dynamic system is invented to model and simulate the software, software controller and their interactions.

The software input and output are defined as the sampled processes over a discrete sampling domain K. The interaction between the software and the software controller is related by the input/output causal relationship and modeled as the software dynamics.

The software controller is a programmable agent A encapsulating the strategies to perform tasks in a software space. The agent is implemented in two classes of controllers; one is the Work-Flow controller and the other is the Work-Space controller.

The software S is connected with the agent A in a closed-loop fashion as a software dynamic system, in which the running software S is exerted by external commands that are computed by the agent A while its input/output behavior is controlled and observed in real-time in order to identify a model of the software, $\overline{S}$. The modeled $\overline{S}$ is a system construct that preserves the state transition mechanism and the control enabling structure of the software S when under control of the agent A.

The modeled software $\overline{S}$ is connected with the same agent A again in the same closed-loop fashion as a simulated software dynamic system, in which the modeled software $\overline{S}$ is exerted by the same commands computed by the agent A in order to simulate the interaction between the software and the agent without the real software S presence.

The software dynamics is modeled analytically and numerically. Based on the factorization of the output of the software S, the software dynamics is factored into two independent software dynamics, an algorithm dynamics and a cursor dynamics.

The cursor dynamics can be modeled analytically with the help of the agent A. A cursor function with a data structure order list L and cursor shape images is developed. The data structure order list L is identified along with cursor shape images in the software modeling process.

The algorithm dynamics can be modeled analytically as well as numerically. While the real software S is under the active control of the agent A through its primitive input terminals such as a pointing device, a keyboard or any external devices, it responds as internal programmed algorithms perform. State by state, the algorithm dynamics drives a designed trajectory in the software space under the control of the agent A. The dynamic responses such as the states and their transition relations are modeled and sampled.

The discrete sampling domain K is created dynamically from the execution flow of the agent A. It measures precisely the cause and effect of the interaction between the software S or the modeled software S and the agent A. The software states are sampled accordingly by the algorithm engine modeler that is controlled by two mutually exclusive sub-samplers. The two sub-samplers, the direct input/output sampler $\phi_a$, and the internal computation sampler $\phi_s$ are developed to devise the sampling strategies so that the causality of the software dynamic system is orderly enacted over the discrete sampling domain K.

In order to model the binary execution of the software S without any change, a software sensor is invented to mold unobservable internal computation activities into the modeled state updates of the algorithm dynamics. The software sensor is developed based on different scales of internal computation response time. An Event Probe (EP) is for the slow response based on an internal message processing and an API Probe (AP) is for the fast response based on an internal API calling. The software probes are planted programmatically into the modeled computation flow where each modeled state update triggers programmable actions including sampling at the right time.

As a part of an effort to model and preserve the control enabling structure of S, a software actuator technique is invented. The software actuators are a set of interacting models that provide structured interfaces between the controlled target and the controller. The software actuator provides a representation invariant running contexts to the agent A by hiding the differences between the systems that are powered by the real software S in the modeling process and by the modeled software $\overline{S}$ in the simulation process. In the modeling process, a software actuator powered by the real software S supplies an active running context to the agent A. While serving as a live context, its model is identified and saved. In the simulation process, the software actuator simulates the active running context based on the saved model so that the same agent can act upon it without the software S running.

The modeled software dynamic system can be re-sampled by introducing the causality-preserved transformations. Compressing and Stretching are two transformations that correct or enhance the modeled software dynamics behavior. Some lengthy or short computational activities occurring in the modeling process can be programmatically transformed in the simulation process while preserving its causality.

By connecting the software S with the agent A in the modeling process, it constructs a modeling machine $M_m$. The yield from running $M_m$ is the model of the cursor engine and the model of the algorithm engine. By combining the modeled cursor engine and the modeled algorithm engine in parallel, it sets up the modeled software $\overline{S}$. By connecting the modeled software $\overline{S}$ with the same agent A used in the modeling machine, it constructs a new software system, a simulation machine $M_s$ that has a life of its own, an autonomous dynamics independent of the software S. Such a simulation machine $M_s$ itself is a software much purer and much more readily malleable than the modeling machine $M_m$, and it can be further transformed and augmented using additional computation power while keeping the modeled software dynamics invariant and valid.

A human interaction is introduced into the simulation machine $M_s$ that runs autonomously otherwise, through an augmented inference engine H. A user can engage the simulated software dynamics and imitate the encapsulated expert strategies that are programmed in the agent A, interactively click-by-click, key-by-key and action-by-action. The inference engine H samples two inputs in real-time to control the execution of the simulation machine. One is the programmed agent action that serves as the reference; the other is the user interactive action. Both are matched by H within the simulated running context. The simulation machine $M_s$ advances to the next step until the logic in H is satisfied. H is independent of the simulated software model $\overline{S}$, the agent A, and the complexity of the interactions involved. It is implemented as a generic component and applied universally to any simulation machine $M_s$. The inference engine H can be activated or deactivated programmatically at any moment to allow a user to switch between the auto-mode simulation and the manual-mode interaction with the software dynamic system like an auto-pilot control system in an airplane, with guaranteed success toward the programmed goal that is achieved by the agent already.

The simulation machine Ms is a mathematical process. Its software space can be implemented in computer memory. A gated output-mapping function G can be added to partition the modeled software space into visible and invisible sub-spaces and states. Since every software state is sampled and associated dynamically with current sampling over the discrete domain K, the output-mapping function G can be controlled by supplying a numeric (sampling) or textual (text bound to sampling) index set. The simulation can be run visually and selectively based on searches and indexes.

The simulation machine Ms can be further augmented by extending the modeled software dynamic system with a new programmable process E to transform and enhance the software simulation experience. Between any pair of modeled states, $x_k$ and $x_{k+1}$ a sub-process can be created to extend the software dynamics. Instead of a one-step transition from the software state $x_k$ to $x_{k+1}$, the new sub-states and sub-transition functions including an Internet browsing can be added to simulate a new process with $x_k$ and $x_{k+1}$ as the initial and final states. The extension blends itself to the execution flow of the software dynamics seamlessly by evolving within the framework of the modeled software dynamics. Thus, the software space is extended.

Three augmentations H, G, and E are connected with the agent A to construct a new software device that couples the modeled software $\overline{S}$ and a human user interactively and automatically. The programmable software device functions as a software amplifier that can magnify the modeled software dynamics and user intelligence. With all the power that computers can deliver, the software amplifier drives the modeled software $\overline{S}$ as a signal or a process while engaging a user with limited mental power to interact directly like an advanced expert user without any failure. The invented software amplification creates a powerful Machine-Human system.

The invention makes the extraction of the software models in a highly structured way, and the discovery of the knowledge that is buried in bits and bytes of those binary executable files possible. The extracted models that represent the underlying domain knowledge encoded in the algorithm engine are modeled and organized in a dynamic, yet delivered in an interactive process. Within the software dynamic system setting, the extracted knowledge can be simulated and augmented while the agent works as the supervised tutor. The augmentations H, G, and E connected with the modeled software $\overline{S}$ create a new form of intelligence in software. The software intelligence that is acquired from those released professional software S can be simulated dynamically by users.

By treating the software as a physical device, the invention creates a new software-2 that models and simulates the software as its sole content and source of the intelligence. The software-2 is integrated with real-time communication. Since the core of the simulated software machine is the modeled software dynamic system that is controllable at run time, the simulation and interaction of the single augmented software machine can be extended into a Human-Machine-Human configuration through the Internet. With the support of the software dynamic system, a special-purpose Machine-Human loop called distinctly the Machine-Master loop is integrated virtually into all the other Machine-Human systems over the Internet. Through real-time communication that is built on the HTTP protocol, it combines virtually two simulated machines running synchronously over the Internet as one machine, in which the Master and a Learner user are connected in real-time to interact with each other over the same augmented simulation machine. The new loops created are the Master-Machine-Learner loops. There are unlimited Machine-Human loops that can join with one Machine-Master loop virtually over the web. It creates a distributed Master-Machine-Learners system. Every human user engages not just the simulation machine locally but also a human Master and other Learners over the wire remotely. The new interaction introduced includes real-time communication among the Master and Learner users conducted within the context of the simulated machine. The invented Master-Machine-Learner loop injects a Master intuition with skill into the programmed machine execution with precision and repeatability. The virtualized software-2 becomes a software media.

The best setting for teaching and learning for an individual or a group can be built around the software media that contains knowledge mined from the software. Instead of writing a book on "paper", an author models the "book" with his understanding in the subject to a software space that is supported by the professional software S. By programming an agent A to drive the software S in optimal trajectories over the software canvas, a software dynamic system is created. With the augmentations invented, the modeled knowledge is transformed into the software intelligence. The natural classroom to lecture is to co-simulate the software media corroboratively in real-time over the Internet.

BRIEF DESCRIPTION OF DRAWINGS

FIG. 4H Cont. is the modeling and sampling logic for the biped animation based on the planted software API Probes.

FIG. 5D is the implementation of the Play button Actuator in Java.

DETAILED DESCRIPTION

Glossary of Terms

Followings are technical terms defined outside of computational science but used by the present invention as system science is applied.

Automation: control of processes by machines with human intervention reduced to a minimum, for example, the automatic pilot of an airplane, a computer-controlled pharmaceutical plant.

Causality: a process that links two or more states of affairs so that one brings about or produces the other.

Control: choosing the inputs to a system so as to make the state or outputs change in some desired way.

Controller: a device implementing the function of control.

Cybernetics: the science of communication and control in animal and machine, coined from the Greek word meaning steersman by Norbert Wiener, a mathematician, engineer.

Dynamics: a pattern or process that defines the change with time.

Input: an event external to a system which modifies the system in any manner.

Model: an object or process that simplifies and shares crucial properties of an original, and is easier to manipulate or understand.

Output: any observable state produced by a system.

Plant: a physical device or process whose behavior is guided by a control signal, for example, an airplane, a furnace, and now software as extended by the present invention.

Plant-Controller: a system configuration where the plant is controlled by a controller to act as specified, and a model of plant often used in the simulation of system, such as a flight simulator.

State: a variable characterizing a feature in a system such as position and velocity of a rocket.

State-Space: a collection of all possible features of a system.

State-Space Model: describing how the input signal drives changes in state, and how the output signal is produced, giving a sequence of step-by-step transitions for the evolution of a system.

Simulation: the operation of models in order to obtain a sequence of outcomes that could occur in a real world system.

System: a set or arrangement of entities that is related or connected that forms an organic whole.

Overview

Figure 1A:
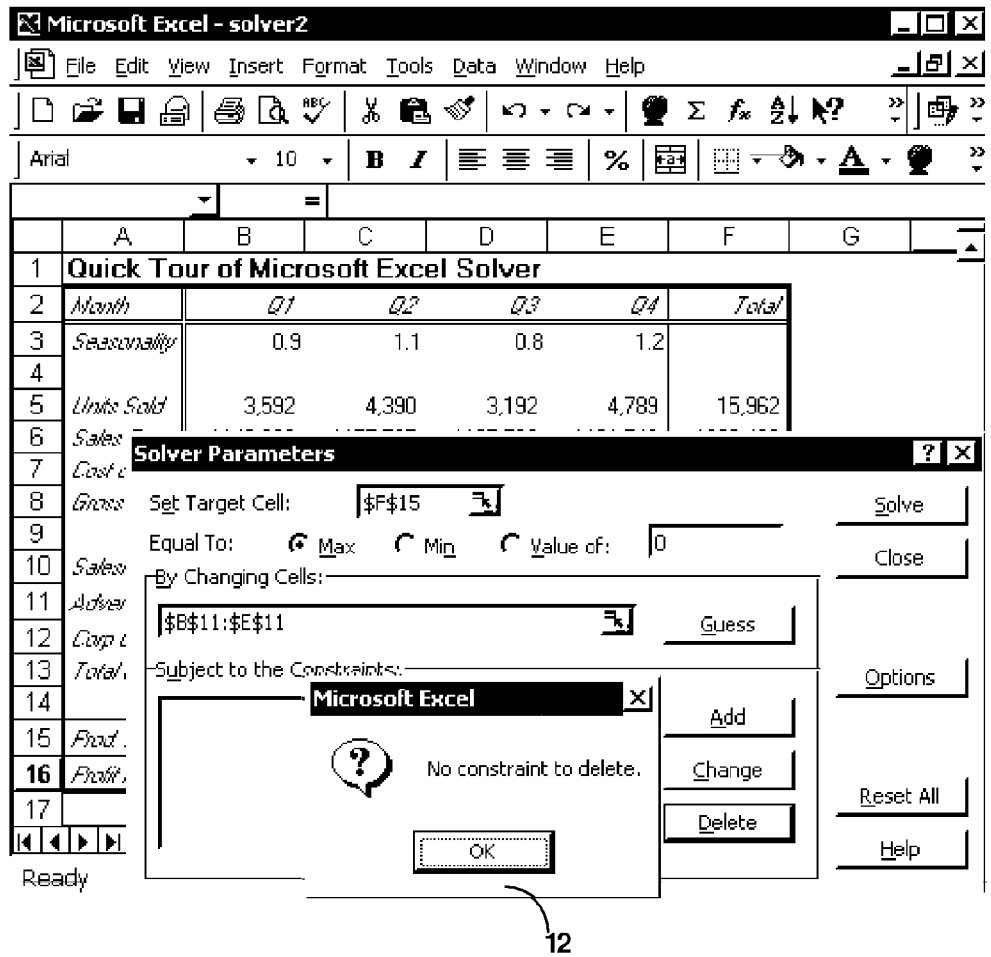
FIG. 1A is a user facing an impasse while the software is waiting for his input, a failed software interaction.
Figure 1A:
Figure 1B:
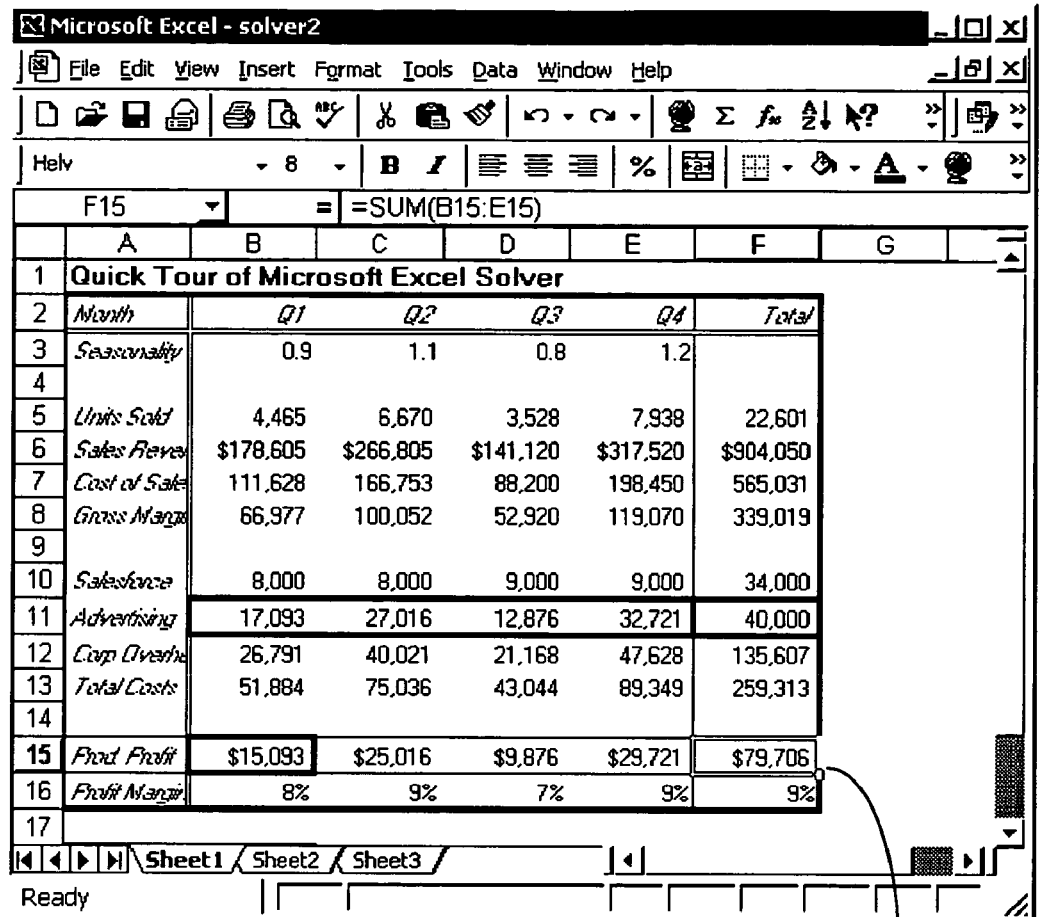
FIG. 1B is an experienced user accomplishing his intended task.
Figure 1B:
Figure 1C:
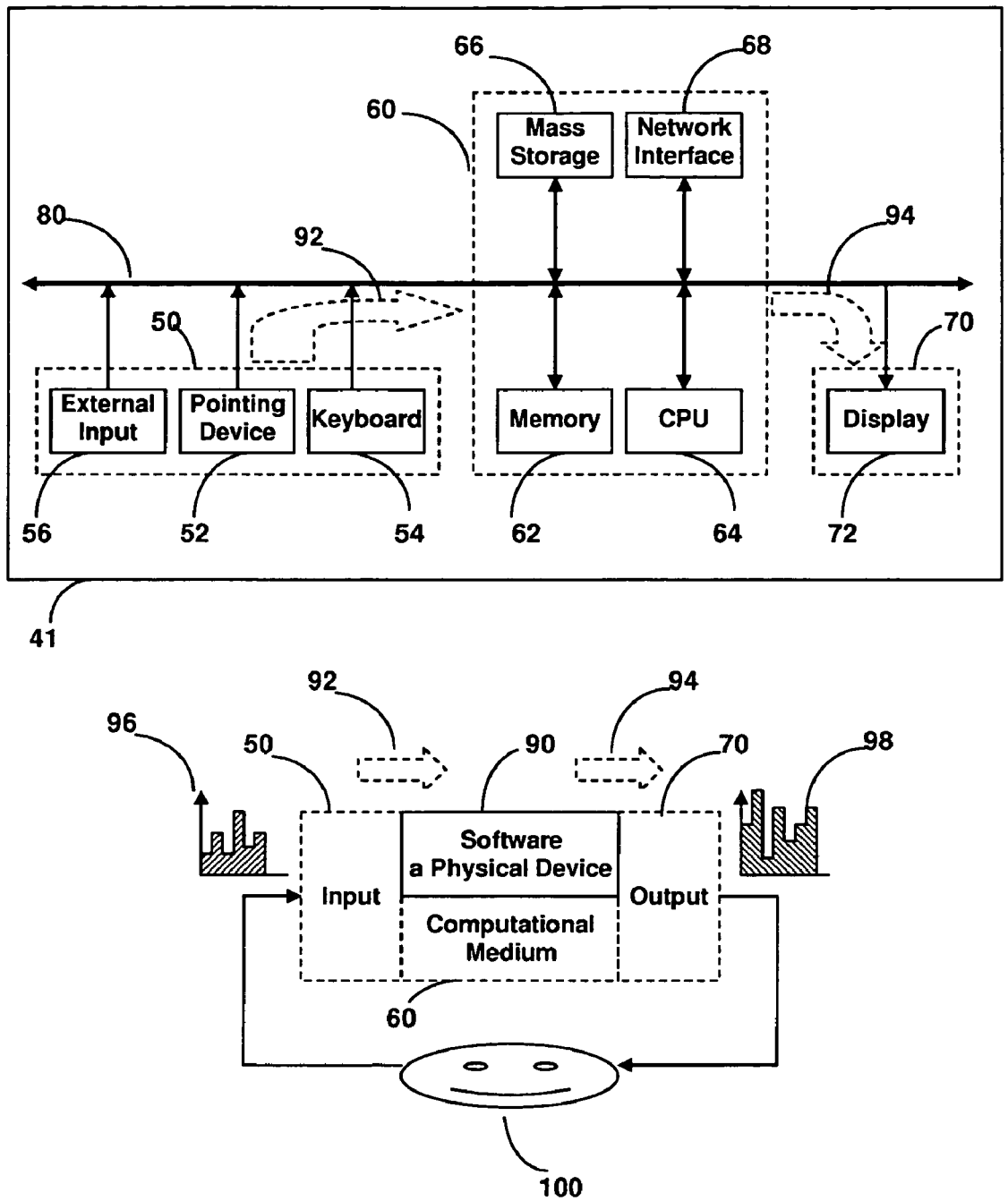
FIG. 1C is block diagrams of a digital computer and an abstracted computational system in which the present invention may be embodied

Referring to FIG. 1C, an exemplary system that may be used to implement an embodiment of the present invention includes a conventional personal computer 41, which includes a Central Processing Unit (CPU) 64, a memory 62, a Mass Storage 66 (e.g., hard disk, CD and DVD drive), a network interface 68 that may communicate with other computers through the network. Since the Internet is used ubiquitously for networked environment, the term Internet is used indistinguishably to represent any networked environment that is based on TCP/IP protocols (e.g., intranet, the Internet, or the like). The computer may include other peripheral devices (not shown), such as speakers or printers and so on. For better understanding of the invention, aforementioned components are conceptually grouped as the Computational Medium 60 of the computational system.

A user may enter commands and information into the personal computer 41 through a pointing device 52 (e.g., mouse, trackball, pen device, or the like), a keyboard 54, and an external input (e.g., speech-to-command input interface, joystick, game pad, or the like) 56. They are grouped as an Input 50 of the computational system.

After the internal computational processing, the output result is sent to a display 72 that is grouped as an Output 70 of the computational system.

As illustrated, the various components of the computer 41 communicate through a system bus 80 or similar architecture.

In one preferable embodiment of the present invention, the software 90 utilizes at least one CPU and computer readable storage medium that are the Computational Medium 60 to transform the input 50 to the output 70. The transformation by the software can be conceptually represented as transferring and processing the input signal 96 from the Input 50 through the input flow 92, and feeding the output signal 98 through the output flow 94 to the Output 70.

The system is closed by a human user who will be modeled later. The Input 50 accepts the input from the human user 100 who takes the controlling action based on the feedback from the Output 70 to develop his next strategy until a job complete.

It is well known that to know is to create the model of a certain system that is then manipulated in accordance with certain rules. It is also well known that to model is to develop structures that are used to interpret and represent the system. The more structures that can be developed for the system, the finer the control and representation we can have of the system.

Figure 2A:
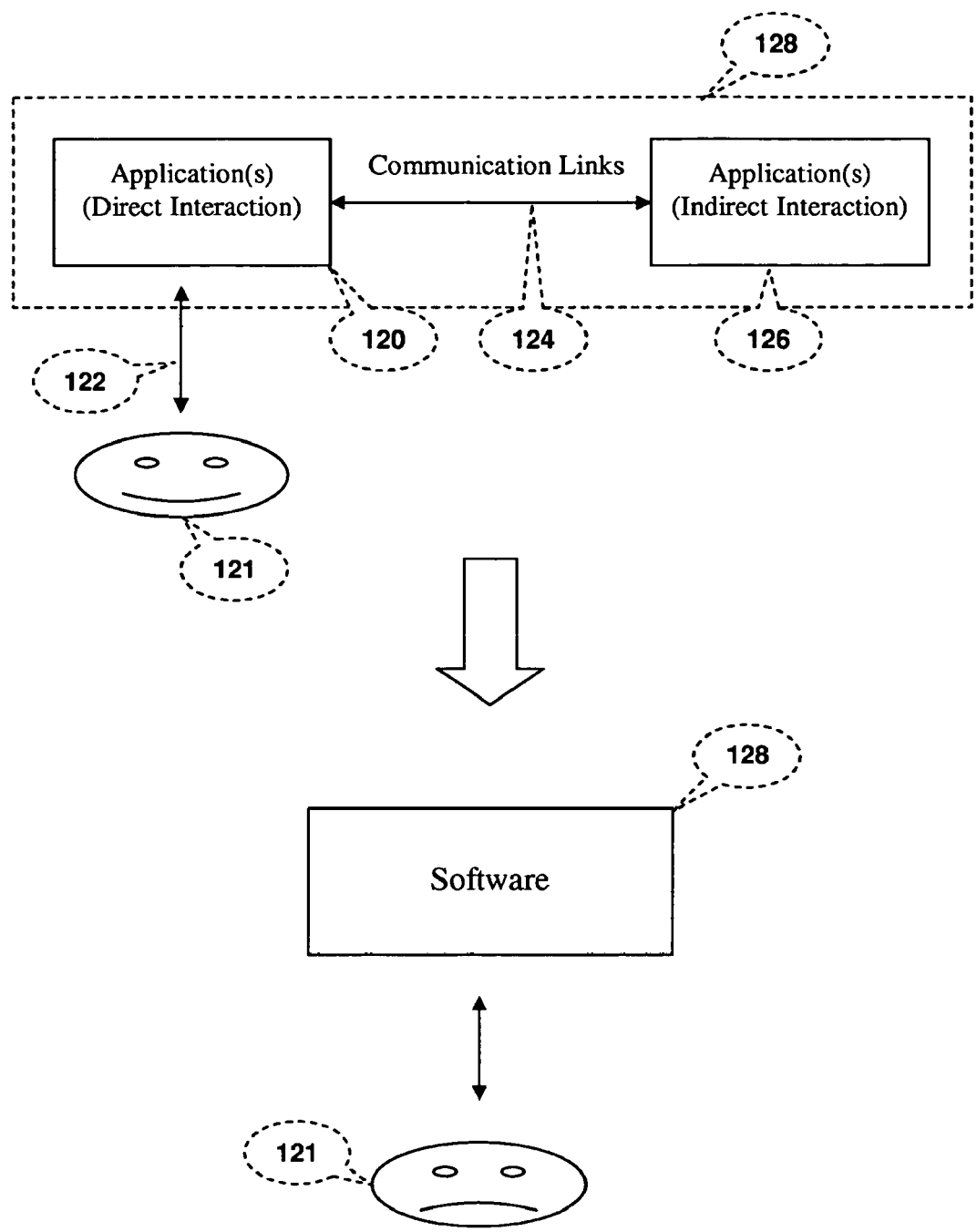
FIG. 2A is the classification of the interactive software that is to be addressed in the invention.

The software that the currently-preferred embodiment of the present invention intends to model and represent is any built and released software in daily use that involves directly and indirectly at least one human user 121 in FIG. 2A. 120 can be one or more application(s) directly interacting with the human user 121 through its interactive interfaces 122 such as a Graphical User Interface (GUI), a speech-to-command interface, etc. Through communication links 124 such as the Internet connections, the applications communicate to back-end applications 126 such as web servers, database servers and so on, to get some computation job done. Applications run on at least one of a plurality of digital computers. If we consider the communication link 124 as a computing pipe between front end applications 120 and back end applications 126, then 120, 124 and 126 can be grouped together as one, the software 128 that is to be addressed by the invention. On that term, this invention does not address the issue of building better software as mainstream software businesses do. Instead, it is about modeling and simulating released software 128, i.e. boxed software products in public circulation with their back end computing. Within the invention, the software is modeled as a system entity or a physical device much like an automobile or an airplane that is being modeled by the underlying software.

For any interactive software, we know that the other end of the interaction, the user, plays an essential role for the success of the software. Trying to overcome the cognitive barrier between the software and its users, there is an entire research and development field called Human Computer Interaction (HCI) that is dedicated to it. In that sense, this invention does not address the issue of developing a better user interface as HCI does. Instead, it is about representing and simulating the best user's performance within the constraints of the built user interface that may or may not be well designed by its original developer. It is about modeling and simulating the interaction between the best of the software and the best of the user mind in a "resonated" loop that ultimately amplifies the underlying intellectual value of each component and their combination, which yields a software system.

Figure 2B:
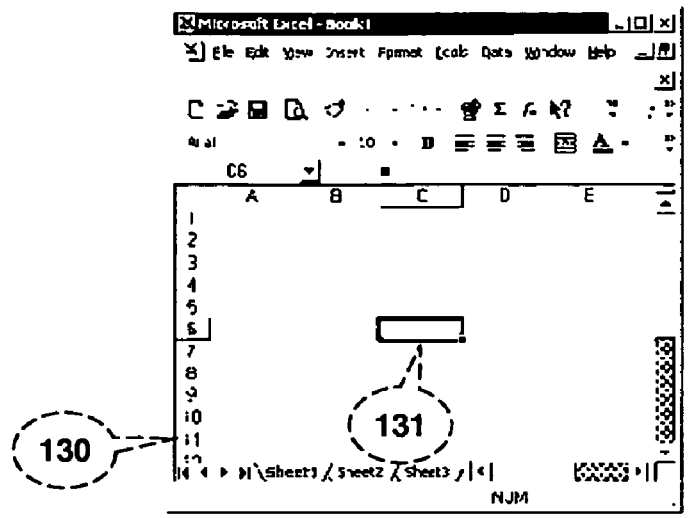
FIG. 2B is the software space description for the human-software interaction.
Figure 2B:
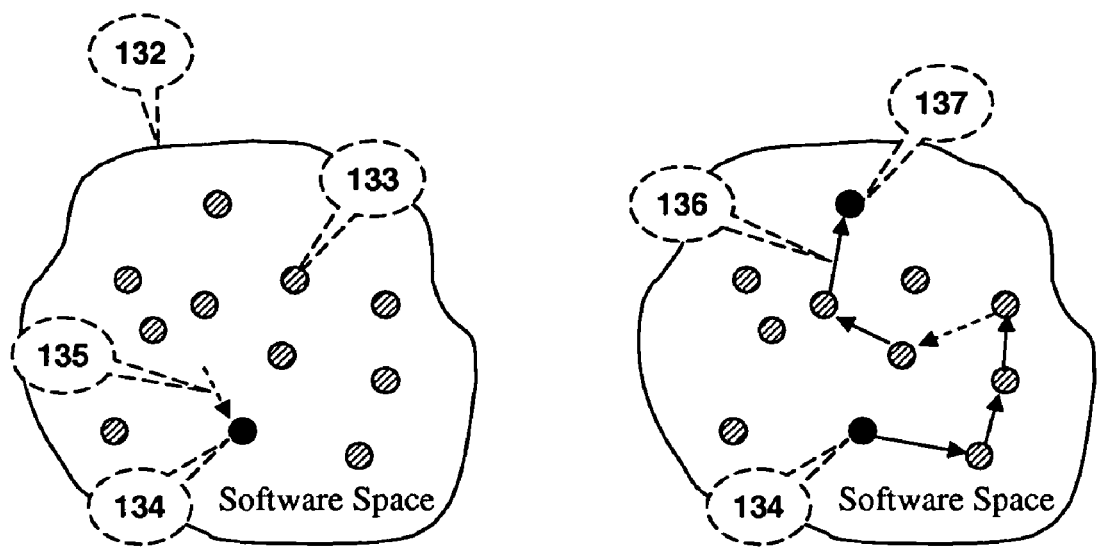

As we buy the software, download it, install it on a computer, and then fire it up, software 130 alone, is lifeless as in FIG. 2B. It is idling at 131 and waiting for the input from outside. From a system viewpoint, if we model the built software spanning a space 132 that is made of built-in features like 133, then software 130 is nothing more than a trivial machine attracting at a fixed-point state 134 since it lacks the most dynamic action with an intelligent force to propel the software state; instead, with an idle action 135 looping infinitely. We know that when the software is in the hands of an intelligent expert user who can drive it optimally from 134 to attain the goals 137 by a sequence of actions 136 just as a rocket can be controlled to follow an optimal trajectory to reach the target, something wonderful is happening. The best setting to represent the software and its interaction with the outside world is to "fly the software" by "wiring" it into a system, where the software and its counterpart—the best user intelligence are modeled as physical entities and connected together as a system.

Figure 2C:
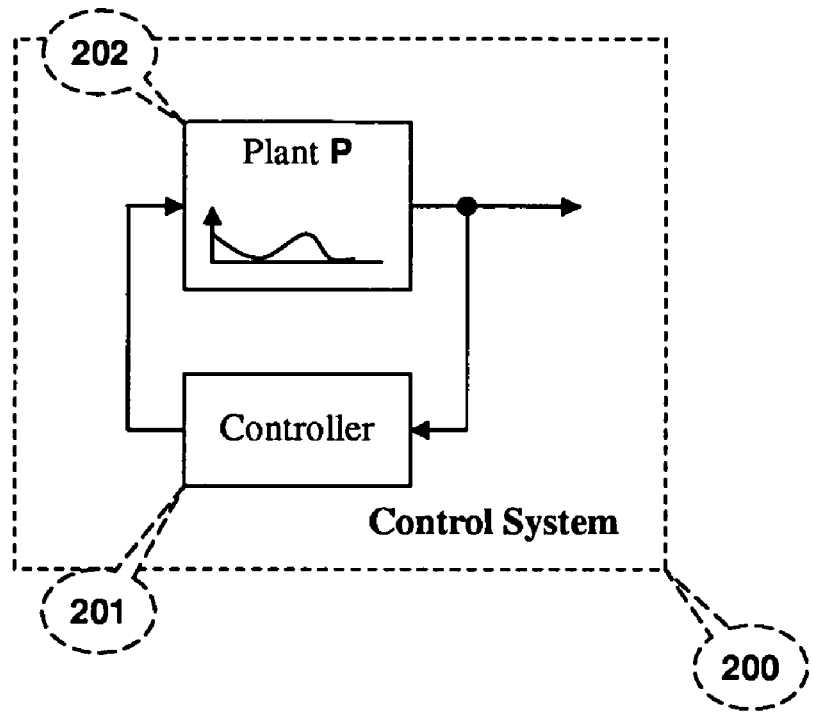
FIG. 2C is the plant-controller in system science vs. the software-agent controller in software system.
Figure 2C:
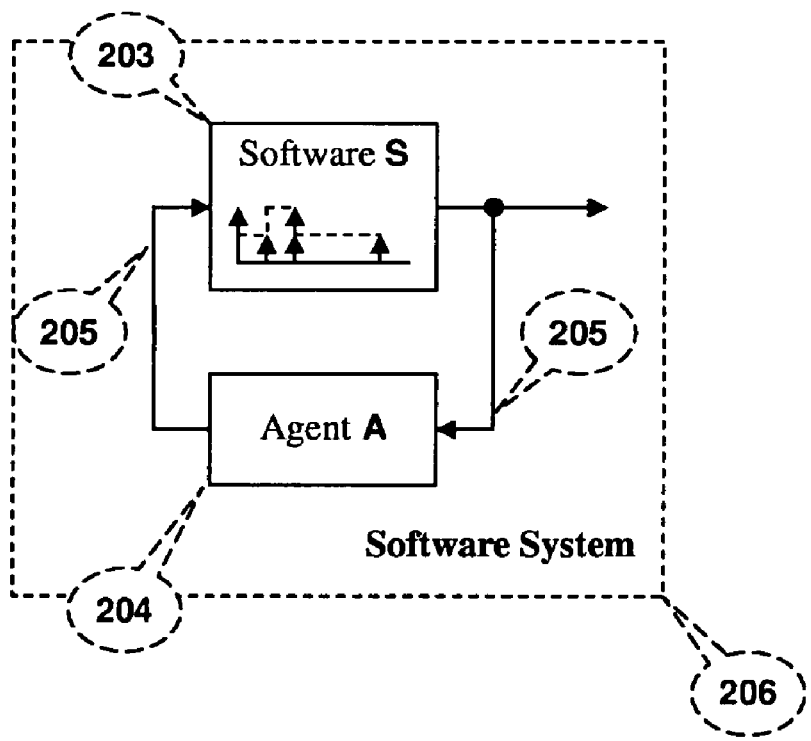

In system science, as in FIG. 2C, there is a plant-controller configuration 200 where engineers design an optimal controller 201 to control a targeted plant 202, which can be a furnace, an airplane, or a rocket. With this invention, the definition of the plant-controller now extends to the software and its user intelligence. In other words, the released software is modeled as a controlled target S 203 and a human intelligence behind the best user mind a software controller that is a controlling agent A 204. The controlled software S and the controlling agent A are connected together 205 in a closed-loop that constitutes a software system 206.

Software Dynamic System and Model

Since the software target S is the released software without access to its internal programming, the software system and its topology of the closed-loop are defined in terms of cybernetics rather than traditional computational science. Its input/output models need to be defined in a set that does not depend on the internal programming of the software.

Figure 2D:
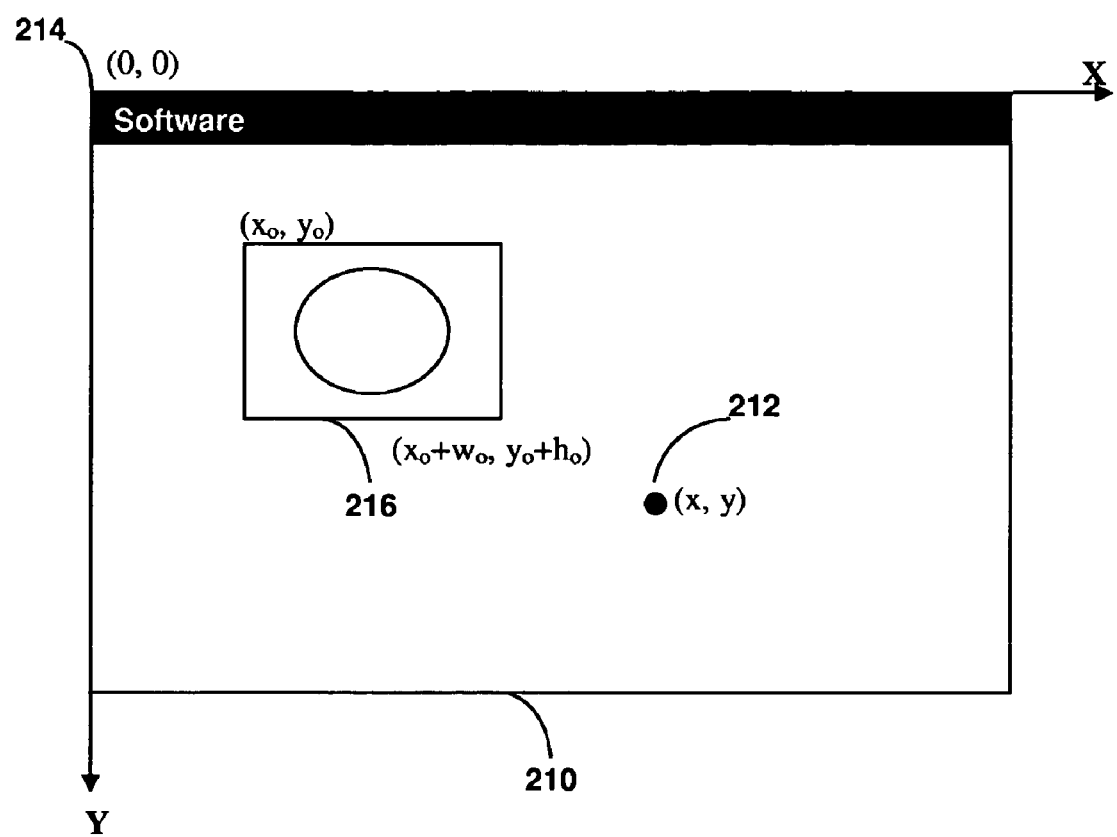
FIG. 2D is the 2-D coordinate system for the software input/output space representations.

The setting is a 2-D space (FIG. 2D), a display screen region $r_s$ 210 with (x,y) 212 as its coordinate and 214 as the reference point (0,0). The region $r_s$ serves as an input/output space representation, where the input applied to the software and the output response from the software are defined. Any interesting sub-region 216 $r_o \subseteq r_s$ can be uniquely modeled by a 4-paratmers rectangle.

Figure 2E:
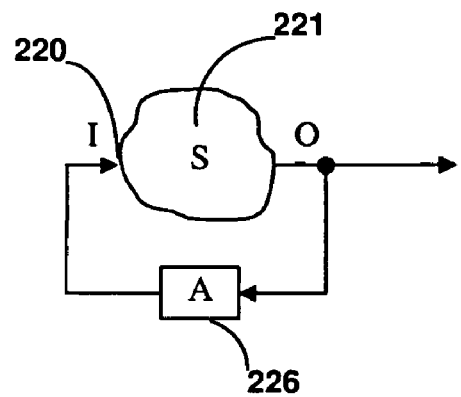
FIG. 2E is a software input representation.
Figure 2E:
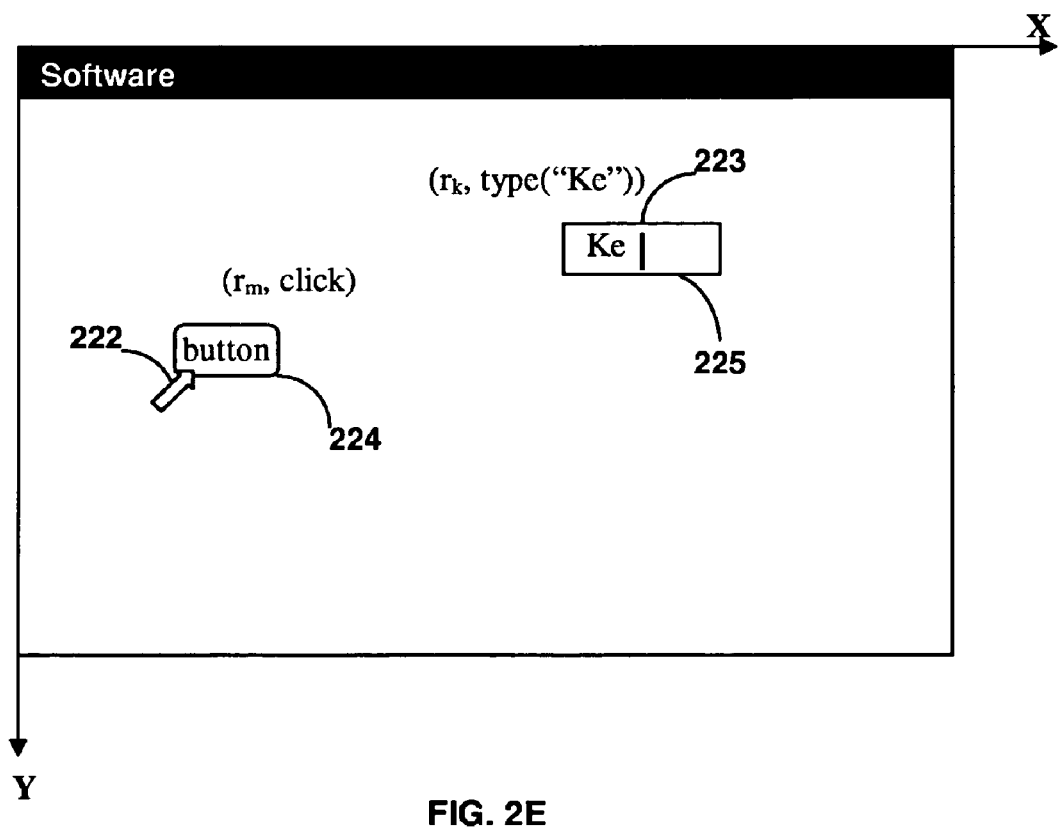

In referring to FIG. 2E, the applied commands I 220 to the input terminals of the software S 221 are modeled as primitive motor actions such as a mouse moving/clicking 222, a key pressing 223, and any other physical actions external to the software, $$I(r) = \{\text{Mouse Input, Key Input, External Input}\} \quad (1)$$

Where, r is a region such as a valid mouse-clicking region 224 or a key-input focus rectangle 225. While powered by the software S, the changing regions such as 224, 225 provide targets for the agent to apply the controlling actions. The target regions that structure the display screen and enable an external program—the agent A to interact with the software S are called the control enable structure.

To apply input commands as defined by (1) to software S, underlying Operating Systems usually provide some functions to synthesize the actions programmatically. It is well known in the art, for example, for Microsoft® Windows®, there are functions such as mouse_event and keybd_event to synthesize mouse motion, button clicks, and a keystroke.

With r defined, I(r) also creates running contexts. For example, a command to click the button 224 $I(r_m)$ creates a running context ($r_m$, click), and a command to type a string "Ke" into $r_k$ creates a running context ($r_k$, type ("Ke"), while the commands are delivered to control the software S 221. The command I as the input to the software S is computed programmatically by the agent A 226 in real-time and fed into the software S 221 through the input terminal 220. The actions such as the mouse input 222 and the key input 223 are external to and independent of the underlying software S 221.

Figure 2F:
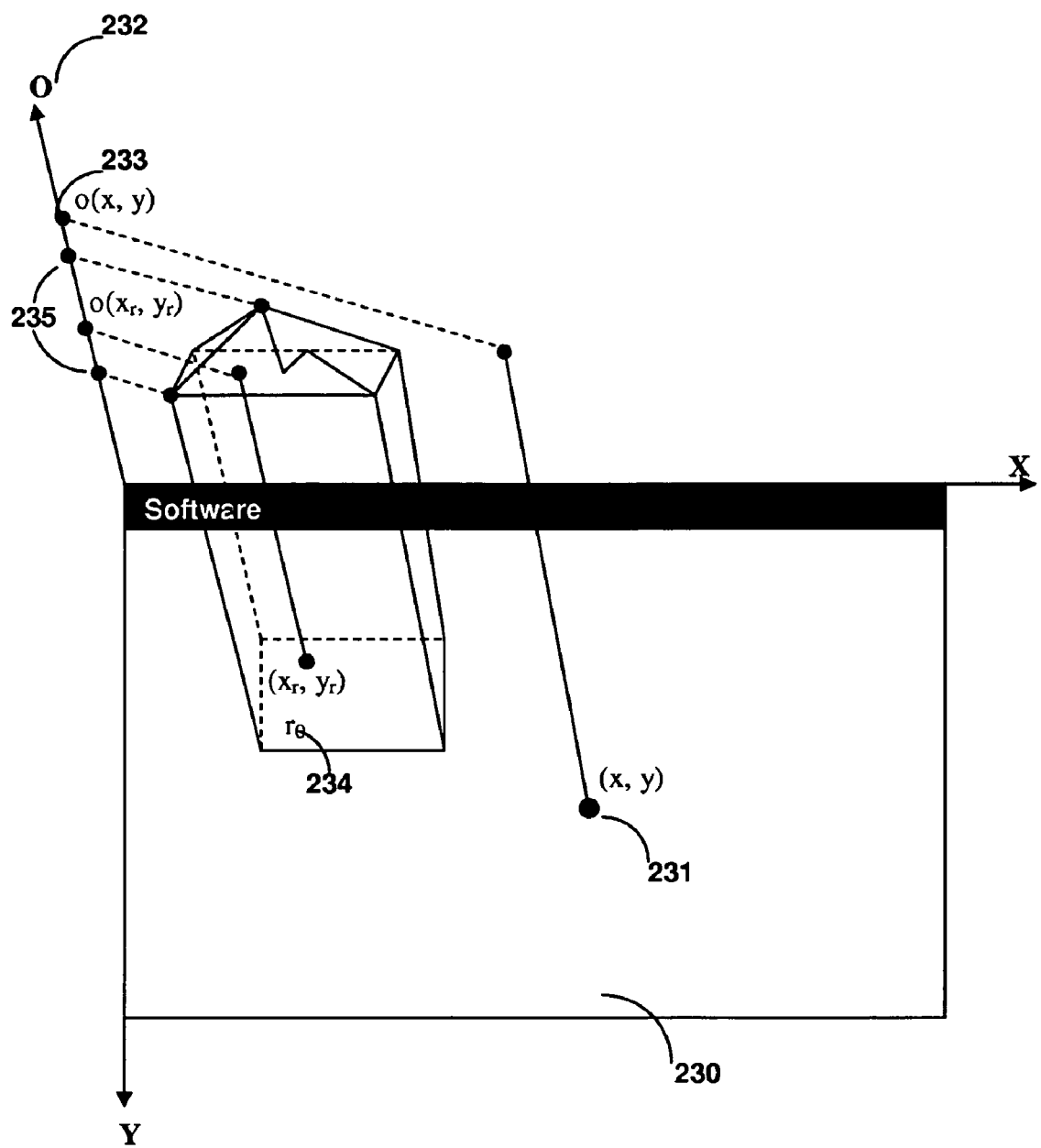
FIG. 2F is a software output representation.

The output response from the software is defined on a 2-dimensional $r_s$ 230 as in FIG. 2F, which samples the value at the point (x,y) 231 in 24-bits encoded color (Red, Green, Blue). The value can be projected in the Z direction on the O-axis 232. The o-value of the point (x,y) 231 is 233, defined as $$o(x,y) = (v_r, v_g, v_b); \text{ where } v_c \in [0,255] \text{ and } (x,y) \in r_s \quad (2)$$

For some rectangular region $r_o \subseteq r_s$ such as 234, the output values over the region 234 can be more conveniently written as, $$O(r_o) = \{o(x_r, y_r); (x_r, y_r) \in r_o \quad (3)$$

as a matrix of color values 235 distributed over $r_o$.

This invention models the software as any other physical device in a causal system so that its interaction with the agent can be represented in a dynamic process, in which the cause and effect, i.e. input and output relationship, can be quantitatively modeled together on a dynamic scale.

Figure 2G:
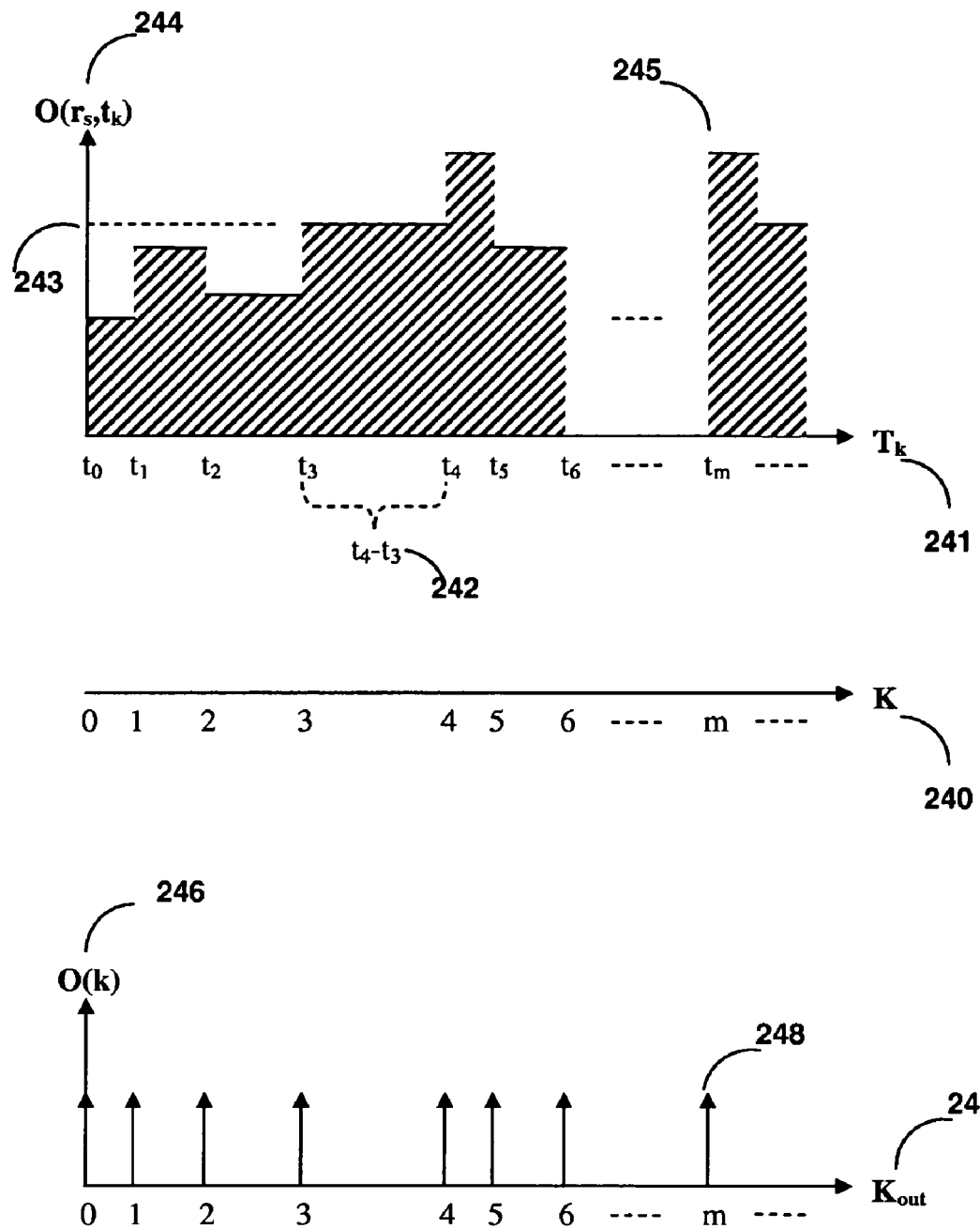
FIG. 2G is the discrete samplings of the software output process.

The input and output are in general dynamic processes. To model the process behavior, i.e. "states-in-time", a variable t to time its input command and output response is needed. Obviously, the software executing on a digital computer is a discrete system as is its input/output processes, which can be described as a sampled process defined on a finite integer sequence, $\{0, 1, \ldots k, \ldots; k \in K\}$, called the sampling domain K 240 as in FIG. 2G. We often use a sequence $\{k\}$ to index a sampling time sequence $\{t_k\}$ 241 over the sampling domain K. When a state s is written as s(k), it means the state s at $t_k$, i.e. $s(t_k)$. No matter how fast a computer is running the software, it always needs a finite time 242 $(t_4-t_3)>0$ to execute the next instruction and hold the current state constant. Therefore, the software is a sampling-hold system, where its value 243 is held constant until the next sampling is to be performed. The output $O(r_s,t_k)$ 244 is a discrete domain too, with 256×256×256 possible grades of values. From now on, we will write output O(k) 246 instead of $O(r_s,t_k)$ to emphasize the software's sampled dynamic behavior over the output sampling domain $K_{out}$ 247. 248 is the software sampled output O(m) at the time $t_m$.

Figure 2H:
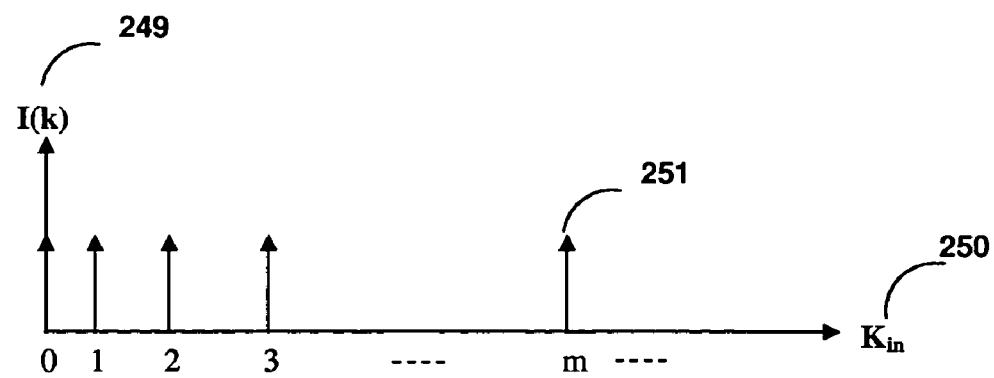
FIG. 2H is the discrete samplings of the software input process and the causal modeling of the discrete samplings of the software input/output processes.
Figure 2H:
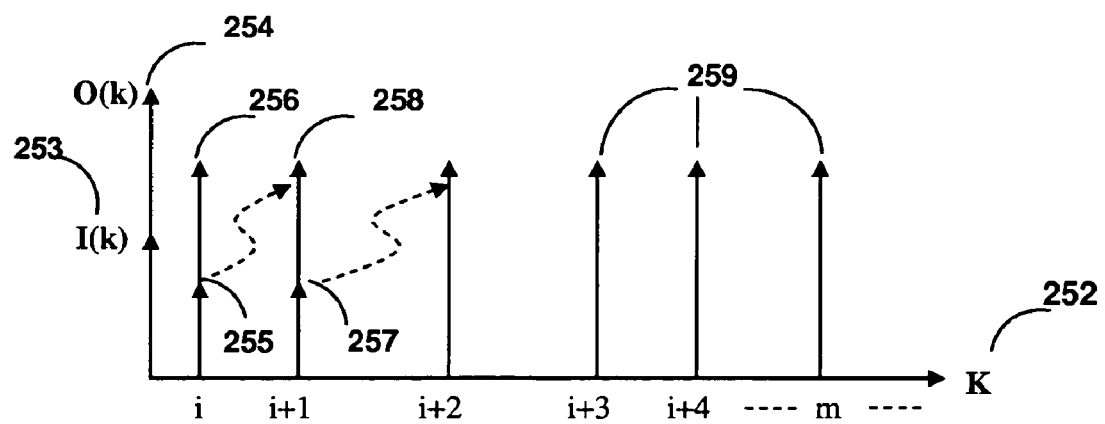

The input process is known to be a trajectory computed by the agent A in real-time. Since the agent and the software are connected in a closed-loop fashion, the agent has full access to the most current software output O(k) computationally, which makes it possible to blend the software output response with the agent's internal preprogrammed logic intelligently to generate a new targeted command. Similar to system science, the process can be called feedback. The output from the agent feeds into the input terminal of the software at k, which can be written as I(x,y;O(k),k), or simply I(k) to better qualify the time-related behavior. Referring to FIG. 2H, 249 is the sampled input I(k), representing generic input commands to the software as defined in equation (1). 250 is the sampled input domain $K_{in}$. I(m) 251 represents the sampled input command to the software at time $t_m$. I(k) also takes finite values in a discrete domain.

Now to better model the causality of the software system and its interaction between the agent and software, the sampled input and output process of the software can be combined into one sampling domain K 252. We use two different scales to represent the sampled input I(k) 253 and output O(k) 254. At the sampling time $t_i$, the sampled input I(i) 255 and output O(i) 256 are coalesced so that the input 255 that is computed by the agent incorporates the knowledge of the output 256. After I(i) 255 is applied to the software at $t_i$, the software will respond. While the input command I(i) is holding constant to let the software evolve to develop a new output, the agent will make a calculated move about the next sampling i+1. At the next sampling time $t_{i+1}$, the output O(i+1) is sampled and the new input command I(i+1) 257 is computed by incorporating the renewed information from the output 258. From the causality viewpoint, the output O(i+1) 258 is the direct effect caused by the input command I(i) 255. After the commands I(i), I(i+1), ... are delivered, the software will continue to evolve based on its internal programmed algorithm while the input I holds a constant value over that period. The output sequence 259, if sampled right, is still related to the chain of causality, which is caused by the input and effectuated by the software.

That is the software under the rules of the dynamics.

Figure 2I:
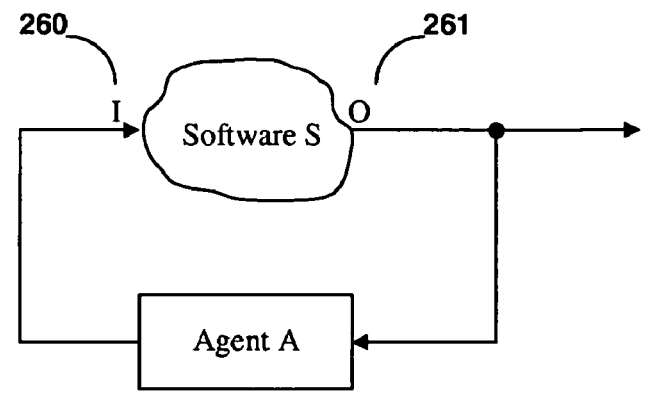
FIG. 2I is the software dynamic system representation with the real software in the loop.
Figure 2I:
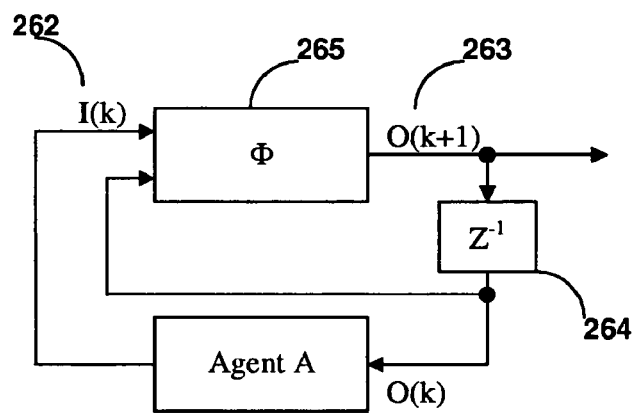
Figure 2I:
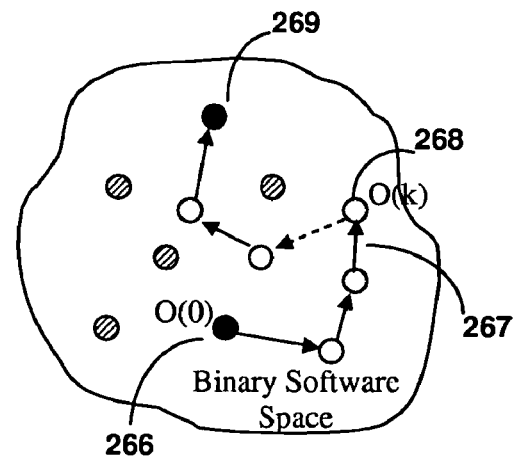

Software in the closed-loop system as in FIG. 2I has its premises such as user inputs I through an input terminal 260, and consequences such as outputs O through an output terminal 261. Just as nearly all the manifold motions are caused by a simple and material force, a button clicked by the agent at time k as I(k) will cause a response from the software, which may be a menu being pulled down, a dialog being popped up, or any content deemed appropriate from the internal computation, generated at k+1 as X(k+1). The causal behavior of the software-agent interaction can be modeled mathematically as a general dynamics in a state-space system setting, $$X(k+1)=\phi(X(k),I(k),k); \quad (4)$$

$$O(k)=V(X(k),k); \quad (5)$$

Where X is the software state that is artificially or physically associated with the underlying software. $\phi$ is a transition function, best characterizing the software's behavior as it reacts to the action exerted upon it (the input) by the agent and its current state, and V is an output mapping function that maps the internal state to an observable output. We call equation (4) software dynamics and equation (5) software output equation, which together serve the software dynamic system that quantifies the dynamic interaction between the software S and the agent A.

Since the software internal states are generally inaccessible, the only guaranteed observable result is a matrix of color values O over $r_o$, in which the interactive dynamics happens. If we let X=O, then (4), (5) can be reduced to, $$X(k+1)=\phi(X(k),I(k),k); \quad (6)$$

$$O(k)=X(k); \quad (7)$$

Or, $$O(k+1)=\phi(O(k),I(k),k); \quad (8)$$

A causal, input/output interaction between the software and the agent has been modeled in (8), which is called the software dynamics. Since the main mechanism implied in (8) is a dynamic state transition function $\phi$ implemented by the software S internally, sometimes the term software dynamics is used to represent the software S or its internal state transition mechanism $\phi$ interchangeably.

The software dynamics (8) provides a grip on the interaction between the software and the software controller that is the agent on a dynamic scale that was not available heretofore. No longer imprecise, verbal descriptions of on-going phenomena, the software dynamic system quantifies the interaction in a process model (8) with machine precision and repeatability like science and engineering fields.

As any discrete system, equation (8) can be wired as a discrete system. The sampled input command I(k) 262 is computed by the agent A that implements the optimal strategy to control the sampled software output 263 through the transition function $\phi$ 265 that serves as the engine of the software to drive the process forward. $Z^{-1}$ 264 serves as a one-step delay operator in a discrete system.

The software dynamics provides an automation mechanism to advance the software state computationally, where given an initial state O(0) 266 and a sequence of input commands $\{I(k)\}$ with the software implemented transition function $\phi$ 267, a sequence of the software states $\{O(k)\}$ 268 can be updated and observed. Systematically, the software becomes a controllable and observable machine. Any state (feature) or goal 269 implemented in the software can be anchored to a mathematical process through the dynamic framework and reached by designing an input sequence {I(k)} programmatically. Rather than motionless software waiting for indeterminate and random inputs, the software dynamics that creates an abstraction of the most generic ongoing process of interaction between the software S and the agent A now can fly-by-wire and maneuver itself autonomously.

The software dynamics creates a new mechanism to bind a new piece of software—an optimally designed agent A—to a released binary software S. It focuses on the input/output characteristic of human cognition from the motor commands to the visual response, which provides the most generic process representation of human-software interaction. It relieves the needs to access the internal Application Programming Interface (API) that is often inaccessible since the software addressed here is a packaged product in binary format. Also, the software dynamics is very generic, it has nothing to do with the complexity or sophistication of the software. It hides the implementation detail of the underlying software whose inner workings can be ignored as long as the external input/output constraints in (8) are maintained. How many lines of code behind the software, how advanced the algorithms implemented in the software, and how much resource required to run the software all are immaterial to (8). Any software involving the interaction explicitly or implicitly, ranging from a high-end CAD package to a simple word processing program, all can be fit into the representation of the software dynamics if every software state and its state transition are controllable and observable as this invention is applied.

In general, the transition function $\phi$ powered by the software S in (8) cannot be represented by any analytical formulas nor do we need to. The abstraction of $\phi$ is only to serve as a notion that there exists a mechanism that will generate a sequence of output responses $\{O(k+1), \ldots O(k+n)\}$ when an input $I(k)$ is applied to it at the moment $t_k$. For the study of software interaction and representation, the terminal behavior $\{I(k), \{O(k+1), \ldots O(k+n); n>=1\}; k \in K\}$ with the causality modeled is more important than what is implemented in the transition functions $\phi$. The ultimate purpose of the invention is to develop a new state transition function $\overline{\Phi}$ that, under the control of the same agent A, will simulate the software dynamics (8) with the identical interactive behavior or the dynamic course, $$O(k+1)=\overline{\Phi}(O(k),I(k),k); \quad (9)$$

Figure 2J:
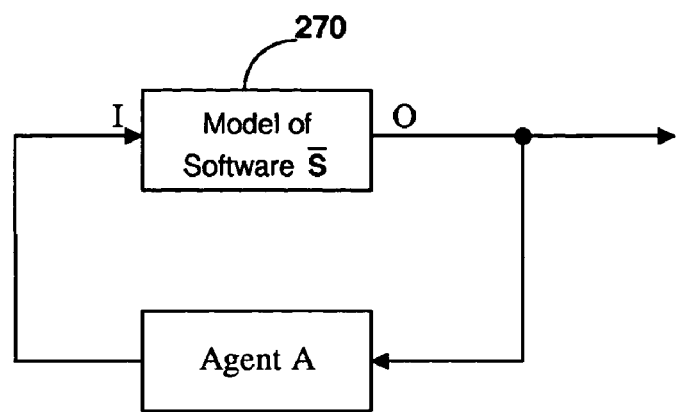
FIG. 2J is the simulated software dynamic system representation with the model of the software in the loop.
Figure 2J:
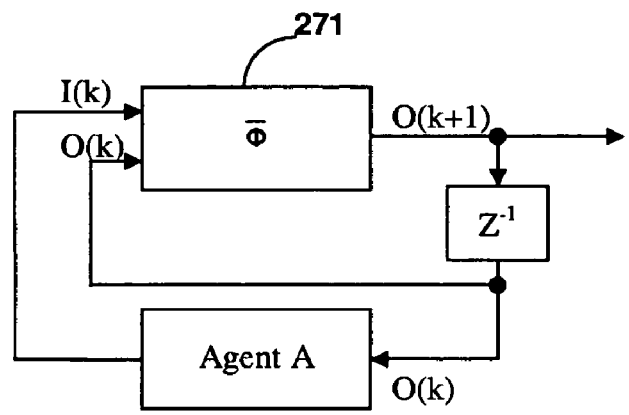
Figure 2J:
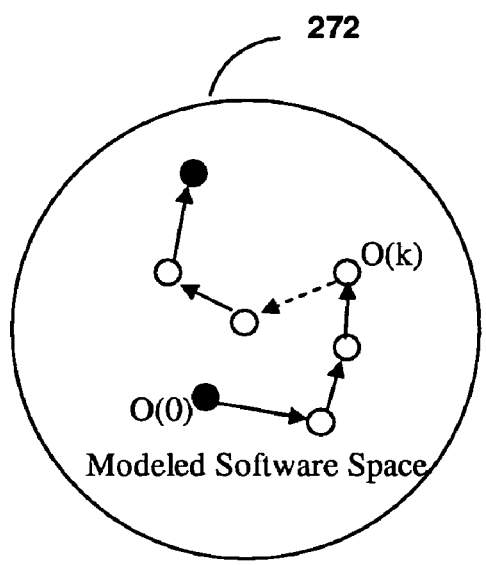

Put into cybernetic perspective, in FIG. 2J, we have a new transition function $\overline{\Phi}$ 271 that is powered by another software $\overline{S}$ 270 instead of the real software S. $\overline{S}$ is called the model of software S. The basic requirement for $\overline{S}$ to power (9) in order to simulate (8) is to preserve the state transition mechanism and the control enabling structure of the software S while under control of the agent A.

With the same topology as in FIG. 2I, under the same controlling agent A, the previous one is powered by the real software S, and the other by the model $\overline{S}$ 270, both (8) and (9) display identically the input/output interaction dynamically except the former travels in a binary software space that is not as programmable as the modeled software space, and the latter travels in the modeled software space 272 without the software S presence.

The challenge that is going to be addressed in the invention is how to develop such a model $\overline{\Phi}(4))$ or $\overline{S}(S)$ that a new software dynamic system (9) can be created to simulate (8) and from that simulated software dynamic system, further augmentations can be achieved.

Modeling of Controlling Agent

Software is made to model and simulate tools used by people. The invention constructs a new software in duality that can model and simulate people performing tasks using the software. That new software is the controlling agent A. The agent A plays the active controller role in the process of shaping the software dynamics.

Figure 2K:
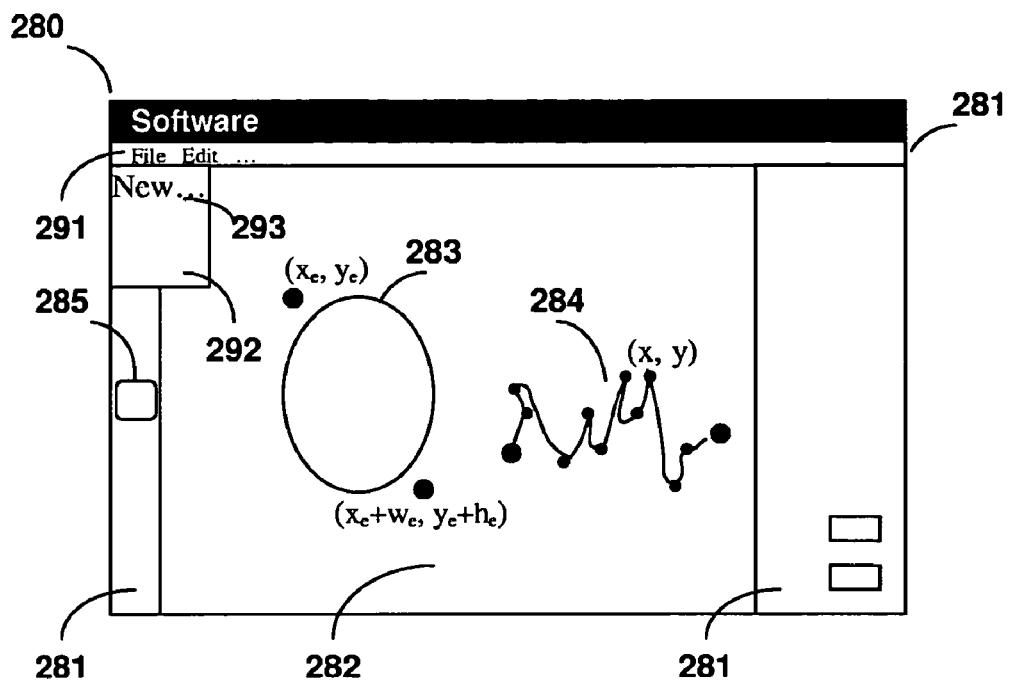
FIG. 2K is the interactive structure of the software that are matched with the agent controller.
Figure 2K:
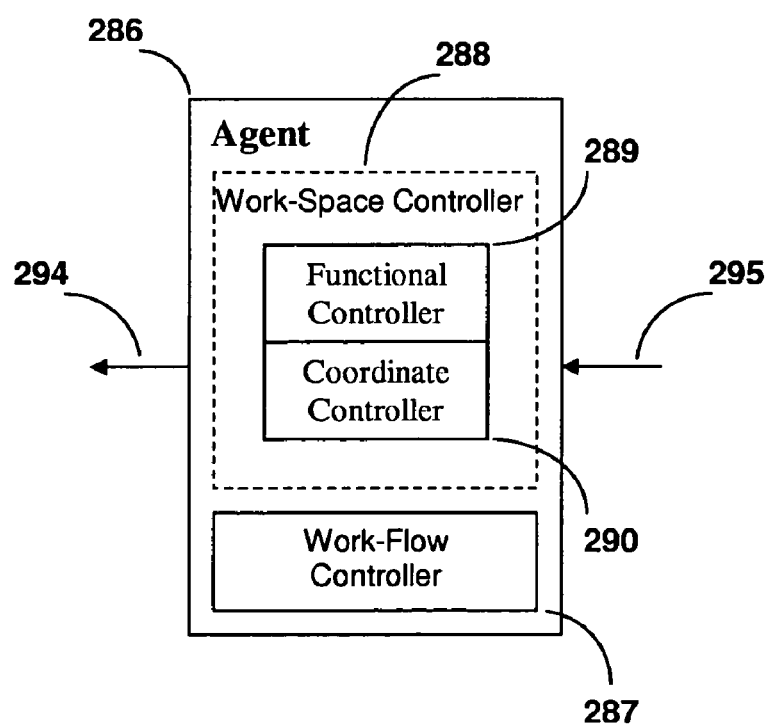

Normal interaction for a user with the software S goes through a graphical user interface 280, as it does for the agent A. In referring to FIG. 2K, each element in the display is so structured that it enables the agent A to apply the controlling action based on the provided target information. For example, the target rectangle that is powered by element 285 is needed for the agent A to calculate its next mouse commands in order to input a click command to the software S.

GUI elements in 280 give a snapshot of the control enabling structure. The structure that is powered by the real software S can be modeled, identified on-line while providing the target information to the agent A in the modeling process.

For the majority of the software, the control enabling structure of the software S, based on its functions can be classified in two parts, one for the work-flow 281 and the other for the work-space 282.

The software work-flow 281 includes actions and commands related to manipulating user interfaces such as toolbars, menu, dialog and so on. Its major functions are to invoke commands, input parameters, and select options.

The work-space 282 includes actions that perform the major design job. 282 is manipulated by primitive motor actions and commands such as mouse dragging and keys typing as the design functions performed. The work-space 282 is a 2-dimensional design space. For a drawing or CAD software, it is a drawing canvas, where curves 283 and 284 are laid out and shaped by mouse actions; for a spreadsheet software, it is a cell-based grid interface; for a word processor software, it is a character-based interface, and so on.

Based on the nature of the targeted software S, the agent A 286 is mirrored into two components too, implemented in 287 as a Work-Flow controller and 288 as a Work-Space controller.

As the work progresses, the agent controllers generate the commands that are translated into primitive mouse or key actions. The Work-Flow controller 287 deals with software operations such as selecting a menu, clicking a button, typing a value and so on. For example, by issuing a selectMenu ("File/New") command, a series of low level mouse events are synthesized to drive the cursor to position 291 and then to click the mouse button on it. After the menu 292 has been pulled down, the mouse moves to the position 293 and clicks on it. This concludes a work flow command to create a new design space 282.

After a blank design space 282 is created by the Work-Flow controller 287, it is the Work-Space controller's function to perform design functions on it. For some CAD and drawing software, the design activities in the work-space 282 can be further abstracted into two classes. One is 283 that is highly modelable by some mathematical functions such as the Bezier spline function. The other is 284 that has irregular form or shape that is impossible to model mathematically.

With the workspace set in the right context mode through work-Flow controller 287 manipulations, the design pattern 283 can be created by driving the mouse a few points whose coordinates (x,y) are calculated in real-time based on the modeled mathematical functions. Since there is no modelable function available to generate the points for the design pattern 284, the mouse needs to be driven to each point explicitly in (x,y) coordinate that is packed in an array or list as depicted in 284.

Based on two different design patterns in the work-space, the Work-Space controller 288 of the agent is implemented in two sub-controllers to carry out the design functions. One is 289 as the Functional controller that drives the mouse trajectory based on the supplied parameters and functions. The other is 290 as the Coordinate controller that drives the mouse based on a supplied list of coordinates (x,y). The Functional controller 289 has advantages over the Coordinate controller 290. First, it is compact and precise. Second, it is manipulable and scalable for functions like Bezier in run-time. By parameterizing the design pattern, 289 can drive the different-sized pattern to fit into different work-spaces for different software.

The computed output 294 is fed into the controlled target that is either the software S or the modeled software $\bar{S}$, through translations of a software actuator layer in real-time. The input fed to agent A is 295, which connects to the output of the controlled target as O(k). By sensing the state output o(x,y;k), the controllers can adapt its programmed actions. For example, suppose that the programmed action of the work-flow controller 287 is to drive down the button 285, but before computing the action, the work-flow controller 287 senses the state o(x,y;k) indicating that is already down. Based on that feedback information, it will skip the execution of the programmed action.

For CAD and drawing software, the abstracted design patterns are geometric representations that can be modeled as an invariant. The Work-Space controller can be shared by the software in the same category with the design patterns portable among them. For example, to draw the design pattern 283, the agent calls into a functional controller command drawEllipse($x_e, y_e, w_e, h_e$). By specifying the left, top position, and the width and height of the ellipse, the functional controller can calculate a path and drive the mouse along the path mechanically. The programming effort for the agent is minimal. The same design pattern and controller can be applied to any software that supports the drawing function, regardless if the software is a vector or bitmap based drawing package.

The functional controller can serve as a design repository, an automaton that mechanizes the designs programmatically with mathematical precision.

The control enabling structure is essential in enabling the agent A to apply the control action with the provided target information. For example, the target rectangles that include the target positions 291 and 293 are needed for the agent A to calculate its mouse commands. When the controlled target is powered by the software model $\bar{S}$, in order to enable the same agent A to apply the same control action, the control enabling structure needs to be simulated to reconstruct the target information, providing the target positions 291 and 293 based on the modeled target information, which are the rectangles that include the target positions 291 and 293.

The control enabling structure and its modeling, identification and simulation mechanism are implemented by the software actuators. The detail is disclosed in that section.

The agent A can be programmed to drive the controlled target as long as necessary without halting. Since the agent's driving actions are computerized, its motor performance is repeatable, and more precise than human users' who are unable to draw a line straight or a circle round freely by a hand.

The operations in the work-space embody the underlying professional domain knowledge that performs the major design by experts and major computation by the software. The strategies to perform tasks in a software space are implemented in the agent controllers. Any feature programmed by the software or state in the software space is reachable step-by-step by programming the agent controllers. After executing the agent with the software in the closed-loop, a blazing trail of the software states and their dynamic relationship is left behind, ready to be discovered and explored.

Modeling and Simulation of Software Dynamics

Figure 3A:
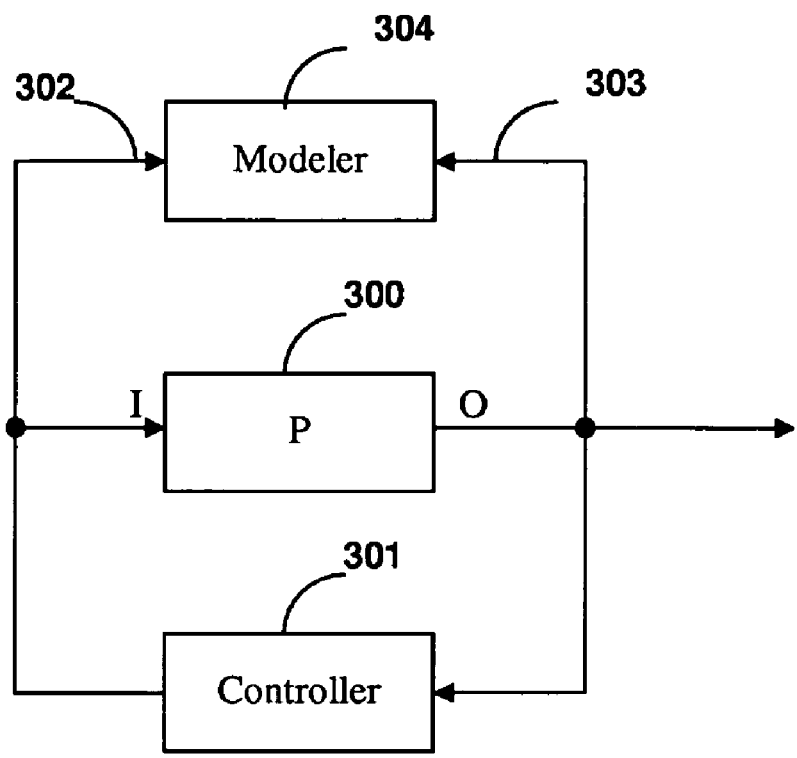
FIG. 3A is the system on-line identification and simulation used in system science and engineering.
Figure 3A:
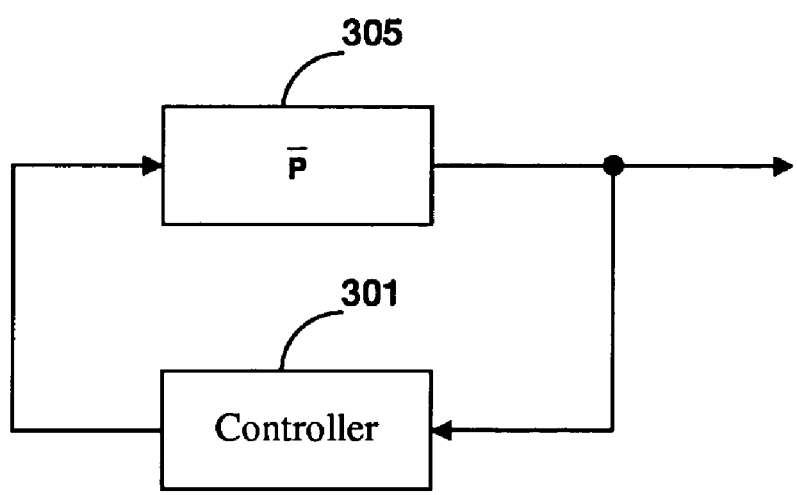

In science and engineering, in order to acquire the sufficient understanding of a system, it is very costly, often impossible to experiment on a physical plant. Therefore, system engineers resort to on-line system identification to develop the plant model instead. They set up an experimentation as in FIG. 3A where a live plant 300 is subject to the external controller 301. Actions might include firing up the furnace, or putting the airplane into a wind tunnel while its input 302/output 303 behavior is observed and identified in real-time by the modeler 304. Once the on-line system identification is performed and the process model $\bar{P}$ 305 of plant P is developed, the target plant 300 can be replaced by the acquired model $\bar{P}$ 305 for further development.

Figure 3B:
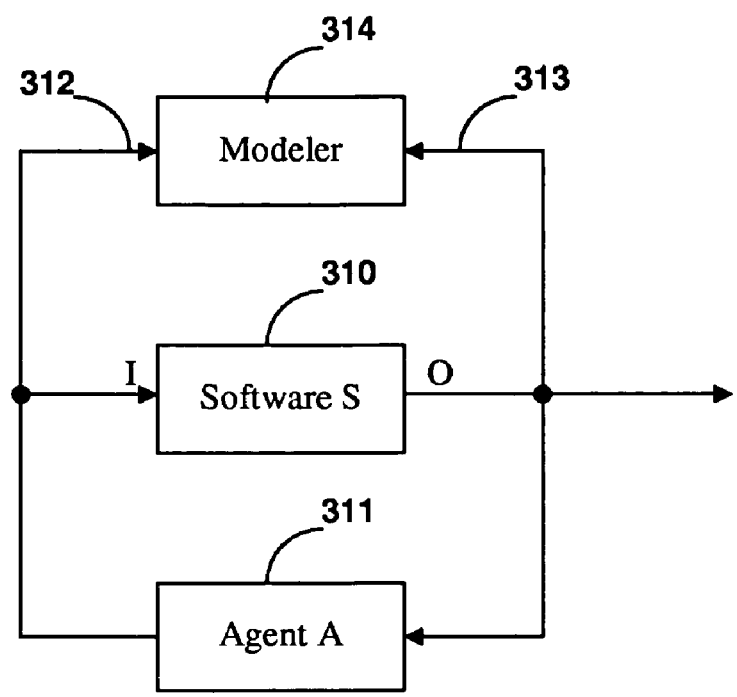
FIG. 3B is the on-line identification in the modeling of the software dynamic system and simulation of the modeled software dynamic system.
Figure 3B:
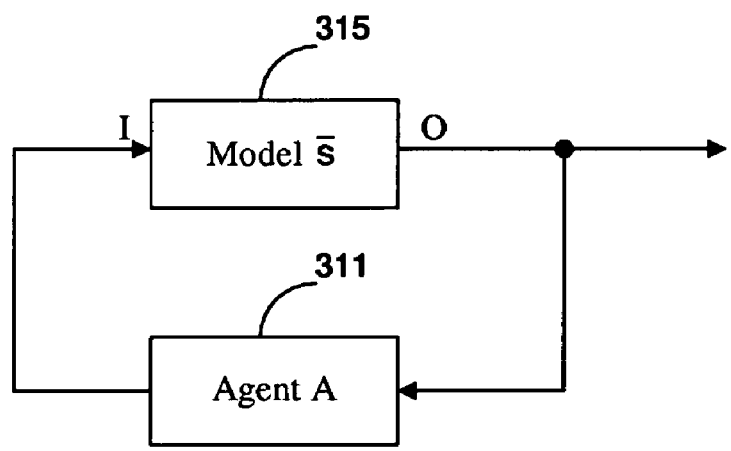

The on-line identification widely used in system science and engineering is adapted and extended in the present invention to apply to the modeling of the software dynamics in FIG. 3B. In the modeling process, the agent A 311 serves as the controller. It physically engages and interacts with its controlled target—a live, running software S as a plant 310, by issuing commands to the software. After receiving the input command I(k) from the agent, the software's internal transition engines will update the output O(k+1) as the software dynamics (8) describes faithfully. The agent A with its input connected to the output of the software S samples its input based on the feedback information from the software's output O(k) in real-time in order to develop the command to advance the software to the next state. The cycle goes on while the software input 312/output 313 behavior and its structures are being observed and identified on-line by the modeler 314. The modeling process under the real-time control of the agent, works like an autopilot that steers an airplane and actively populates an optimal trajectory in state space while a data recorder observes the causal behavior of the plant on-line.

The online modeling process is fully mechanized without any intervention from the outside since the agent is modeled exactly to carry out all the interactions against the software autonomously. The sole purpose of the modeling is to identify the model $\bar{S}(S)$ 315 that powers $\bar{\Phi}$ under control of the same agent A 311. Once the on-line modeling is performed, and $\bar{S}(S)$ is developed, the real software S 310 can be replaced by the acquired model $\bar{S}$ 315 in further development. This is the only occasion that we require 310, the physical software's presence.

1. Factorization of Software Dynamics

The process to model the software S is implemented in two stages. The first stage is analytical, which often can be applied universally to all the interactive software. After the software dynamics (8) is created, the software S is analyzed and factored structurally to yield the organizational knowledge about the software. Also within this stage, analytical modeling is conducted since the analytical representation is more precise and easier to be manipulated. The second stage is numerical, in which the software S is driven dynamically to render the model and process the knowledge about the underlying software dynamics while its behaviors are identified on-line.

Figure 3C:
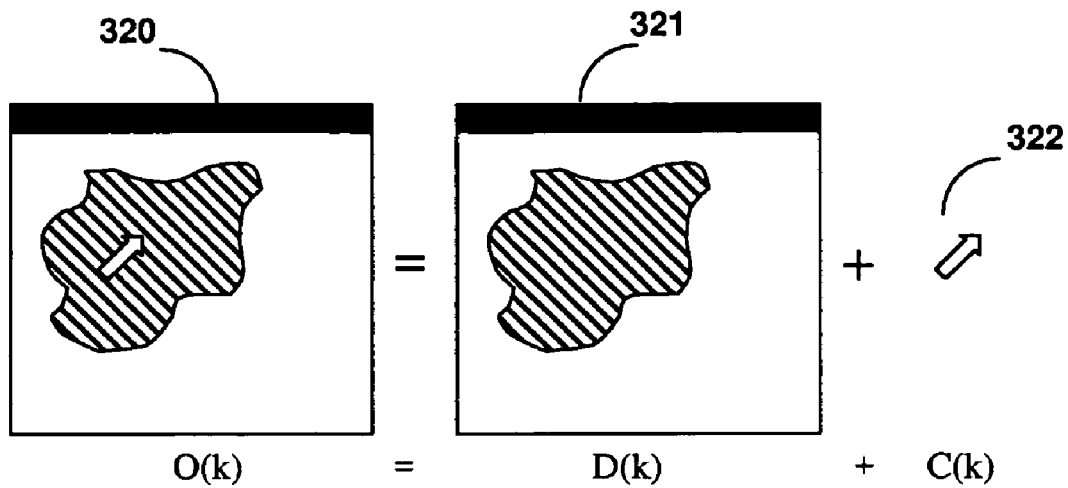
FIG. 3C is the factorization of the software dynamics into a cursor dynamics and an algorithm dynamics in the modeling process.
Figure 3C:
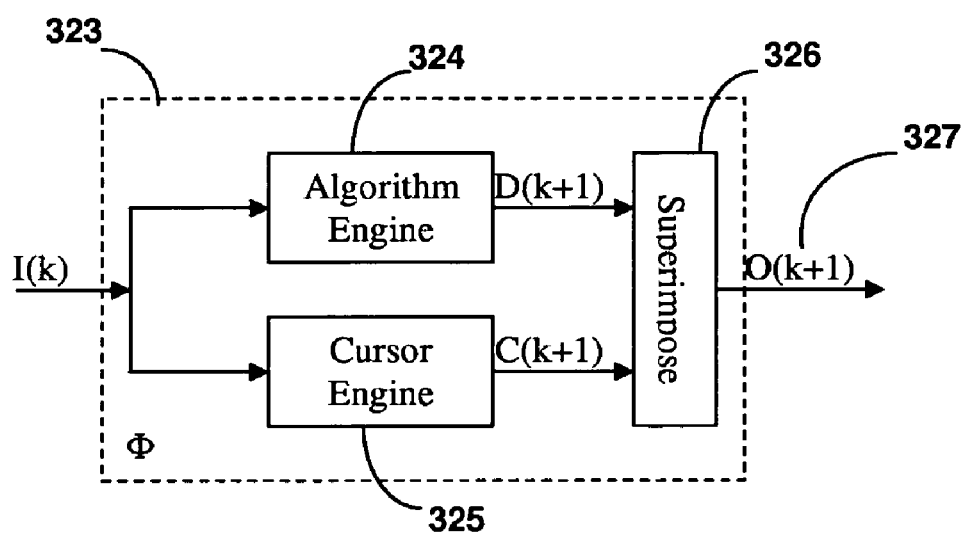

In the analytical stage in FIG. 3C, the software output O(k) 320 can be factored into two independent components. One is a pure display output D 321 from the software algorithm engine; the other is a visual cue C 322 from the cursor engine. The cursor output is a dynamic component in the software output O(k). It communicates interactively between the software and its user. Each mouse movement and its action cause the cursor to be updated accordingly based on its content underneath, in order to give the user a visual hint of what happened and will happen next. If the software output can be modeled as the output superimposed by two independent components, O(k) can be factored as, $$O(k)=D(k)+C(k); \quad (10)$$

That leads to the software dynamics 323 (8) which can be factored into two independent software dynamics, $$D(k+1)=\phi_D(D(k),I(k),k); \quad (11)$$

$$C(k+1)=\Phi_C(C(k),I(k),k); \quad (12)$$

The equation (11) is called the algorithm dynamics that is driven exclusively by the internal algorithm engines 324 and (12) the cursor dynamics that is driven exclusively by the cursor engine 325. The outputs of (11), (12) are mutually exclusive. In other words, the model D(k) can be treated as the software output without a cursor image inked as 321, and C(k) as a pure cursor image without the software output in the background as 322. Outputs from both dynamics are superimposed by the software internally in 326 to feed the output 327 with the composite image 320.

The fact that the software dynamics can be factored itself is a manifestation of the structural modeling. A less sophisticated scheme in an alternate embodiment of the present invention would sample the software output O(k) totally instead of separately with the factored D(k) and C(k), and treat the cursor image as part of the software output indistinguishably. Under that treatment, we have C=0 and D=0, equations (11) degenerates to (9), resulting in the lose of the valuable structured and programmatic information from the cursor engine (12). Another alternate embodiment would be to discard the cursor engine output and only sample the output of D, a total loss of the modeling knowledge of the cursor engine implemented in the software. Otherwise, the methods invented here can be applied to both factored and non-factored software dynamics.

Figure 3D:
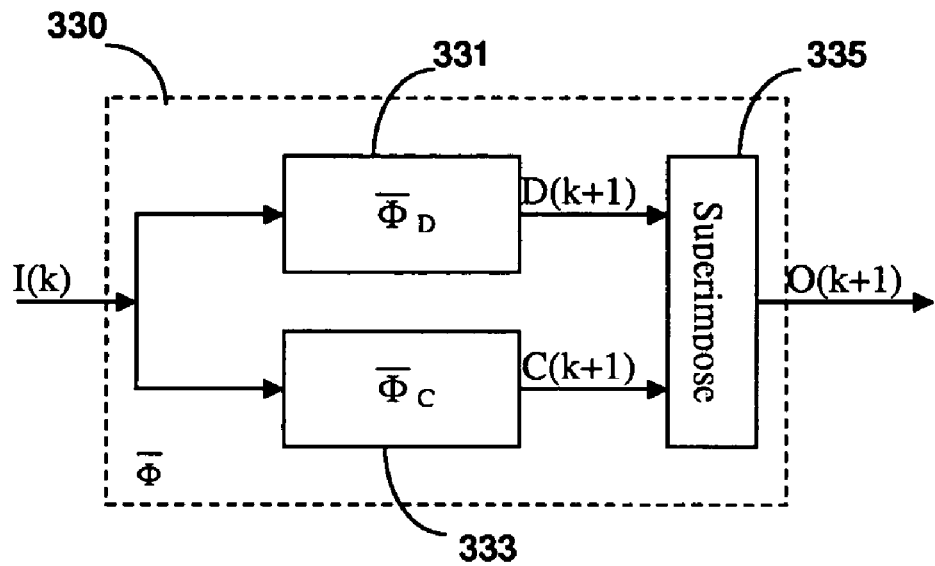
FIG. 3D is the reconstruction of the modeled software dynamics from the modeled cursor dynamics and the modeled algorithm dynamics.
Figure 3D:
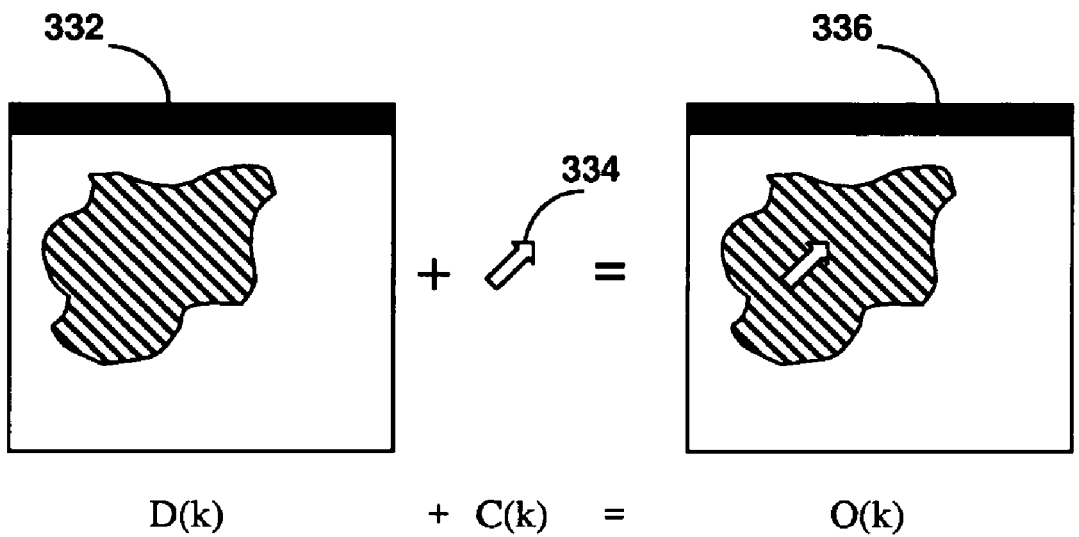

In FIG. 3D, the simulated software dynamics 330 (9) is factored into two independent dynamics. Where, $$D(k+1)=\overline{\Phi}_D(D(k),I(k),k); \quad (13)$$

$$C(k+1)=\overline{\Phi}_C(C(k),I(k),k); \quad (14)$$

Subsystem 331 simulates the algorithm dynamics output as 332 and subsystem 333 simulates the cursor dynamics output as 334. Within the right context, both outputs are superimposed in 335 as the output 336.

The factored models are easier to address in both modeling and simulation processes. The output O(k) can be reconstructed in the simulation by combining two independent outputs C(k) and D(k). This added processing offers new vantages to reshape and extend the software representation process.

2. Modeling of Cursor Dynamics

The cursor dynamics $\phi_C$ can be modeled analytically with the help of the agent. A cursor output displayed on screen can be expressed as the function of position and shape, $$cursor=f(x,y,shape); \quad (15)$$

Since the cursor engine is driven by the agent A in both modeling and simulation phases, the cursor position (x,y), which maps directly from the mouse command I(k), can be computed in real-time. Therefore the position (x,y) can be assumed known, thus reducing the displayed cursor output to be only the function of the cursor shape.

Figure 3E:
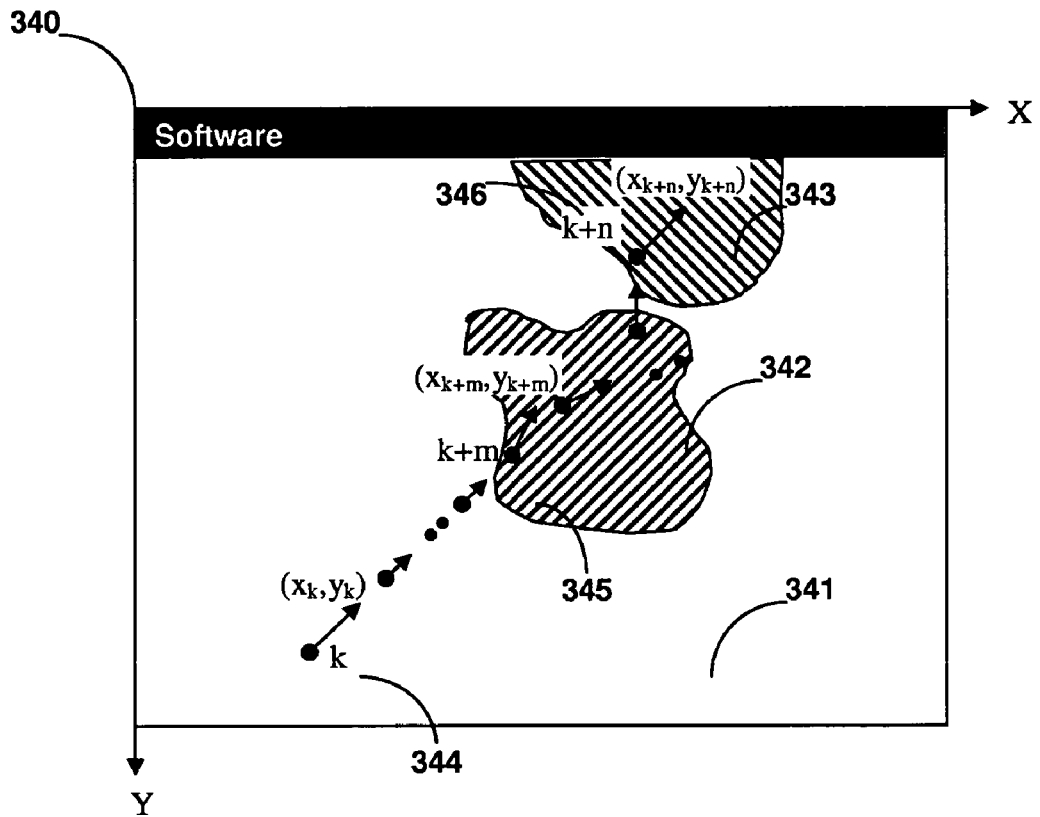
FIG. 3E is the modeling of the cursor dynamics.
Figure 3E:
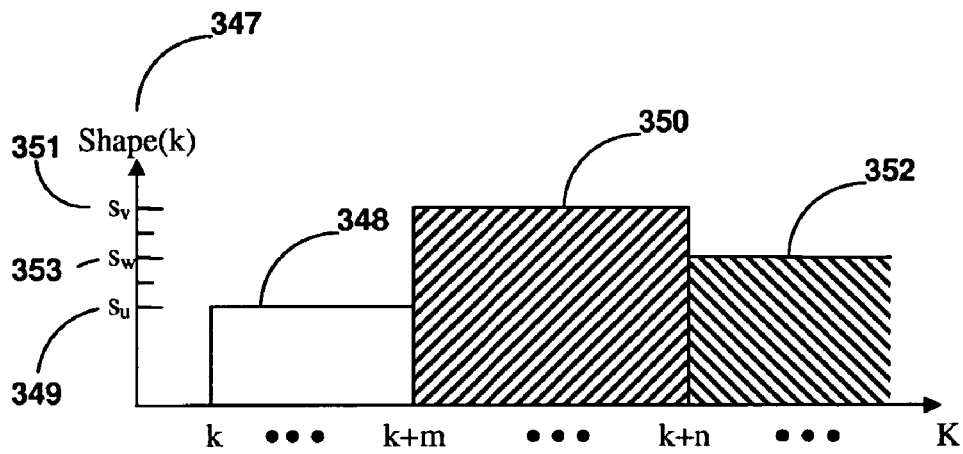

First task is to model the changing cursor shape. Well known from general software programming, the number of the cursor shapes for any application software is finite and limited, which offers a possibility to represent the cursor engine in a finite data structure. As in FIG. 3E, 340 is the coordinate representation of the software display region $r_s$. Suppose at the sampling time $t_k$, there are three hotspot regions 341, 342 and 343 in $r_s$, which are programmed by the software internal cursor engine. When the cursor moves around these three regions, the underlying cursor engine detects it entering and leaving the region and changes the cursor shapes accordingly. Suppose, at the sampling k 344, the cursor enters the region 341 and moves to the position $(x_k,y_k)$ and takes the new shape $s_u$ 349. It keeps displaying the cursor $s_u$ in 348 until it enters the new region 342 at the sampling (k+m) 345. On and after (k+m), it changes shape to $s_v$ 351 and keeps it in 350 until the cursor enters the region 343 at the sampling k+n 346. On and after (k+n), it changes to shape $s_w$ 353 and keeps it in 352. Instead of modeling the cursor shape using positions $(x_i,y_i)$ that are not uniquely defined, the sampling k that is unique and more compact than position (x,y) in representation is used to model the function of the cursor shape, $$shape(q) = \begin{cases} \ldots \\ s_u; q \in [k, k+m-1] \\ s_v; q \in [k+m, k+n-1] \\ s_w; q \in [k+n, \ldots] \\ \ldots \end{cases} \quad (16)$$

Now, the cursor shape function 347 becomes a single variable function. The cursor moving from k (to k+m−1) can be expressed as 348 with the value s 349, from (k+m) to (k+n−1) as 350 with the value $s_v$ 351, and from (k+n) and after as 352 with the value $s_w$ 353.

The equation (16) can be implemented in a data structure, where the i-th entry $(k_i,s_i)$ in a linear list L has $k_i$ as the sampling when the cursor changes shape and $s_i$ as the index to a cursor image table. The L has the order relationship based on the sampling $k_i$ for its entries, that is if i<j, then it has $k_i<k_j$. At any sampling k∈$[k_i,k_{i+1})$, the right entry can be found by walking through the list L, which is i in this case. Within found i-th entry, the index $s_i$ can be used to locate the cursor shape from the cursor image table as CursorTable$[s_i]$.

To implement the equation (16) in the data structure, at least three entries is needed in a list L, $$L=\{\ldots,(k,s_u),(k+m,s_v),(k+n,s_w),\ldots\}$$

Now based on the data structure (16), the cursor engine output can be modeled as the function of the sampling k with the assumption that the cursor position (x,y) is known at k, $$cursor=f(x,y,shape(k));$$

$$=f(x,y,L(k)); \quad (17)$$

Since (x,y) is driven by the agent in the form of command I(k), the next cursor update can be reformulated as, $$C(k+1)=\overline{\Phi}_C(I(k),k);$$

$$=f(I(k),L(k)); \quad (18)$$

The equation (18) is called the modeled cursor dynamics. The simulated transition function $\overline{\Phi}_C$ effectively works as a new cursor engine implemented on a linear order list L. Even though the internal implementation of a real cursor dynamics (12) or its cursor engine 325 in FIG. 3C might not be known, from equation (15)-(18), the real cursor engine can be modeled by a new cursor engine that simulates (12) with the identical input/output behavior. Keep in mind that the success of the cursor engine model (18) depends on the same agent A driving it again in the simulation phase.

Figure 3F:
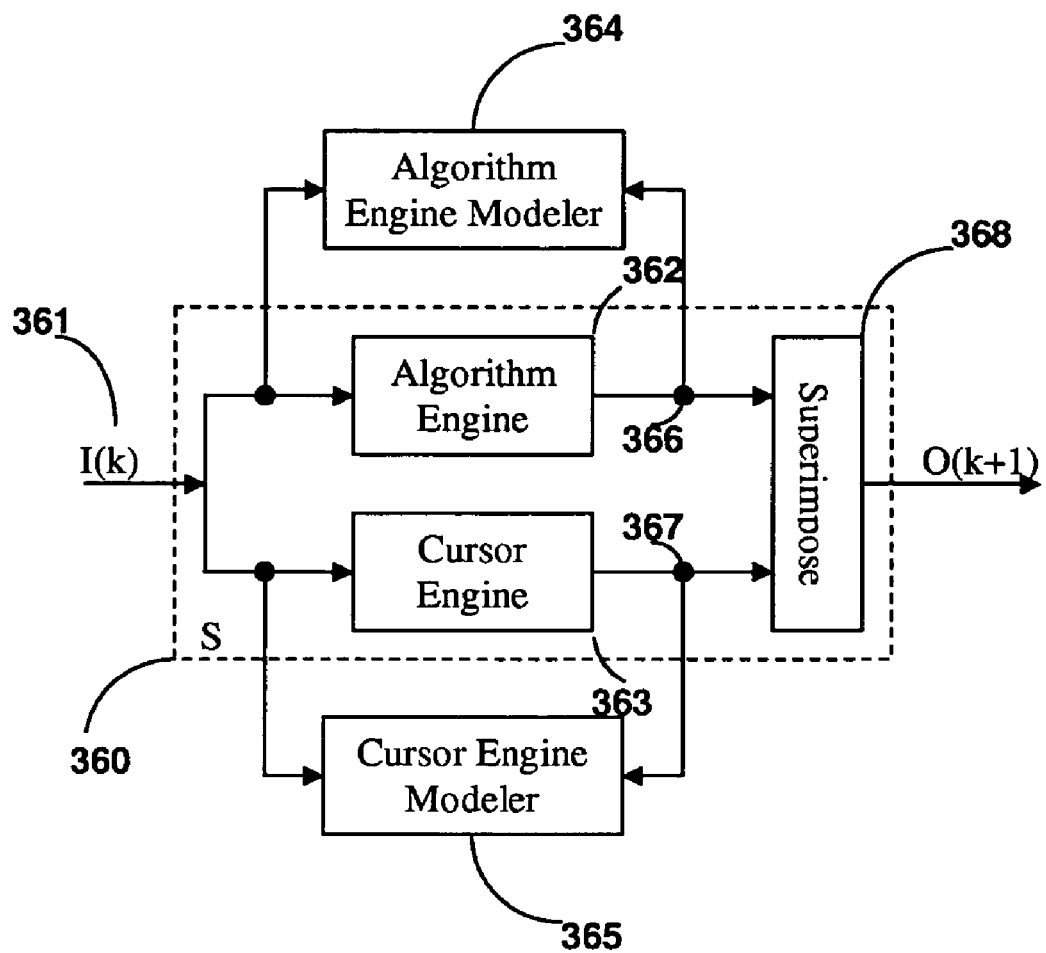
FIG. 3F is the independent modelers in parallel to identify respective models.

Having the software dynamics factored into two parts, the modeler needs to be implemented in two modules, an algorithm engine modeler and a cursor engine modeler running in parallel and independently as in FIG. 3F. The major function of the modeler is to observe each engine's input/output behaviors in real-time and distill its model from the observed behavior so that the identified model can be used to replace the underlying real engine in future simulations.

The underlying software 360 can be modeled analytically as two independent engines connected in parallel. Both engines are controlled and driven by the same input commands I(k) 361 from the agent. 362 is the algorithm engine and 363 is the cursor engine. Accordingly, two modelers are tapped to the engines' input/output terminals respectively. 364 is the algorithm engine modeler for exclusively identifying the software algorithm engine model, which samples the engine's output 366 without the cursor painted. 365 is the cursor engine modeler for identifying the cursor engine model, which samples the engine's output 367 with the cursor information. 366 and 367 are sampled in real-time by the respective modeler 364 and 365 before both outputs are blended in 368 to keep the modeling activities from interfering each other.

Figure 3G:
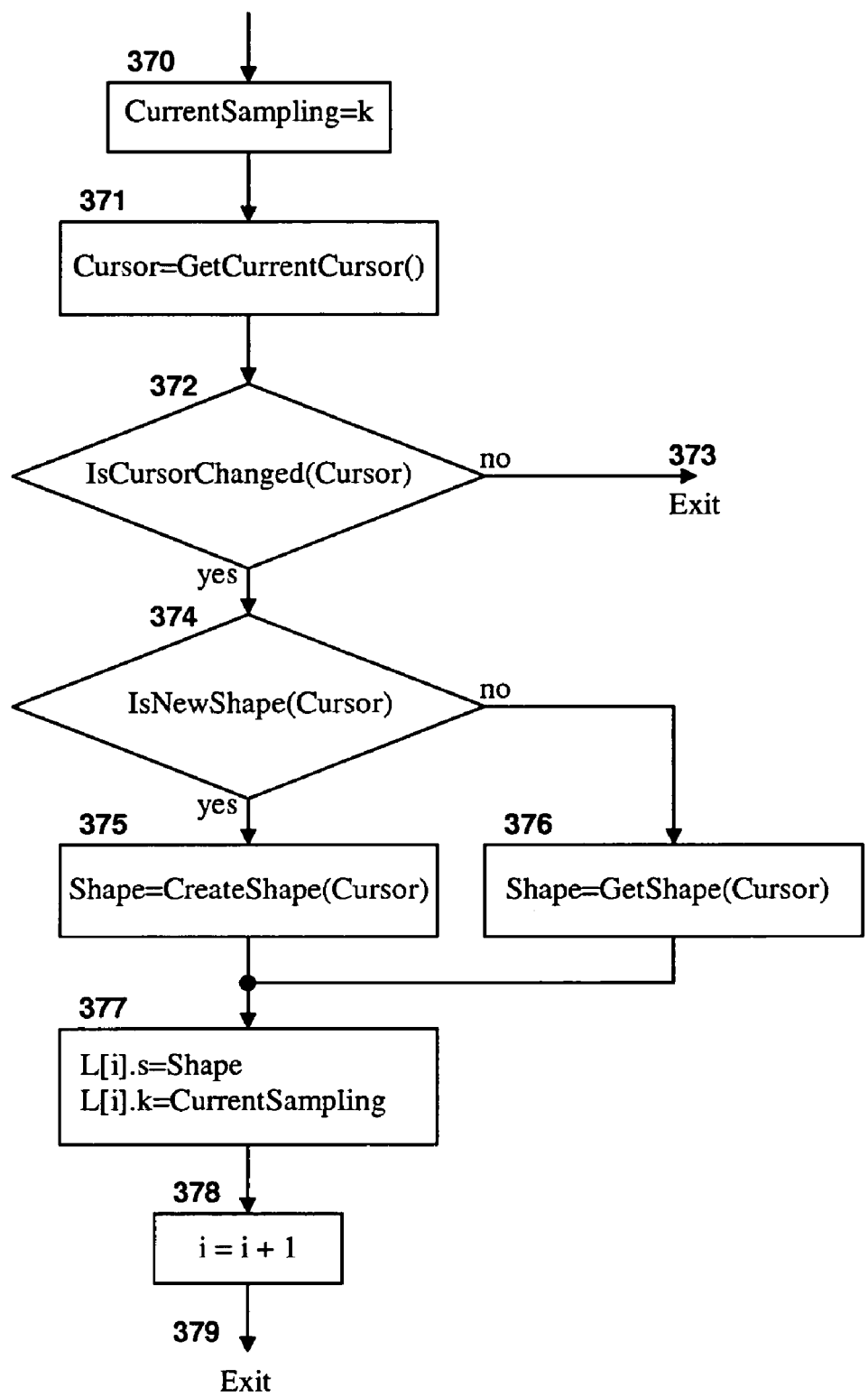
FIG. 3G is the logic to identify the model of the cursor engine.

To model the cursor dynamics (18), it boils down to building a linear order list L that represents the cursor shape logic over the sampling domain K. Referring to FIG. 3G, suppose the cursor is driven by the agent at the sampling time k 370; by calling GetCurrentCursoro 371, it gets the handle of the cursor currently displayed. The handle Cursor is checked with the last cursor displayed at k−1 in 372. If the current cursor is in the same region and has the same shape as the last cursor, IsCursorChanged(Cursor) returns no, and the cursor engine modeler exits at 373. Otherwise, it detects the cursor has entered a new region with a new shape. The cursor engine modeler proceeds to check the cursor shape in 374. Since a cursor can be shared, only one copy of the cursor information such as the image needs to be saved. The cursor engine modeler matches the currently recorded cursor information in 374 with handle Cursor's; if the handle Cursor is not a new cursor, it retrieves a shape index—Shape from the stored cursor information records in 376; if the handle Cursor is a new cursor never used before, it creates a new cursor information record to save the current cursor information and returns a shape index—Shape, too in 375. No matter if the handle Cursor has been used or not before, the cursor engine modeler creates a new list entry L[i] to record the cursor changing event with the cursor shape index Shape and the current sampling k in 377. The List entry L[i] records the change of the new cursor at the sampling k with the index Shape. The cursor will keep the same until current sampling k approaches to L[i+1].k when a different cursor is used. The cursor engine modeler updates List index in 378 to prepare for the next cursor changing event. The cursor engine modeler exits at 379. After the real-time modeling process ends, the cursor engine modeler will save the List L with the cursor information records CursorTable into file.

Figure 3H:
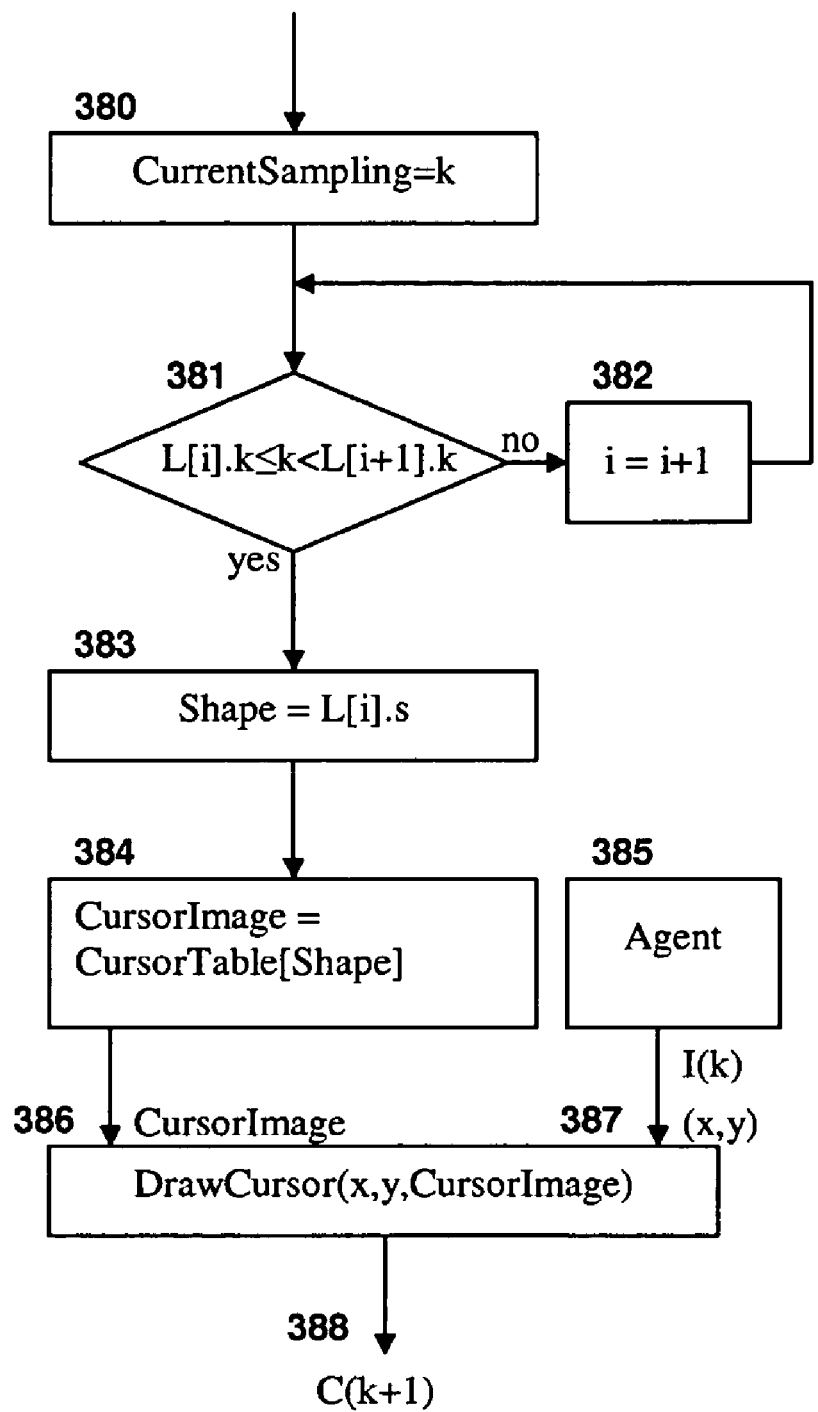
FIG. 3H is the logic to simulate the cursor engine.

To simulate the cursor engine with the dynamics (18), it needs to reconstruct the cursor image at the right place with the right sampling time. Referring to FIG. 3H, suppose that the cursor is driven by the agent at the sampling k 380. Based on the inputted current sampling k, the simulated cursor engine walks through the List L to find the entry L[i] in 381 where k falls inside the limit that is defined by L[i].k and L[i+1].k. Since the List L is a linear order list, if the Current-Sampling k is not in the limit, it increases i by one in 382 walking through the list L until it finds an entry that matches k>=L[i].k. From that L[i], it finds the cursor shape index Shape. Since the cursor information including the cursor images are saved in the modeling process, the current cursor image can be retrieved from the CursorTable using Shape as an index 384. Once the cursor image is ready, the next issue is where to display the cursor. That is when the agent A 385 comes to the rescue. Since the same agent A is used in both modeling and simulation, the agent A calculates an input command I(k) in sync with the current sampling k in 385, which yields the current mouse position (x,y) 387. Combining CursorImage 386 and current mouse position (x,y) 387, the cursor can be drawn by calling DrawCursor(x,y,CursorImage) 388. The output is interpreted as the next sampling C(k+1), which then is superimposed with the simulated algorithm engine output to reconstruct the simulated software output O(k+1) totally.

3. Modeling of Algorithm Dynamics

In general, the algorithm engine is so complicated that it is impossible to model the transition function $\phi_D$ logically, but it can be modeled numerically over the sampling domain K. The software is dynamic, in the sense that a model describes the time course of the interaction between the agent and the software. Such a model enables a formulation of each new state as a summation of the immediately preceding state of the software and an updated change induced by the input and its internal computation. That is, $$D(k+1) = \Phi_D(D(k), I(k), k); \qquad (19)$$
$$= D(k) + \delta(k);$$

Or, $$\delta(k) = D(k+1) - D(k); \qquad (20)$$

The function δ is called the update function that contributes to the renewal state at k+1 by the input I(k). Given an initial state D(0) that has been saved, if we know how to calculate numerically a sequence of updates $\{\delta(k); k \in K\}$, $$\{\delta(0), \delta(1), \ldots, \delta(k), \ldots k \in K\}; \qquad (21)$$

Then we would say the algorithm dynamics has been modeled.

Before going further, we need to postulate the rules of the operations for the output state D since we are dealing with the color values over the region $r_s$. When calculating the update value $\delta(k)$ at the modeling time, it is defined as, $$\delta(k) = D(k+1) - D(k) \qquad (22)$$
$$= \begin{cases} D(k+1); & \text{if}(D(k+1) \neq D(k)) \\ 0; & \text{if}(D(k+1) = D(k)) \end{cases};$$

when calculating the renewal value D(k+1) at the simulation time, it is defined as, $$D(k+1) = D(k) + \delta(k) \tag{23}$$

$$= \begin{cases} \delta(k); & \text{if}(\delta(k) \neq 0) \\ D(k); & \text{if}(\delta(k) \neq 0); \end{cases}$$

4. Modeling of Discrete Sampling of Software States

Figure 4A:
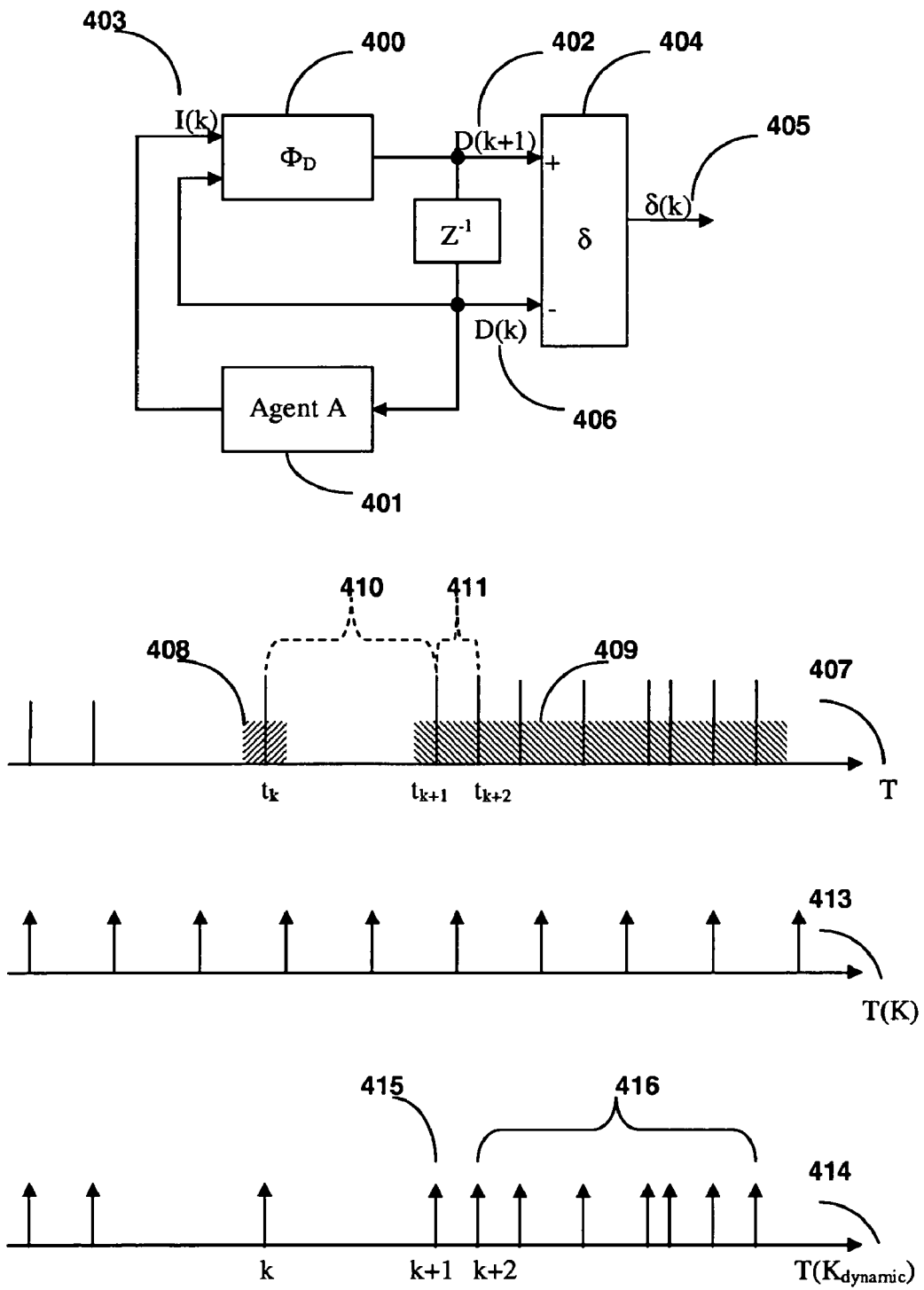
FIG. 4A is the discrete samplings of the algorithm dynamics.

In the modeling process as in FIG. 4A, the software algorithm engine 400 under the control of the agent A 401 will propagate itself. In other words, its renewal state D(k+1) 402, which is the most directly affected by a command input I(k) 403, will be updated by its internal programmed algorithms. Therefore, the algorithm engine modeler 404 can be developed to observe the update sequence {δ(k); k∈K} 405 from a stream of outputs 402 and 406 that are constantly generated by the software's internal algorithm engine 400 that is under control of the agent A.

The software S running on a digital computer is treated as a discrete system. The modeling of the software dynamics is based on the presumption that there exists a discrete sampling domain K, on which the software is built to run and to be observed. However, in reality this is not the case. First, the software is never designed in this way; instead the discrete sampling domain K is imposed by this invention for the purpose of the software representation after the software is developed. Second, the software S is dealt with in a binary capacity, so there is no predefined protocol built to tap the execution of the software. When under the excitement of the agent A, the output 402 without any control and modulation, behaves like a free-running system 407. A free-running system is one that after the input command is applied, its output response will evolve based on its own internal making. For example, after the agent A applies an input command 408 such as clicking a button, pressing a key, the internal engine 400 would go on with its own pace to update its output 409. That pace is non-deterministic and unpredictable from an external observer viewpoint. One update may well take a lengthy computation internally, for example, 10 minutes on a slow computer, 2 minutes on a fast one, as 410.

$$t_{k+1} - t_k = x \text{ minutes};$$

and then the next state update may well take a short duration, 10 milliseconds, as 411.

$$t_{k+2} - t_{k+1} = 10 \text{ milliseconds};$$

On the first one 410, the algorithm engine modeler needs to wait for a long time in order to catch the response from the agent's inputs. However, on the second one 411, it may miss the response that lasts only 10 ms or so totally.

In the traditional discrete-time system analysis and implementation, a uniformly sampling sequence samples a system's input/output characteristics like a clock tick in 413. Through that sampling domain, the algorithm engine modeler is able to measure the values that represent the underlying system dynamics. If applying the traditional sampling domain 413, it would over-sample in 410 and under-sample or miss-sample totally in 411. Obviously, no matter how fast the sampling is conducted, a free-running software system with uniform sampling domain would fail to model the causal dynamics between the input 403 and the output 402.

The validity of the software dynamics now depends on the existence of a valid discrete sampling domain K that is deterministic and predictable. In order to synchronize with the input/output activities of the agent and the algorithm engine that are running on a digital computer, it adapts a non-uniform sampling scheme instead of the traditional uniform sampling. A new valid sampling domain K 414 is developed. Every sampling in 414 is synchronized to the input/output activities in 407. In other words, the sampling by the algorithm engine modeler itself needs to be controlled by the agent 401 and the algorithm engine 400 of which the activities are to be sampled.

The controlled sampling domain $K_{dynamic}$ 414 becomes the part of the software dynamics and in turn, the part of modeling and simulation process. Written in an update form, $$t(k+1) = t(k) + \lambda(A, P); \tag{24}$$

Where, the next sampling time t(k+1) will be controlled by the agent and the software probe P that are instruments inserted into the algorithm engine non-intrusively by the agent. The equation (24) is not going to be calculated quantitatively, instead, its update function λ is implemented by a sampler φ. The next sampling (k+1) will be defined only when the sampler φ is triggered by either the agent A or the software probe P. The output from the sampler φ will be a signal to start the sampling of the update δ and save the sample to a file.

The causality of the software dynamics dictates its input/output interaction behavior in a sequential order on the sampling domain K. The inputs 408 that are generated by the agent will initiate the output responses 409 that ensue. If an output $D(k_2)$ is induced by an input command $I(k_1)$, then the order relation $k_1 < k_2$ must be true. Based on the order relation, the output of the algorithm engine can be further divided into two components along the sampling domain $K_{dynamic}$ 414. The first one 415 is the direct output responses induced by the input command I(k) 403, such as pressing a mouse button down or hitting a key. The second one 416 is the ensuing responses generated from the algorithm engine to render the calculated results.

Based on the causal order relationship between the input and the output and the classified output responses, the sampler φ can be split into two sub-samplers along the sampling domain 414. Each one can be modeled and controlled separately without overlapping, $$\phi(I(k), P(k)) = \phi_a(I(k)) + \phi_s(P(k)); \tag{25}$$

Where, $\phi_a$ is the direct input/output sampler to control the sampling of the direct output response 415, and $\phi_s$ is the internal computation sampler to control the sampling of the response generated from the algorithm engine 416. Two sub-samplers run mutually exclusively so that only one sampler works at a time if any. For example, the sampler $\phi_a$ works in the period of 415 only while the sampler $\phi_s$ works in the period of 416 only.

Two sub-samplers dynamically create the discrete sampling domain $K_{dynamic}$ 414 from the execution flow of the agent in the modeling process. The causal relationship in the sampling domain $K_{dynamic}$ 414 will be preserved in the simulation process. Evolving on $K_{dynamic}$ 414, any output update that is modeled in (8) and simulated in (9) is precise and accurate. It is precise because each dynamic update is accountable causally from the agent's actions. It is accurate because each dynamic update is sampled predictably with certainty. For brevity, K is used to express the controlled sampling domain $K_{dynamic}$ in future disclosure.

Figure 4B:
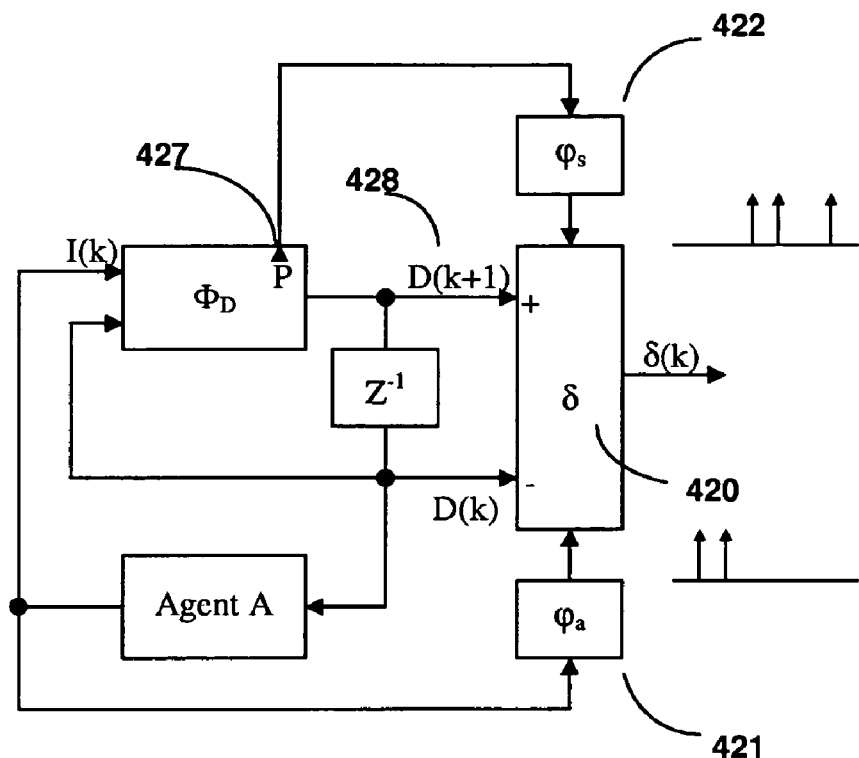
FIG. 4B is the modeled discrete samplings of the algorithm dynamics.
Figure 4B:
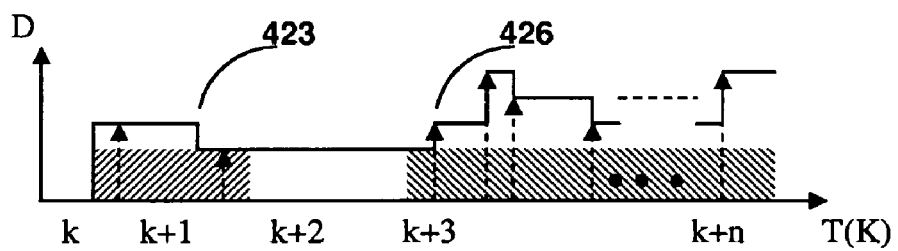
Figure 4B:
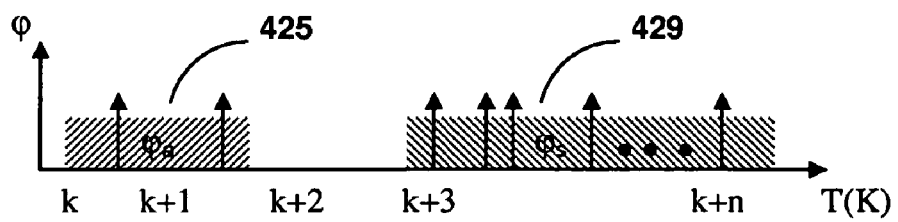
Figure 4B:
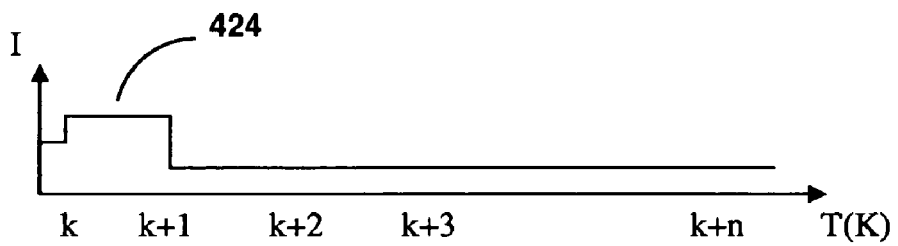

In FIG. 4B, the algorithm engine modeler 420 that takes the update samples is controlled by two sub-samplers, $\phi_a$ 421, and $\phi_s$ 422. The sub-sampler $\phi_a$ 421 is driven directly by the agent A so that it is controllable and programmable by the agent A. The output responses 423 that are induced by the agent command I(k) 424 are sampled in 425 under control of $\phi_a$ 421. After the predictable agent actions rest down, the expected output responses 426 from the algorithm dynamics will come to show. With the help of the inserted software probes P 427, every output state update D(k+1) 428 that is to be modeled in the software dynamics will trigger the sampler $\phi_s$ 422. The output responses 426 that come from the internal computation are sampled in 429 under control of $\phi_s$ 422. All the sampled values are represented in dashed arrows as sequences 423 and 426 in D.

Figure 4C:
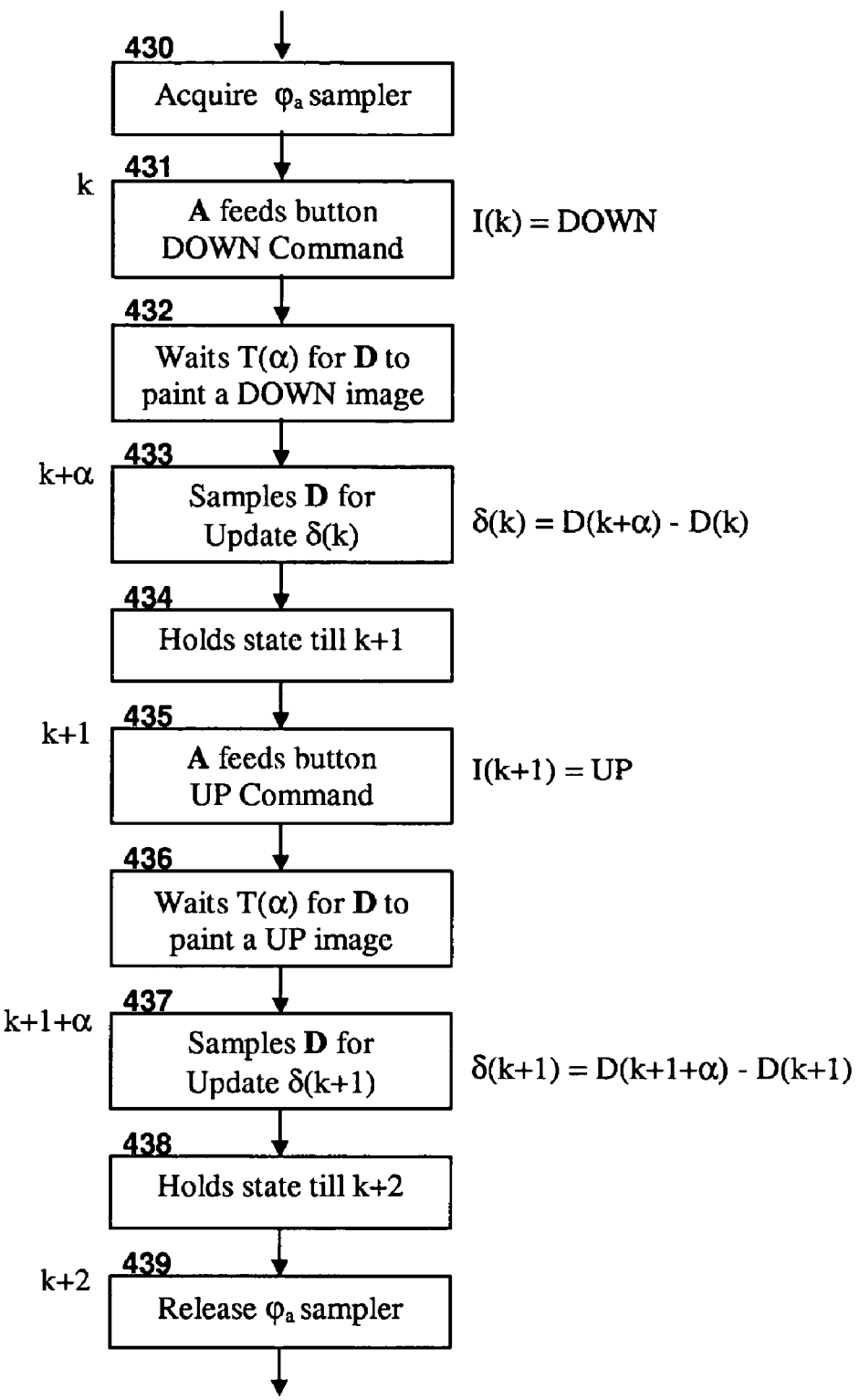
FIG. 4C is the logic to model and sample a mouse clicking command.

Take modeling a mouse button click command as in example in FIG. 4C. At sampling k, before the agent issues commands, it acquires the sub-sampler $\phi_a$ 430. The agent A feeds a mouse button DOWN command 431 into the algorithm engine D. Then agent A will wait for T($\alpha$) amount of time 432 to let engine D respond by painting a button down image and performing the button down message processing. After T($\alpha$) lapsed, while the agent is still holding the mouse button down, the sampler $\phi_a$ will trigger the algorithm engine modeler to sample D(k+$\alpha$)–D(k) in 433. The agent A can be programmed to hold down the mouse button in 434 until it is ready for the next command, which is a calculated mouse button up command. So until t(k+1), the sampled state D(k+$\alpha$) can be held as, $$D(k+\alpha)=D(k+1); \quad (26)$$

Or, $$\delta(k) = D(k+1) - D(k) \quad (27)$$
$$= D(k+a) - D(k);$$

Now advancing to sampling k+1, the agent A feeds a mouse button UP command 435. The agent will wait for T($\alpha$) to let the engine D paint a button up image and perform message processing in 436. The same argument as the button down case, the sampled update $\delta$(k+1) 437 can be modeled as, $$\delta(k+1) = D(k+2) - D(k+1) \quad (28)$$
$$= D(k+1+a) - D(k+1);$$

After sampling, the agent holds its mouse button up state until t(k+2) 438. Then, it releases the acquired sub-sampler $\phi_a$ in 439. This completes the modeling of a full cycle of the mouse click command issued by the agent.

The $\alpha$-sampling rule can be applied to model the direct input/output interaction between the agent and the software in a user interface setting including other mouse activities such as mouse button down/up, move and drag, key down/up and key pressing and so on.

After a command I(k) has been applied by the agent, the algorithm engine D will start its internal computation activities modeled from the causality as the continuing responses to the applied command I(k). Of course, neither is it possible to model every internal detail of the algorithm engine nor do it needs to. What is needed is a dynamic model that can corroborate the interactive process between the agent and the software and a dynamic model that is controllable and observable to evolve in a sequence of precise and accurate state transitions, of which the underlying software is lacking.

Figure 4D:
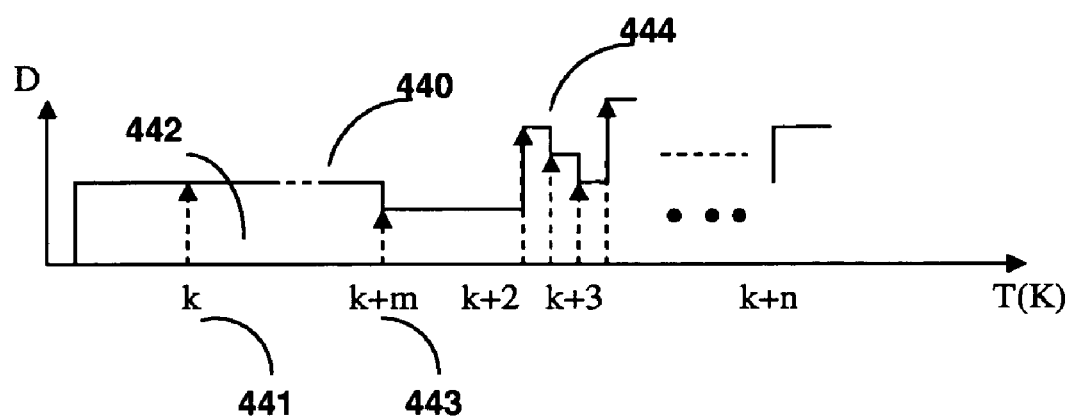
FIG. 4D is the classification of the slow and fast responses of the algorithm dynamics.

Like a general dynamic system, which has slow and fast responses to an outside input, the algorithm dynamics as in FIG. 4D has slow 440 and fast 444 responses too. For a slow and predictable response 440, such as a pulled down menu, a popped up or periodic timer callbacks, the sampler $\phi$ can be called synchronously or asynchronously to trigger the sampling of the update $\delta$(k).

If software states are static and slowly changing, then an asynchronous sampling can be made to acquire the update $\delta$(k) directly. Such a slow response as a dialog popped up can be viewed as a static state after the creation. The response or the state can be held until a new action is taken by the agent. The sampling timing 441 is not critically important and can be taken anywhere within its holding period 442. Its implementation is to call directly the sampler $\phi_a$ by the agent, which in turn, triggers the algorithm engine modeler to sample once and advance the current sampling clock k by one step.

But in some cases, timing of the state transition is critical when observing before or after certain events have been fired, such as slowly changing responses like 443 and fast responses like 444.

5. Software Sensor Model

In system engineering and science, in order to measure or control physical objects, the instrumentations are often relied upon getting the reading of the underlying process by attaching the sensors to the targeted process. If the algorithm engine D is viewed as a binary machine with its internal computation as a binary process flowing through computational media, the same technique can be applied by inserting the software sensor—software probe P to sense and measure the internal computation flow.

The software probe like a real sensor in the physical world is to be anchored to certain points in the internal computation process. An anchored point is defined as an internal computation unit where its computation states transition needs to be observed. Before the algorithm engine is driven to the anchored point, the software probes are inserted into a binary computation process non-intrusively in order to not disturb or change the underlying software behavior. When the planted observation is performed, the probes are removed from the binary computation process. Based on the computation nature of the anchored points where the software sensors are attached to measure the activities, there are two classes of the software probes implemented in the software sensor to observe two different models of responses, one is coarser, event-based for slow response and the other is finer, API-based for fast response.

A software sensor is a piece of the software code that is programmed to perform any function including triggering the sub-sampler $\phi_s$. The sensor will be invoked synchronously before and after the anchored point that is the internal computation unit being executed. The software sensor can be modeled to measure repeatedly the anchored point inside the loop of the internal computation. The number of state transitions that are to be measured by the software sensor is a passed function argument that can be programmed by the agent A.

The first one is called the Event Probe (EP) for slow response modeling. In general window programming, it is well known that the internal computation can be tied to the window event processing loop under certain circumstances. The synchronized samplings often can be triggered by certain kinds of window events, such as window creation/destroy, window painting, and window moving/sizing. All the events or message entries processed by the window callback routine can become the anchor points to attach an EP by injecting the probe into the window's event processing path.

Figure 4E:
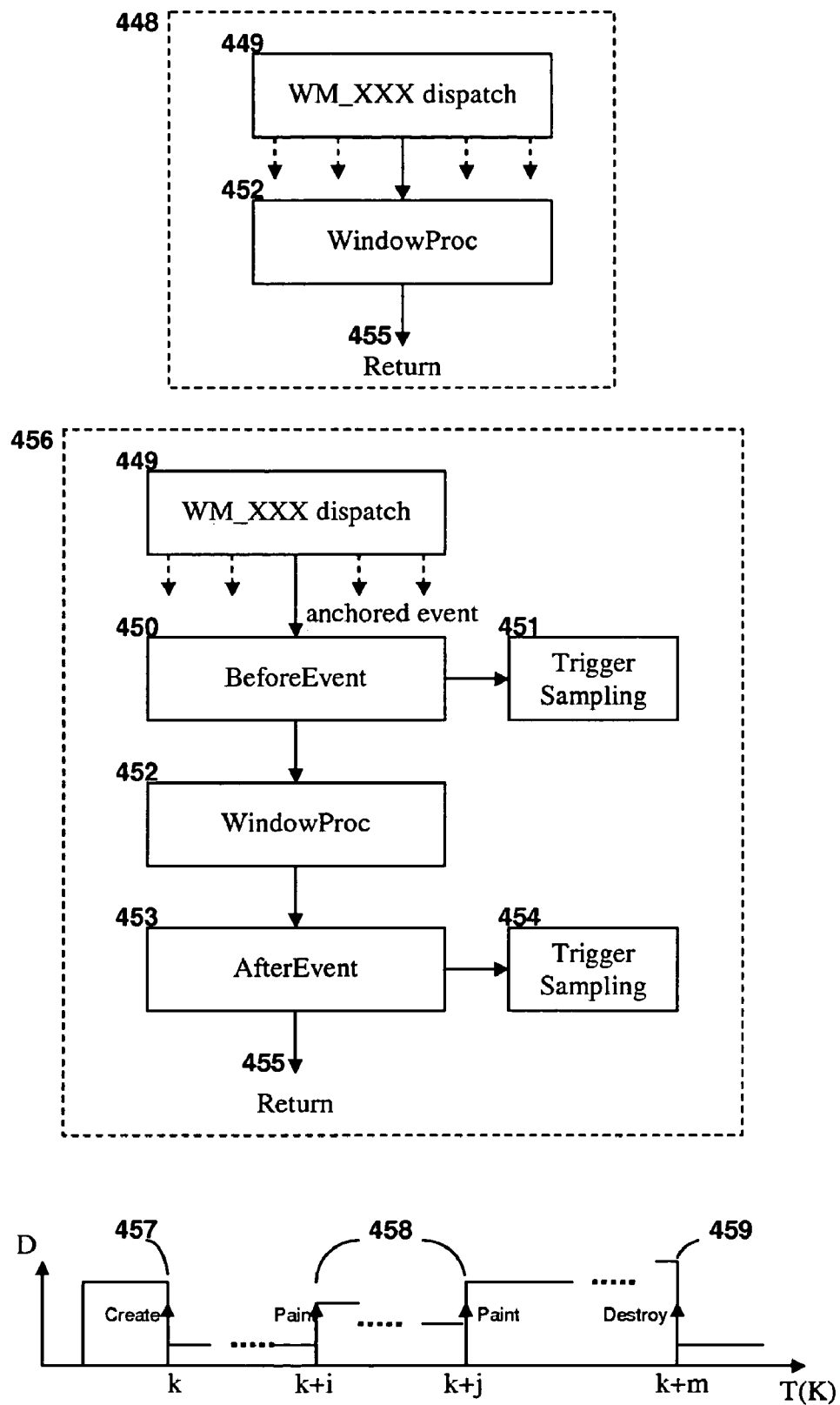
FIG. 4E is the modeling and sampling of the window event response based on the software Event Probe (EP).

Take modeling Microsoft® Windows® message processing as an example in FIG. 4E, based on the analytical modeling, we have a general model of message processing unit 448 that is universally applicable to all the windows software. The model of 448 can be sub-divided into 3 pieces. 449 is a window message dispatching unit. Based on the dispatched message, it will call the corresponding entry in 452 where every dispatched message is processed. 452 can be modeled as the part of the implementation of the algorithm engine D. The execution 455 returns to the message loop. Now the task is to measure the binary computation flow in the model 448, which creates 456, a new binary model with the Event Probe attached. Based on the analytical modeling of 448, Window-Proc 452 is the code where it cranks out the results of the algorithm engine D based on the passed message. From the software documentations, certain kinds of window messages are very illustrative of the algorithms implemented by the engine D. For example, for the message of WM_PAINT, the engine D will paint the window with its designed algorithm. So to model the software states transition, 452 is a natural anchored point to attach the Event Probe (EP). The message associated with the anchored point 452 is called the anchored event Based on the standard windows subclassing technique, the window message dispatching unit 449 can be rerouted to insert two EPs into the computation (message processing) flow. When the window message dispatch 449 is driven to dispatch the anchored event, it will first call 450 instead of 452 directly. 450 is an event probe that will be called right before the anchored event is processed, for example, before the window is repainted. The EP 450 will perform any function programmed including triggering the algorithm engine modeler to sample the current software update through 451. Then, the normal WM_PAINT message processing routine 452 is called. After the algorithm engine cranks out the result in 452, which is to repaint the window, another EP 453 will be called to perform any function programmed including triggering another sampling in 454 to measure a fully repainted update. After that, it returns to the message loop in 455 as normal processing does.

Even though the details of the internal workings of message processing might not be known to an outside observer, its dynamic behavior can be modeled and predicted from the current message being processed. The transition between two states is modeled precisely and measured accurately as well.

On one hand, by precisely pinpointing the sampling moment right before and after the anchored event is processed, such as 457 for the window creation event, 458 for the window paint event, 459 for the window destroy event, it is able to model and preserve the nature of the events for further development when the model of software $\overline{S}$ instead of the real software S will power the system. Not only are the outputs $\{O(k), O(k+i), O(k+j), O(k+m)\}$ sampled, but also the sampling k, k+i, k+j and k+m are enriched to relate to the respective events.

On the other hand, by taking sampling before and after an event is processed, it also guarantees that the sampled state is complete and accurate without any interference from the competing process—the software S, since the software S is blocked from executing the event processing 452 to modify the content of the output space while the sampling is taken by the modeler.

The second class of the software sensor is called the API Probe (AP) that taps the fast computation responses. The most challenging but the most rewarding state model is for a general-purpose computation flow of the algorithm engine. The success of the event probe depends on the existence of a message entry that is processed by the windows callback function WindowProc. Since message processing is slow and inflexible, the authors of the software often bypass that message loop and directly manipulate the software states within its internal computation path. Therefore, those basic state transitions often are implemented in the fast computation units internally.

Figure 4F:
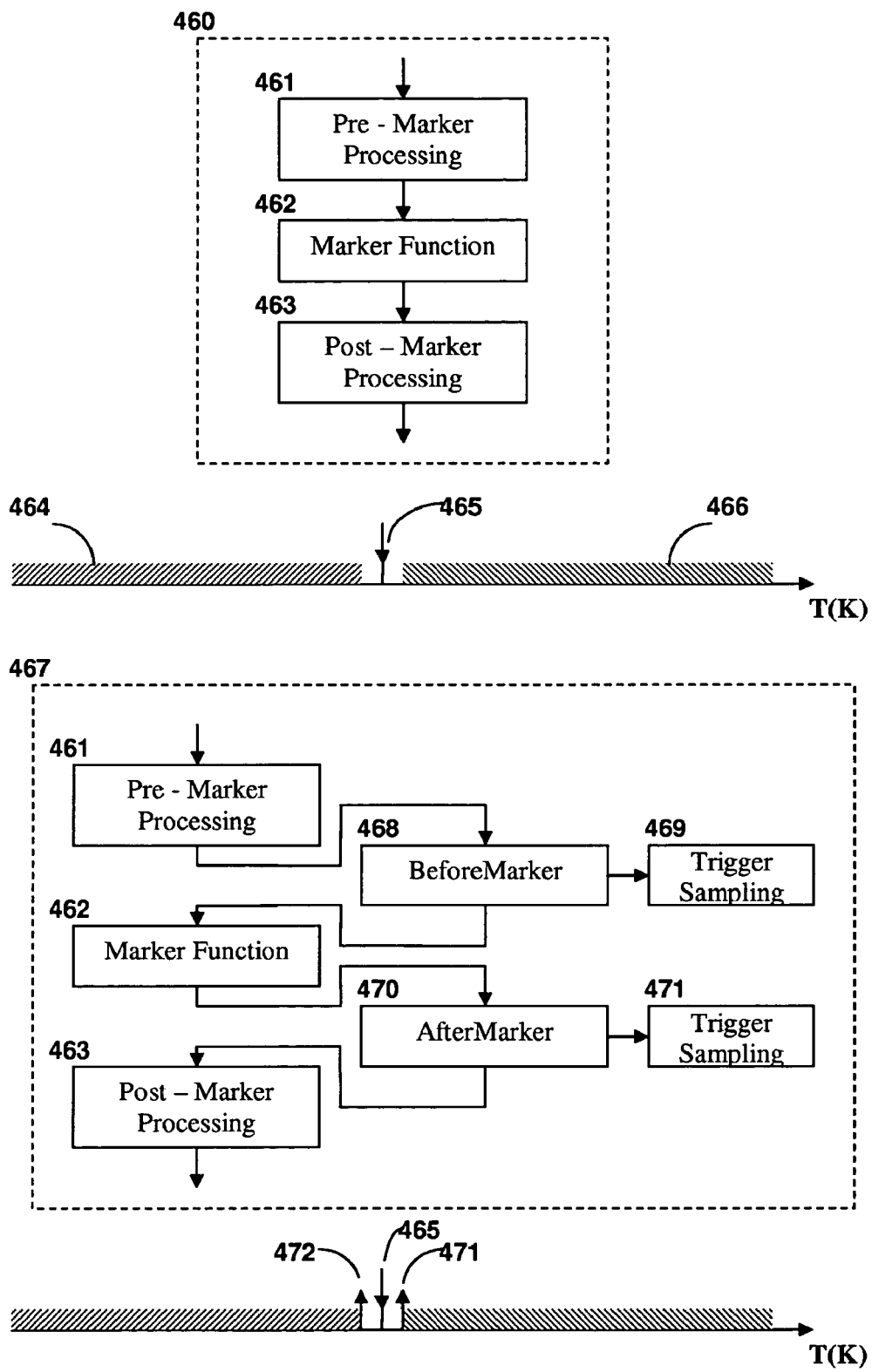
FIG. 4F is the modeling and sampling of the general free-running computation response based on the software API Probe (AP).

In FIG. 4F, based on analytical modeling, a computation unit 460 can be modeled as three components. 461 is a general purpose computation component that implements the detailed algorithm. The modeling 460 is based on the assumption that there are some anchored points where the internal computation flow can be staged and distinct actions can be identified. We call those anchored points Marker functions 462. Based on the identified marker function, a binary computation flow can be decomposed into Pre-Marker 461 and Post-Marker processing 463. The marker can be viewed as a beacon 465 within a binary computation flow where the computation activities 464 have reached a distinct point. After that marker function is executed, the flow continues as 466. The division of the three stages is a structural modeling used to observe and model the flow of the internal computation without accessing the source code of the software.

The most common selection for a marker within a computation flow is an Operating System API call, such as, in Microsoft® Windows®, ReadFile/WriteFile to read/write results to a file, BitBlt to copy an off-screen bitmap to screen, or TextOut to draw a text string on screen, or any one of more than 3000 APIs that the algorithm engine uses to perform some distinct work. Once a marker has been identified, any internal computation flow can be partitioned accordingly and API probes can be inserted non-intrusively into 467. The Pre-Marker processing 461 will do some major computations to set up for the marker function and is where the underlying software implements its proprietary algorithms. For example, the computation that an animation engine renders a scene in memory before copying to the screen can be identified as Pre-Marker processing. Now instead of going directly to the Marker function 462, the execution sequence is rerouted to 468, the BeforeMarker API probe. 468, in turn, signals the trigger 469 that a new state is going to be transited to, and if necessary, the algorithm engine modeler can sample one before the state is updated. After 468, it returns the execution sequence to 462 to have the programmed Marker function called. 462 can be any operating system API call, of which the function is well published and understood. For example, it can be drawing a frame number from calling TextOut API in an animation sequence, which signals that a frame has been fully rendered by the internal animation engine. After 462 is executed, the execution is rerouted to 470, where the API probe AfterMarker is called to signal the trigger 471 that a new state transition is completed and if necessary the algorithm engine modeler can sample the transited state that includes the result from the processing of the Maker function. After 470, the execution returns back to 463 to finish what is called Post-Marker processing. Throughout the computation flow, the API probes 468 and 470 create two controlled state samplings 472 and 471 around the anchored point 465, which is the Marker function 462 where the most visible state transitions happen.

The AP is inserted by the agent by modifying the binary execution image in the computer memory. Obviously, the API Probe can provide finer control than the Event Probe since its precision to pinpoint the state transition comes down to one API call vs. one event procedure call. The API probes and the Event Probe both are programmable.

The foregoing Event Probe and API Probe are adapted based on the techniques "windows subclassing" and "API Hooking" which are well known in the field of Windows programming. For those unfamiliar with these concepts, please consult the reference books: Microsoft®, "Microsoft Win32™ Programmer's Reference", and Jeffrey Richter, "Programming Applications for Microsoft Windows (particularly, CHAPTER TWENTY-TWO: DLL INJECTION AND API HOOKING)".

Figure 4G:
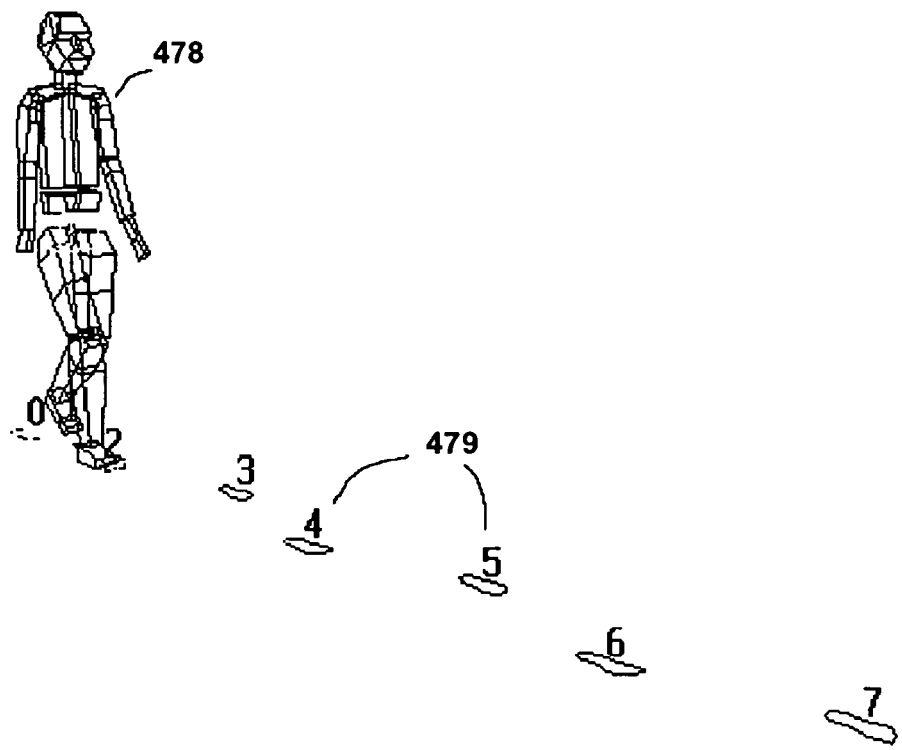
FIG. 4G is the biped animation driven by the internal animation engine.
Figure 4G:
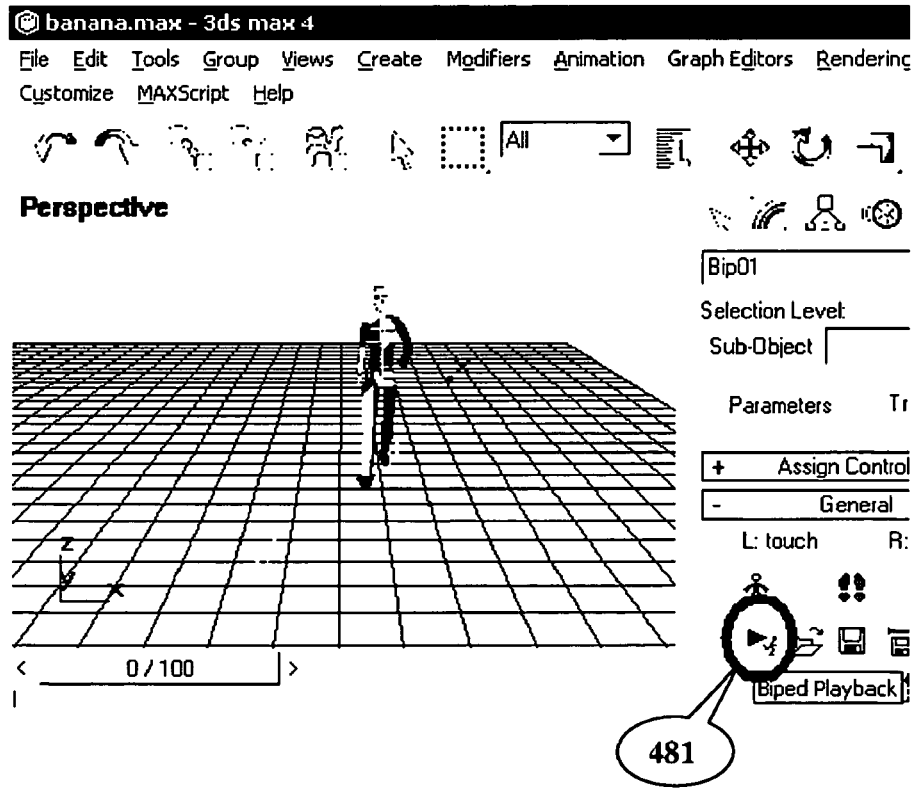
Figure 4G:
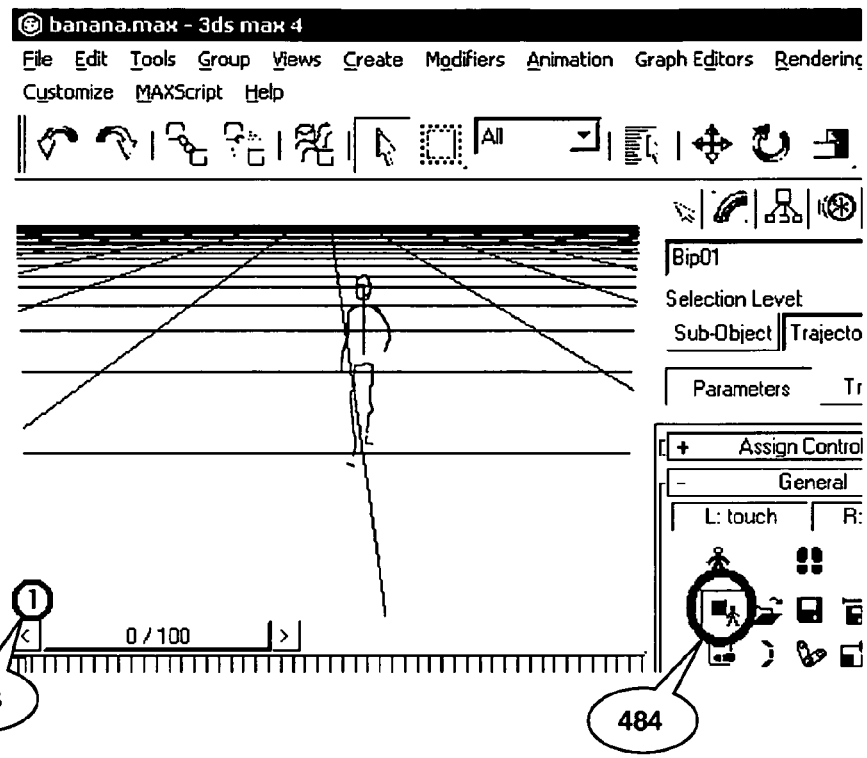
Figure 4G:
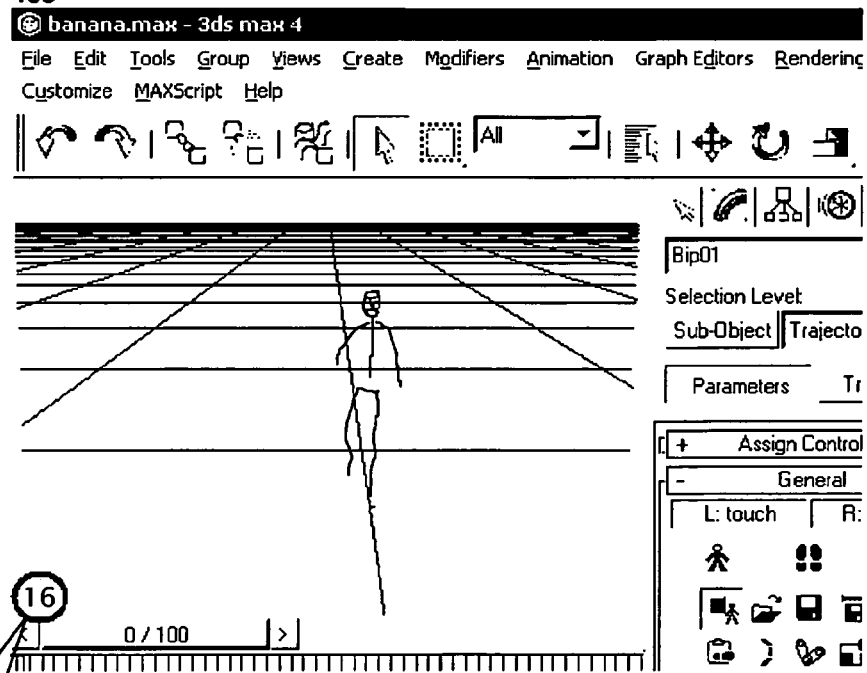

To help grab the concept of the software sensor and controlled sampling, here is a real-world scenario. It is to model a sequence of interactions between the agent A and the software, Discreet® Character Studio® 3 running on 3DS MAX™ in FIG. 4G. This is a biped animation that combines footstep and freeform 480. A biped character 478 is a two-legged figure: human or animal or imaginary. Each biped is an armature designed for animation with special properties that make it instantly ready to animate. Bipeds are specially designed to animate walking with footsteps 479 like humans.

The animation starts with the footsteps in 482 displayed in frame 1 as in 483 and then has a period of freeform walkings when the biped character slips on an invisible banana peel and takes a pratfall. It is a very complex sequence of dynamic actions with sophisticated algorithms driving it from behind. The interaction starts by clicking PlayBiped button 481. Then, the software state 482 begins to evolve until the button 481 is clicked again to stop the animation. While the PlayBiped button is down 484, the internal animation engine will compute and animate the result as fast as possible. 485 is one of the rendered states, where 486 displays the current animated frame 16. This is a typical free-running case where the state and animation modes transiting from the footstep to the freeform are both uncontrollable and unobservable manually since the animation simply runs too fast.

Figure 4H:
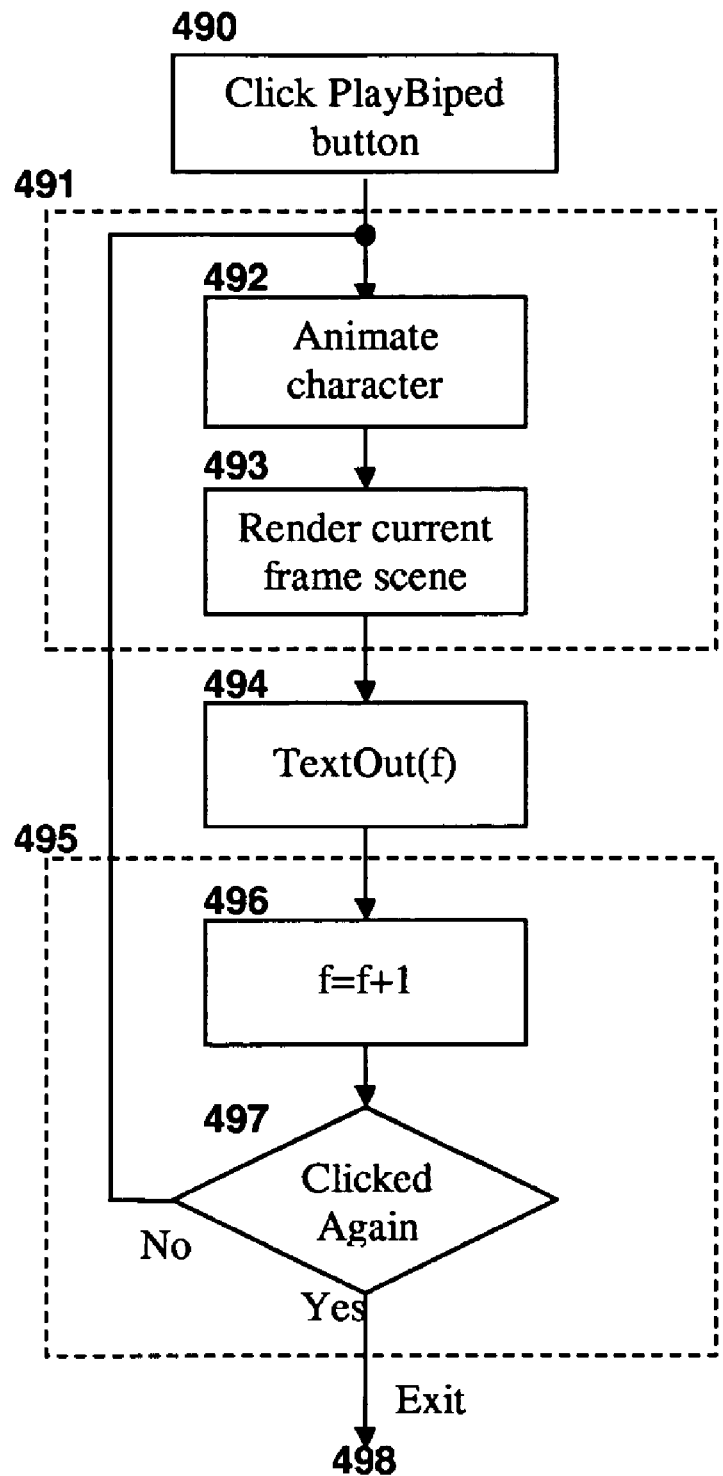
FIG. 4H is the modeling of PreMarker-Marker-PostMarker logic for the internal animation engine.
Figure 4H:
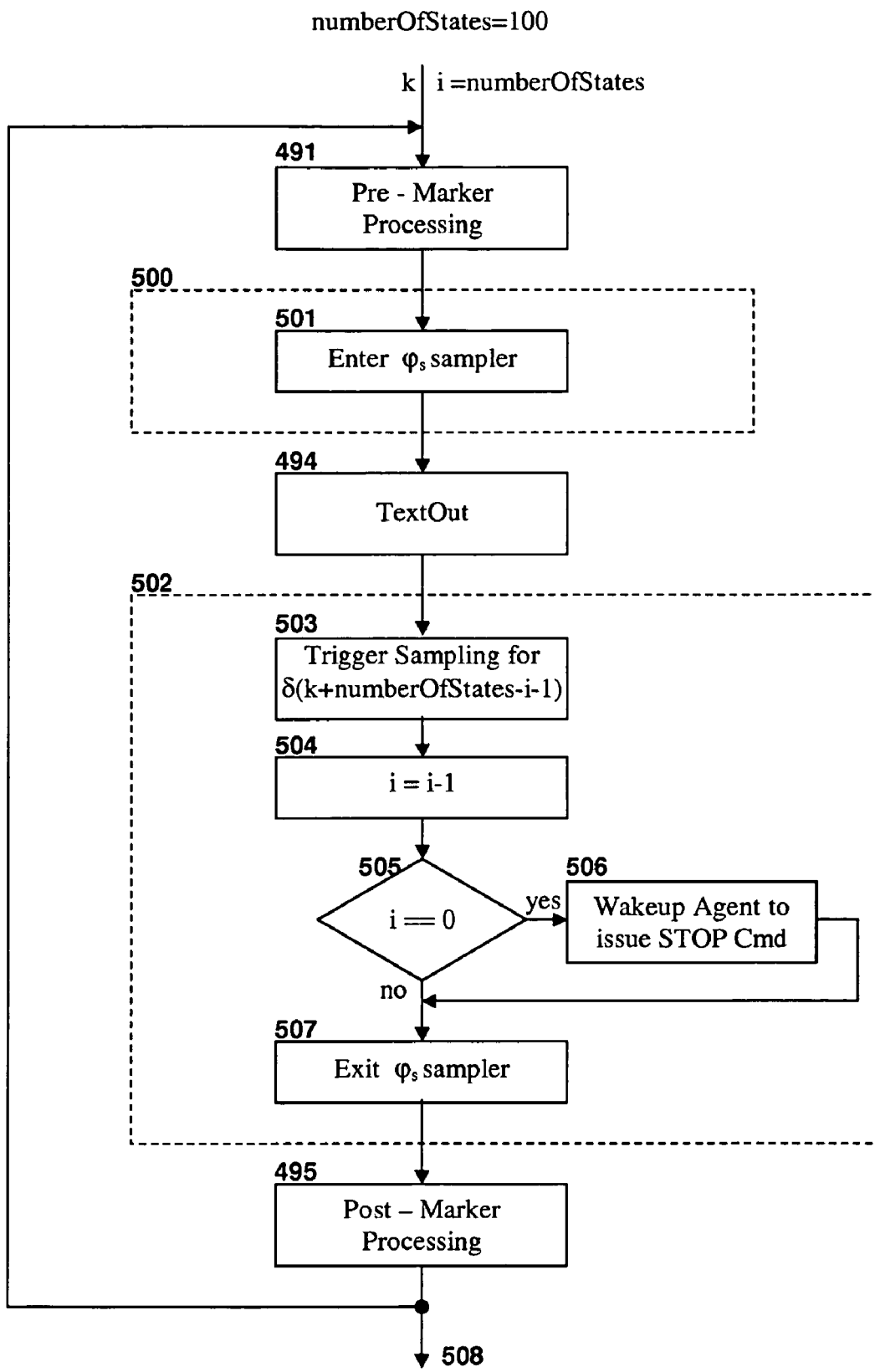

That animation-output loop can be conceptualized into three parts as shown in FIG. 4F, for the analytical modeling. Referring to FIG. 4H, coming into Pre-Marker 491 is the command to start the internal animation engine 490. The internal animation engine animates the character in 492 and renders the result to screen in 493 as fast as possible. The Marker function 494 identified here is a Windows API call TextOut, which implements the function to draw the current frame number in the left corner as in FIG. 4G 483, 486. After the current frame number is drawn by the Marker function, the Post-Marker 495 increases the frame number by one in 496, and checks if the PlayBiped button is clicked again in 497. If not, it loops back to 492 to start a new cycle of state update; otherwise, it exits the loop in 498. Keep in mind that this is a part of the modeling exercise, which structurally partitions the internal computation flow into three parts without change and access to the underlying software code.

After the analytical modeling is done, the software sensors need to be planted into the free-running process so that a full sequence of 100 biped animation states including the first 25 states for the footstep animation and next 75 states for the freeform animation can be observed and modeled precisely and accurately.

Once the API call TextOut is identified as the Marker function in the animation loop, the normal execution sequence 491, 494, 495 is augmented by inserting API Probes 500 and 502. Now every time the internal animation engine calls TextOut to draw the current frame number, which signals that animation and rendering is completed for the current frame, it is rerouted to 500 before the number is painted and 502 after the number is painted in 494. 500 as the BeforeMarker is an ideal place to implement the exclusive control for sub-sampler $\phi_s$; 501 only exits if it can gain the exclusive control of sampler 4, which means the input sampler $\phi_a$ must be in an inactive state. Otherwise, it will block itself for further processing and wait until $\phi_a$ is inactive. 502 as the AfterMarker is the place to implement the sampling trigger.

After the Marker function TextOut 494 is called, all can be assured that the current software state including the animated output and the current frame number in the left corner is ready to be sampled by the algorithm engine modeler as $\delta(k+i)$ in 503. After the triggering is done, the looping control variable i is decreased by one in 504. The variables k and i both are modeling variables external to the software, where k is the current sampling and i is the current loop count left to control how many state updates to be performed in 505. 505 compares i with zero; value 100 here passed as the argument numberOfStates represents the fact that the algorithm dynamics needs to model the 100 state update exactly, in which 25 of the states are for the footstep animation and 75 for the freeform animation that is programmed by the internal animation engine.

If i is not zero, it will exit the sub-sampler $\Phi_s$ in 507. Then the execution sequence returns back to the Post-Marker processing 495. Since the agent is still in the blocked state, it can't issue the STOP command; after 495, the execution will go back to 491 to start a new cycle of animation. With loop variable i being 0, which means 100 states have been animated, 505 transfers the control to 506 to wake up the agent and suspend itself to allow the agent to synthesize a clicking PlayBiped button command and remove the planted software probes. The suspended action in the probe is necessary to make sure the Post-Marker processing will sense a STOP command. After exiting the probe 502, and entering into 495, which is the Post-Marker processing built inside the animation engine, 495 surely senses that the STOP command has been issued. So instead of going back to 491, after the exact 100 state updates, the internal computation flow comes to an end by exiting totally from the animation loop in 508.

Now, it is known that the software dynamics has advanced 100 states exactly, of which 25 states sampled are modeled for the footstep animation, and 75 for the freeform animation. The whole process may have taken place within a blink of an eye in less than one second or so. The interaction is so compressed that it is impossible for any human intelligence to perform and understand it. However, with the computerized modeling techniques invented here, those invisible software states, a treasure-trove of intelligence scripted in the software's algorithm engine can be observed and modeled in the software dynamics and ready for further simulation and exploration.

Figure 4I:
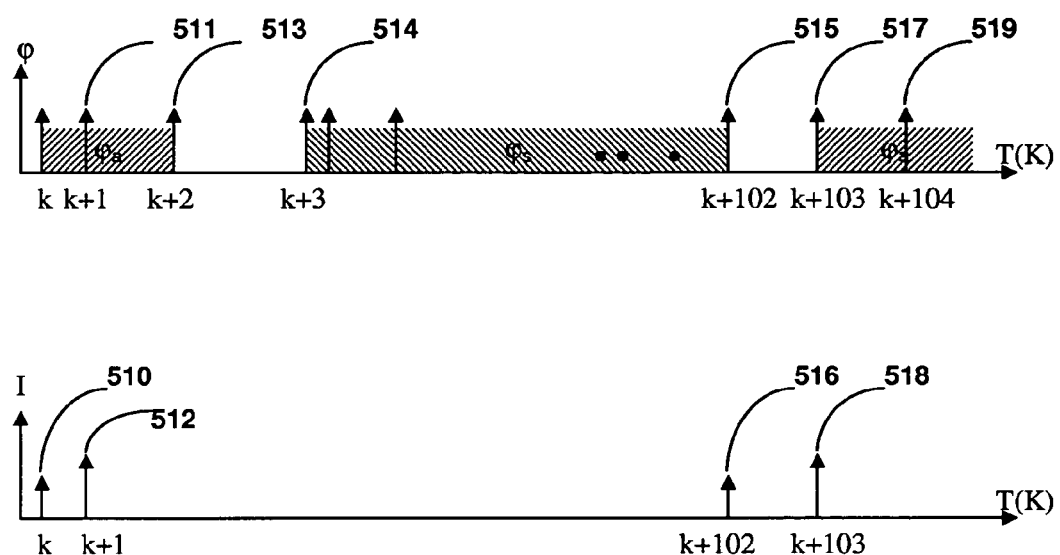
FIG. 4I is the interactive sampling sequence of the biped animation with the planted software API Probes.

Put the full interaction sequence on a dynamic scale as FIG. 4I and here is the sequence of actions,

. . .

MouseDown(k) 510, D(k+1) 511, MouseUp(k+1) 512, D(k+2) 513, sampling by $\phi_a$;

D(k+3) 514, D(k+4), . . . D(k+102) 515, sampling by

MouseDown(k+102) 516, D(k+103) 517, MouseUp(k+103) 518, D (k+104) 519, Sampling by $\phi_a$

. . .

The software sensor that is planted in the modeling process is really a piece of the modeled software implemented by this invention. It is a synchronous device that not only measures the output from a binary computation process in real-time, but also simulates the algorithm engine output in the simulation process. Based on the running mode, it will automatically adapt its model. When it runs in $\phi_D$ in the modeling process, it works as a probe injected into the underlying computation flow to sense the output. When it runs in $\overline{\Phi}_D$ in the simulation process, it works as the modeled device to simulate the algorithm engine output synchronously.

The software sensor is programmed by the same agent A running under both modeling and simulation modes, so the sensor will be activated correctly within the respective computation context. If a sensor has measured the output at $k_i$ in the modeling process, it only needs to be guaranteed to simulate the output at $k_i$ in the simulation process.

Taking the previous character studio animation as an example, in the agent implementation we have a piece of code in java programming,

```
...

playBiped(100);

...

void playBiped(int numberOfStates)

{

APIProbe ap=new APIProbe(numberOfStates);

clickPlayButton( );

ap.probe( );

}

...                                                              (29)
```

APIProbe is the implementation of the software sensor for the API Probe. With numberOfStates as the constructor parameter, it configures the APIProbe to measure numberOfStates outputs from the Marker function when working under the modeling process. After the probes are planted into the internal animation engine D by the constructor, PlayBiped button is clicked. The internal animation engine races to animate as fast as possible. By executing ap.probe( ), the agent A enters into the blocking state to wait until numberOfState outputs is sampled.

When the same java program (29) is working under the simulation mode, the agent executes the same code by calling the function playBiped with 100 states to be simulated. The APIProbe has dual implementations that are to be switched based on the current working mode. By instantiating the software sensor APIProbe with the same parameter that is passed to the constructor as in the modeling mode, the APIProbe will function properly in the simulation even though the probe is no longer driven by the internal animation engine. The logic is fairly direct and simple. After the PlayBiped button is clicked in the simulation, the agent enters into ap.probe( ). Instead of blocking itself as it does in the modeling mode, it drives the simulator to simulate the numberOfState of state transitions by rendering the sampled numberOfState of states to the screen. The parameter numberOfState happens to be 100, the same number that is passed by the same function call playBiped in the modeling mode.

Controlling the model of the software $\overline{S}$ by the same agent A again in the simulation itself embodies and preserves the structure and model knowledge about the underlying software S. That dynamic knowledge can be reconstructed within the execution flow of the agent in the simulation. For example, there may be tens of thousands of sampled states in the biped animation, of which 100 states are controlled and simulated by the APIProbe. Each state is intrinsically modeled with the dynamic information that is related to the biped animation. For example, between the 25th state and the 26th state, there is a mode transition from the footstep to the freeform animation predictably. Each distinct state is programmatically accessible state-by-state for any further development.

The only issue left is how to synchronize with the sampling sequence and to make sure that when ap.probe( ) is executed in the simulation process, it starts at the exact same sampling $k_i$ as in the modeling process. It is known that the sampling domain K is driven out by the agent in both modeling and simulation modes. The code segment (29) in the agent A is invariant in both processes, so the sampling $k_i$ is invariant in both processes, too. The sampling $k_i$ (simulation) that starts simulating the animation engine output by ap.probe( ) when it works under the simulating mode is mapped exactly from the sampling $k_i$ (modeling) when the first output was sampled under the modeling mode.

The present invention deal with the binary software in which there is no mechanism available to gauge its every detail of the internal implementation. However, every bit and state as a response to an agent command is fully accountable in the dynamic system setting. Those interactive activities that may be powered by the sophisticated algorithms with billions of calculations all can be represented and ultimately, simulated precisely and accurately in the invented software dynamic system.

6. Software Actuator Model

The input/output characteristics of the software engines that are modeled both in modeling and simulation processes are built upon primitive input commands I(k), such as a mouse click, a key press, or an action physically external to the software. Obviously, the agent cannot be programmed in such a detail. What is needed here is a highly structured programming interface that isolates the agent from the implementation detail of the controlled target, which is powered by either the real software S or the model of the software $\overline{S}$.

It is well known that the software has an interactive user interface built to adapt the input actions from outside. It is called the Graphical User Interface (GUI). The purpose of the GUI is to facilitate the interaction between the software and its user by providing an intuitive, graphic interface. When running in the modeling process, the GUI is powered by the real software. Each graphic region is identified by a window handle or an item handle. When running in a simulating process without the real software presence, these handles are invalid. So the GUI models do not work under the simulation model.

In system science, it is a well established practice that an actuator is used to connect the controller to the plant so that the controller is hidden from the implementation details of the plant. Based on the inputted high level commands from the controller, the actuator will translate the command to direct action that matches to the plant, such as injecting fuel or opening/closing a valve.

The agent programming is based on the models of the work-flow and the work-space controllers that directly match the controlled target. It abstracts an on-going interactive process in a flow programming model. As a part of an effort to model and preserve the control enabling structure of S, a new software device between the controlling flow and the controlled target is invented to transport the flow commands to the input terminals of the controlled target. The new software device is called the software actuator.

The benefit of connecting the agent controllers to the controlled target through the software actuator is to keep the agent representation invariant in both the modeling and the simulation while the interaction between the agent and its controlled target is preserved. In other words, the same agent program A can be used to drive the controlled target, which is the software S in the modeling process and the modeled software S̄ in the simulation process.

The software actuator modulates the interaction between the agent and the controlled target, through which the agent controllers apply the high level commands to directly affect the target's behavior. Just as there are two classes of the agent controllers, the work-flow controller and the work-space controller to drive the controlled target, there are two classes of the software actuators implemented, which are the work-flow actuator and the work-space actuator.

The input to the software actuator from the agent is the programmable commands such as "clickPlayButton", "clickStopButton", "pressKey" and so on as work-flow commands for the work-flow actuator, and click(x,y), drawModel(.) and so on as work-space commands for the work-space actuator. The output from the software actuator to the controlled target is primitive actions such as MouseClick(x,y), MouseTo(x,y) and so on.

The software actuator plays dual roles just as the software sensor does. In the modeling process, it serves as a modeler as well as an actuator. Besides translating the agent commands and pumping out the primitive commands to control the real software as an actuator, it identifies the model of the actuator itself while being powered by the software so that it can be simulated in the simulation process where the real software is not available. In the simulation process, the modeled actuator simulates its designed functions faithfully—facilitating the interaction between the agent and the simulated algorithm engines without real software presence.

The software actuator must be built on a generic representation that can be programmed validly in both processes. In the agent programming, the work-flow controller models its controlling commands against a valid region that can be tagged with some unique attributes such as a button caption, a menu item text and so on. For most of the time, the region is represented by one or more rectangles, such as a button, a menu item and so on. In the modeling process, the region can be constructed from the handle that is to be identified based on a unique tag passed by the agent. After the region has been found, it is saved based on the tag. In the simulation process, the saved region can be retrieved based on the same tag passed by the agent to enable the software actuator to simulate the valid region.

Take a software actuator model for PlayBiped button in (29). The function call, clickPlayButton( );

is to be translated into,

ButtonActuatorModel(MOUSECLICK, "Play"); (30)

Figure 5A:
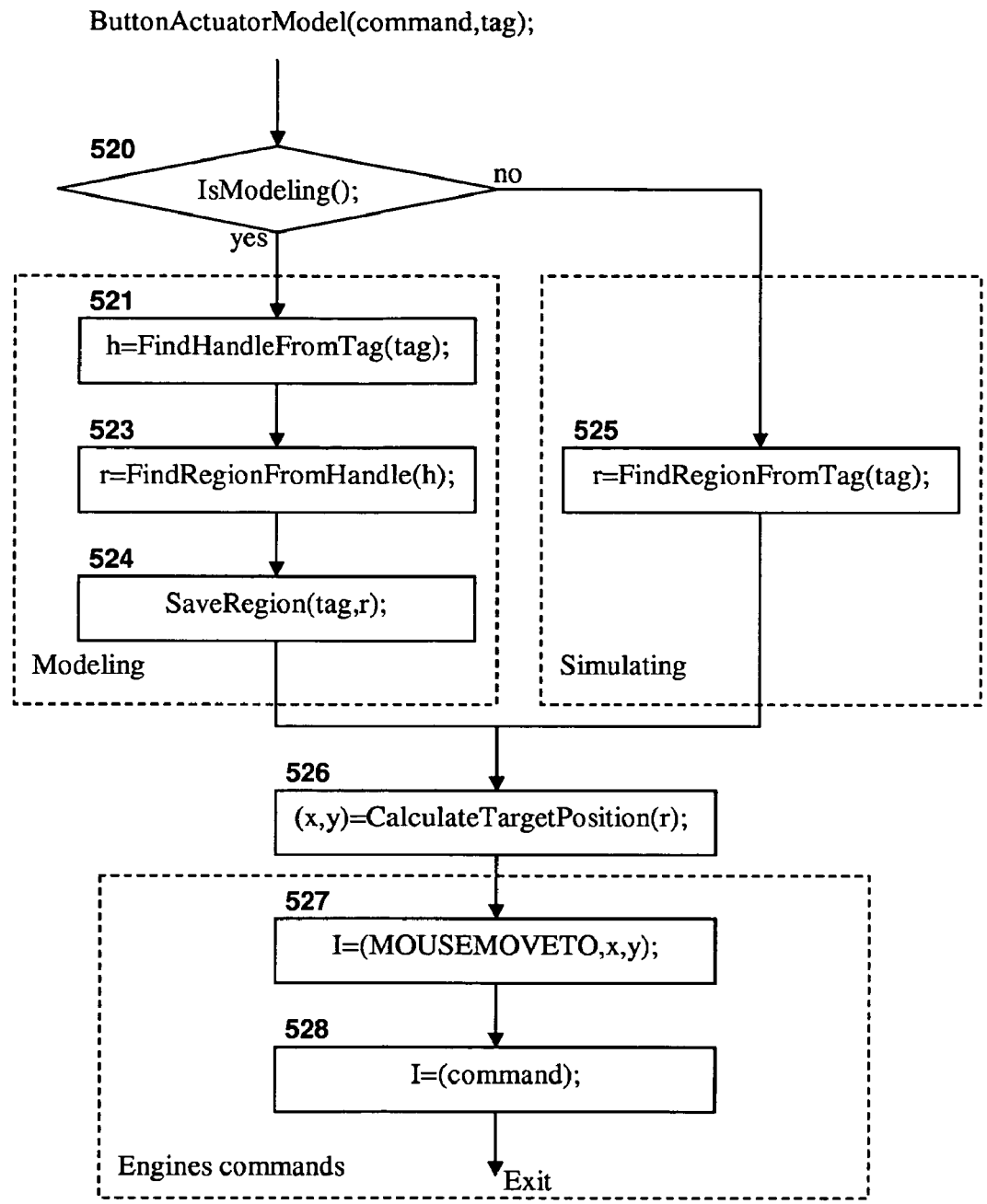
FIG. 5A is the logic of the software actuator ButtonActuatorModel working in both modeling and simulation processes.

The software actuator ButtonActuatorModel is implemented in FIG. 5A. 520 first tests if it is working in the modeling process, and if so, it calls 521 FindHandleFromTag (tag) with the string "Play" as the tag, to find a handle h based on the supplied tag name "Play". The handle h is the Play button window handle. After handle h is found, 523 finds a valid region r based on the handle h; here it happens to be the rectangle of the button. In 524, it saves the rectangle with a tag name "Play". Now let's go back to the simulation mode. If 520 test is no, 525 function calls FindRegionFromTag(tag) with the string "Play" as the tag to retrieve the rectangle r that was saved in the modeling process. No matter what mode it is working under, now 526 has the valid rectangle where the mouse can be driven to click on. It calculates the target position (x,y), which is the center of the rectangle r. 527 issues a primitive command to move the cursor to the calculated target position (x,y). After the cursor has moved to (x,y), 528 sends another command that is MOUSECLICK passed in (30) to click the left button at the current cursor position (x,y).

Throughout the modeling and simulation process, a textual item is needed to uniquely tag the valid region. The tag serves a dual purpose. In the modeling process, the tag is used to identify a handle powered by the software. The most obvious tag is the item's text name that can be retrieved by some general purpose windows APIs. Unfortunately, this is not always the case, since many items are custom-drawn without a textual name exposed in the general APIs. Also the item's text name may not be unique. The present invention invents a new tag system to uniquely identify any handle based on a parent-children-siblings (PCS) relation. The PCS relation is pre-coded by the underlying software implicitly from the sequence of the object creation such as windows or accessibility objects. Once the software is developed, it is unique at run time. The PCS relation is valid at the item level as well as the window level, such as an item in Menu, List box, List view, Tool bar, Tree view, Combo box and so on.

Figure 5B:
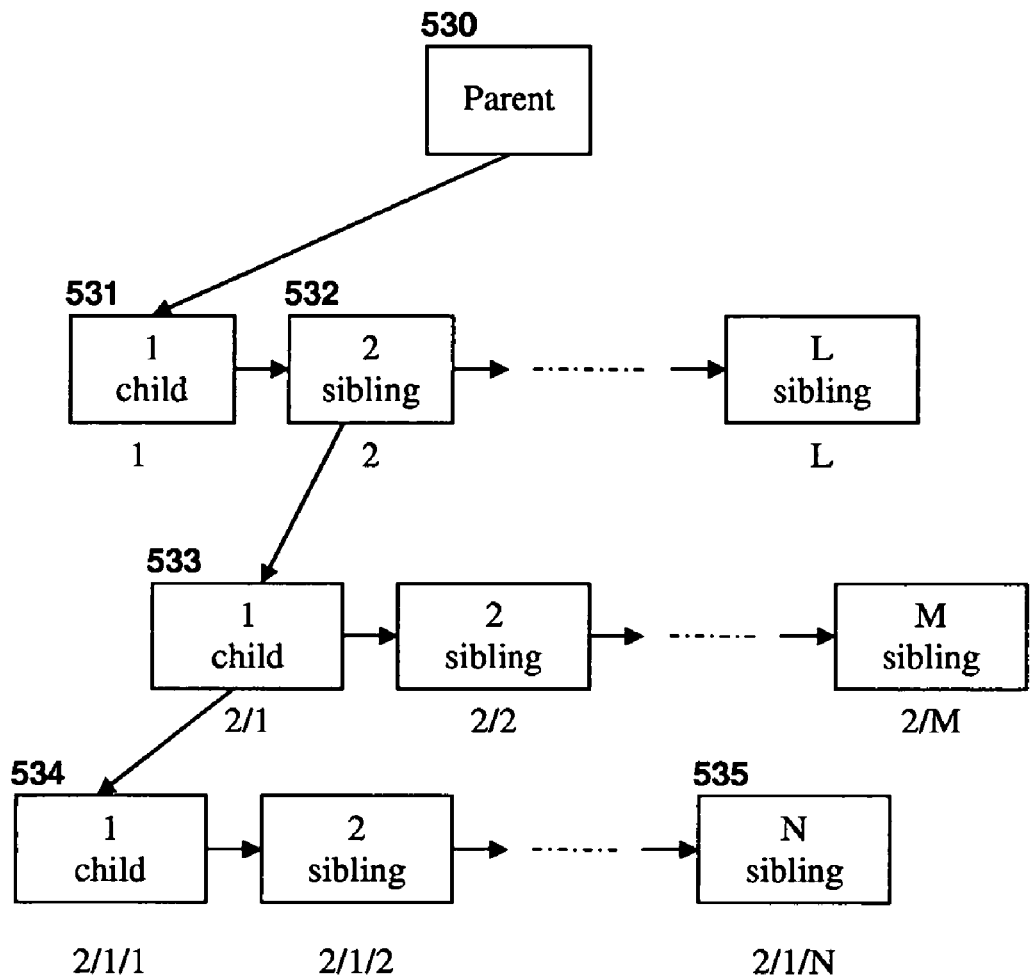
FIG. 5B is the Parent-Child-Sibling (PCS) scheme to identify uniquely a graphical user interface item.

In FIG. 5B, 530 is a parent object, usually a top level window such as a dialog window or the software's main window that is readily known from the operating system. Any handle under the parent is tagged uniquely by a path string "i/" where '/' is a terminal character to designate the next level of parent-child relation. Given the parent handle 530 and the tag string, the child item handle can be found by traversing the PCS relation graph. For example, in order to identify the handle 535 that has no textual name available, it needs to rely on the PCS relation string "2/1/N" to tag it. Calling FindHandleFromTag ("2/1/N"), from the known parent handle 530, the function can find the first child handle 531 of 530. Then from the top number 2 in the tag, it walks to 532 as the second sibling of 531. After walking, "2/" is discarded from the tag. The new tag becomes "1/N". Based on the handle of 532, it can find the child handle 533. Since the sibling is 1, it has no need to walk to the next sibling. Discarding "1/" from the tag leaves the new tag "N", 533 as the parent walks down to the next level to find the child 534. Now, the next sibling is the number N, by walking N sibling objects, it reaches 535 and gets the desired item handle.

The software actuator implementations can be reused. There are two classes of GUI in general windows programming. One is system-standard controls such as the dialog box, button, edit box, combo box, list box, menu, and so on that are supplied by the operating system; the other is custom-built controls that are application-specific. The first class of the software actuators is the system actuators that are modeled after the operating system-supplied standard controls, which can be reused universally for all interactive software modeling and simulation. The second class of the software actuators is the custom actuators that are modeled after the application-specific controls, which can be reused for that specific software modeling and simulation for various agent strategies.

Figure 5C:
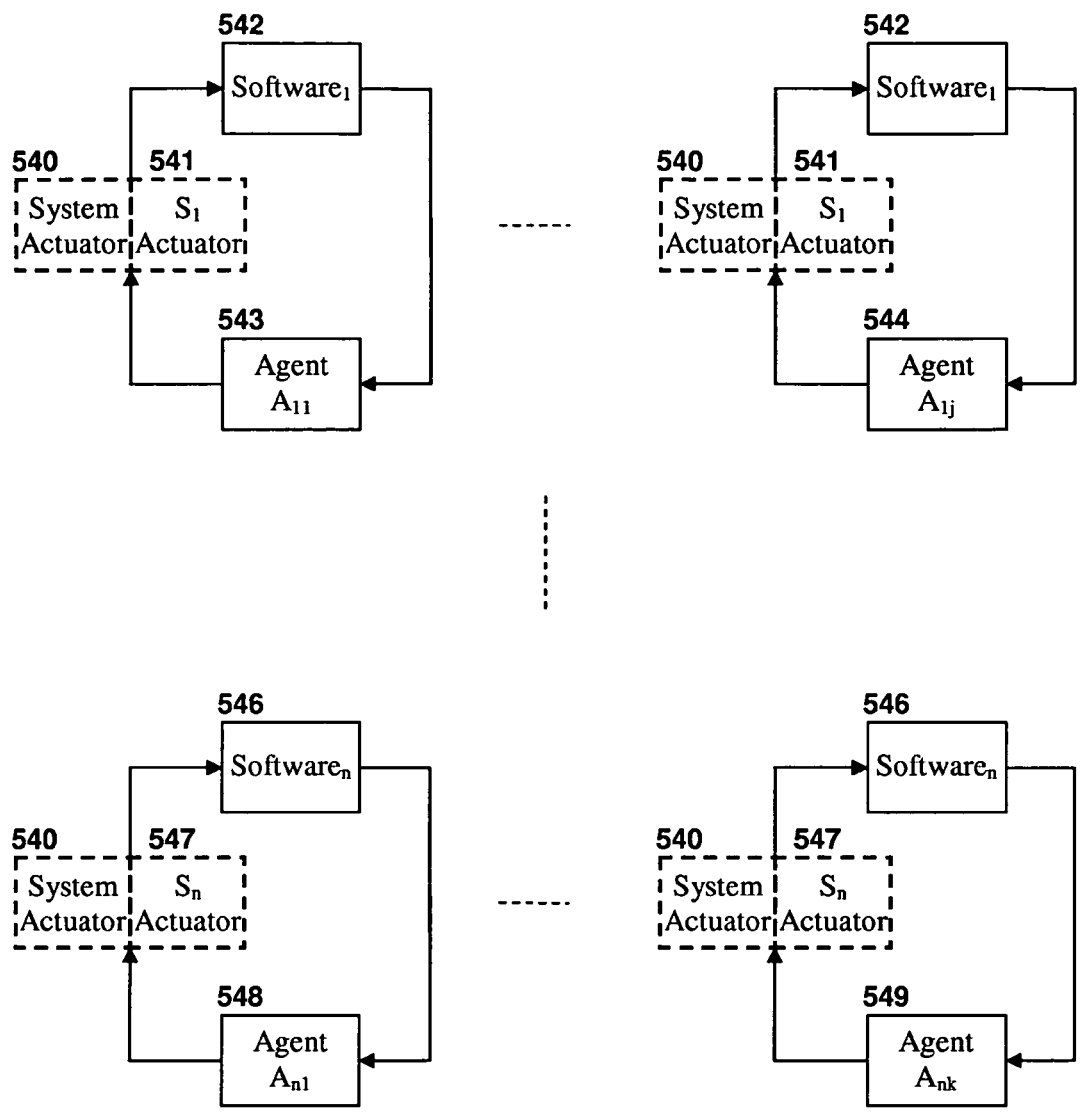
FIG. 5C is the reusing of the software actuators.

In FIG. 5C, the present invention has built the system actuators 540 that can be reused universally for any combination of the software and the agent in the modeling and simulation. In the vertical direction, different software applications can be modeled and simulated with 542 and 546 representing various targeted software. With each software, different custom software actuators such as 541 and 547, may need to be developed individually. But in the horizontal direction, the same software with different agent strategies 543, 544 for the software$_1$ and 548, 549 for the software$_n$ can share the same custom actuators 541 and 547 respectively.

Since the software actuator is a direct modeling of the GUI control that can induce the internal computation from the algorithm engine, the software actuator can be aggregated with the software sensor to gate that internal computation flow. FIG. 5D is a sketchy implementation of PlayBiped button actuator in Java programming. 550 is the class declaration extending the PlayBiped button on the standard button actuator model that has a rectangle as the valid region to be acted upon with the MOUSECLICK as the valid command. 551 is the constructor of the actuator. It encapsulates the button textual name "Play" in the model to isolate the agent programming from the implementation details of the underlying actuator. 552 is the method to implement playBiped(int numberOfStates) in code (29). 552 models the causality of the next (numberOfStates+4) software state transitions. It first instantiates the APIProbe with the button actuator instance itself 553 as a constructor parameter. It will give the APIProbe the target information needed in order to synthesize a STOP command programmatically in real-time. Next it calls into 554 that implements the default command, clicking the left button at the target position that is calculated either from the handle powered by the software in the modeling or simulated from the modeled data in the simulation. After the button click command 554 is delivered, the agent executes 555 that will suspend itself to allow the planted software probe to sample the programmed number of states in the modeling process. After numberOfStates transitions is performed, the probe will synthesize the STOP command programmatically to have the animation engine stop at the moment in the modeling process, but reconstruct a click action on the button in the simulation.

With the programmed support of the software actuator, the agent only needs two lines of code to implement the complicated causal dynamics, which are invariant under both processes of modeling and simulation.

PlayButtonActuator pb=new PlayButtonActuator( );

pb.playBiped(100); (31)

The software actuator functions more than just as the model of GUI control; it implements the mechanism to gauge and control the underlying software and simulate it in a unified framework.

Figure 5E:
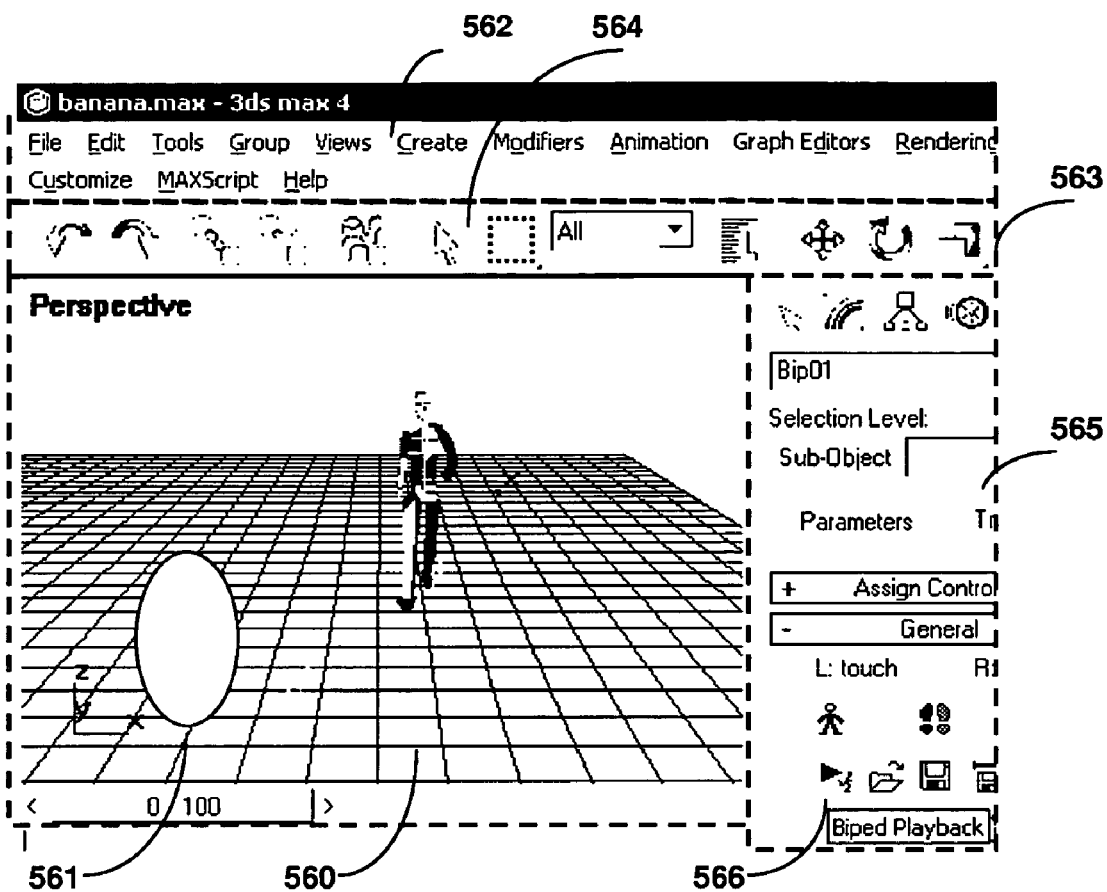
FIG. 5E is the exampled structured software output space.

The functions of the software actuator are not only to provide a high level interface for the agent programming to control the target, but also to structuralize the software output space based on the actuator context. Referring to FIG. 5E, the current output space is structured in four software actuator contexts. 560 is the work-space actuator for the design space that maps directly to the agent work-space controller modeling. The commands from the controller are in the form of the functional or coordinate (x,y). 561 is an ellipse that is generated directly from the functional controller command drawEllipse(x,y,w,h).

The work-space actuator implements commonly used (modelable) functions such as Bezier, Ellipse and so on to generate a list of coordinates that are calculated based on passed parameters. From the calculated coordinates, it drives the mouse along to deliver primitive actions. The implemented functions calculate the coordinates accurately no matter what process currently is running.

562 is the actuator for the menu bar and its pull down menu that model access to the menu actions. 563 is the actuator for the toolbar where it hosts an array of buttons. For the agent controller, reading the output value o(x,y;k)=(238, 204, 85) inside the button region 564, means that the button is down no matter what mode it is working under. If the designed action for the agent is to select that button, then based on the feedback information from the actuator context, it must skip that action. 565 is the actuator for the command bar where it contains numerous buttons such as PlayBiped 566. 560 is the work-space actuator for the work-space where the design function is carried out. When the agent clicked the PlayBiped button in 566 at sampling k, the output inside 560 will transit from the state to the state in the sequence that can be best quantified as $\{o(rworkspace;k+3+i); i\epsilon[0,n)\}$.

With the software sensor installed by the software actuator, the output structured by the work-space actuator 560 can be modeled as a highly correlated state-in-time-over-space. Pixel by pixel, frame by frame, in either modeling time powered by the real software S or simulation time powered by the modeled software $\overline{S}$, the software dynamics no longer evolves on a monolithic pixel space but on the structured multiple sub-spaces where the input/output causality is orderly observed and reconstructed.

The benefit of the structured input/output model implemented by the software actuator is not merely to keep the agent invariant in both modeling and simulation, but also to embed the structures in an otherwise lifeless software model $\overline{S}$. On the time dimension, the software actuator models are cycling through the creation and destroy events that are in-sync with the transition of the software dynamics over the sampling domain K. The events of a dialog created, a button clicked, themselves embody the evolving dynamic information of the software dynamics. On the space dimension, the pixel-based output space is partitioned based on the regions and actionable regions defined by the software actuators. By integrating the regions with the dynamic events in the software actuators, it structures a running context on the software dynamics.

Figure 5F:
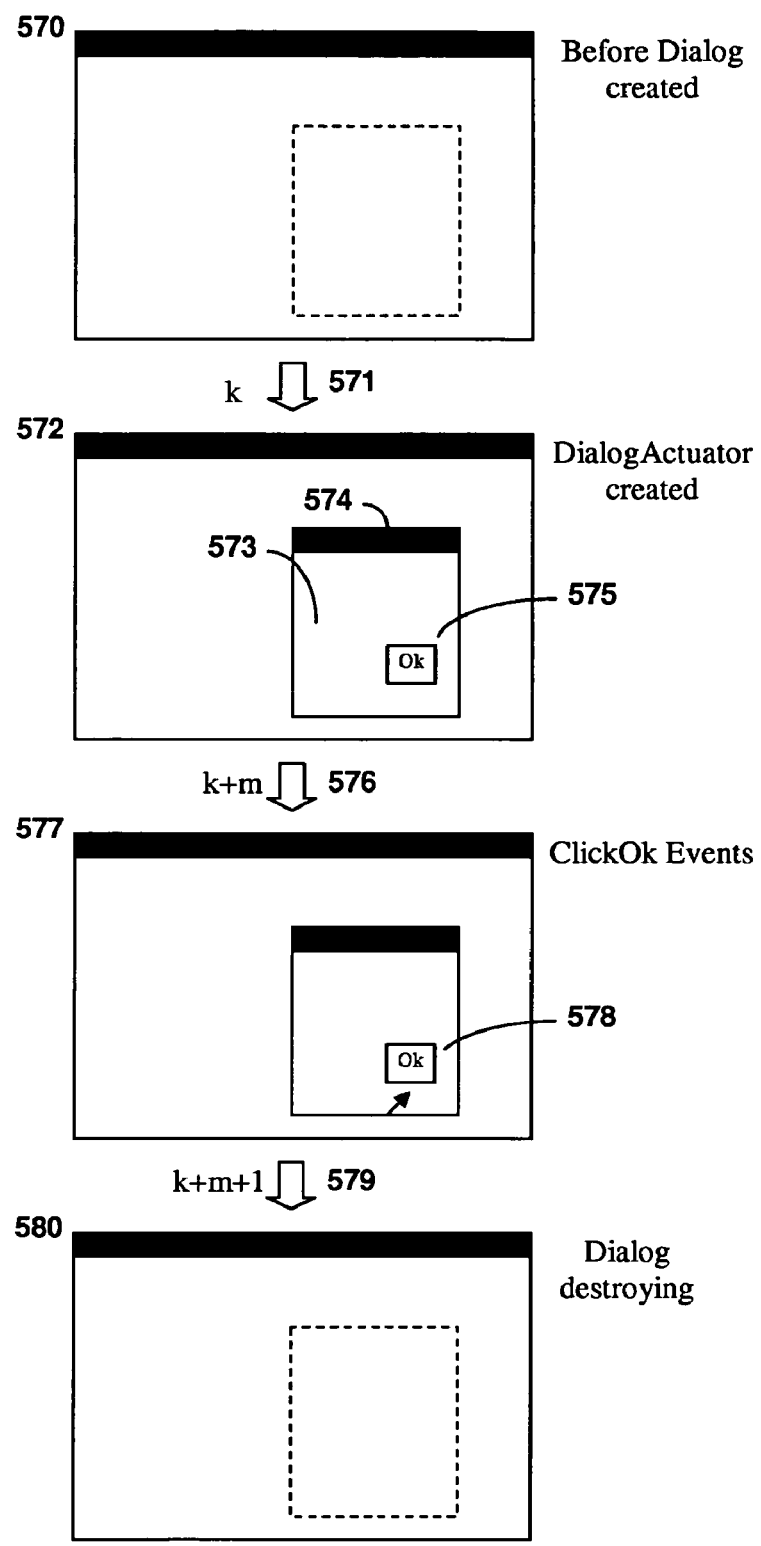
FIG. 5F is the reconstruction of the dynamic running context from the modeled software actuators in the simulation process.

The dynamic running context can be reconstructed from the modeled software actuators over the sampling domain K as well as in the partitioned output space. Referring to FIG. 5F, 570 is the running context before the dialog actuator is created. Assuming the current sampling is k as 571 and the software state transits to O(;k+1) in 572, which can be partitioned into multiple parts. One is the actuator region 573 that is the rectangle of the dialog modeled. Inside the dialog actuator region 573, it can be further partitioned; for example, 574 is a caption rectangle, and 575 is an actionable (clickable) region and so on. After spending m sampling as 576, the software state transits to O (;k+m) in 577, and the agent needs to click the OK button 578. That high level command clicking the OK button received from the agent is translated into a sequence of low level actions such as a mouse move to the center of the button, and a mouse button down and up. The sequence models and preserves where (x,y), when (k+m) and how (command) the actions are carried out with such a detailed and precise information. The high level command also adds more contextual information about what actions are to be performed, which happens to be clicking the OK button. From that contextual information, the running context telegraphs that at the next sampling k+m+1 as 579; the updated software state O(;k+m+1) 580 will have something to do with the event of the dialog destroy since the OK button has been clicked. The causality can be inferred even though it is simulated without the real software powering it.

Through the software actuator, the control enabling structure of the software S under control of the agent A is modeled, identified and simulated. The software actuator model is essential in preserving the control enabling structure seamlessly across the processes and keeping the agent A invariant in the software modeling and simulation processes. Based on the control enable structure, the agent A is hidden from the implementation detail of its driving target, which is a live software S when modeling, and a simulated software model $\overline{S}$ when simulating.

The knowledge of how an actuator behaves or how it is modeled or simulated is encapsulated in the actuator implementation rather than in the agent A. What the agent interfaces to the interaction is the name-tagged high level model reusable and portable across the modeling and simulation processes to keep the controller-plant topology invariant in both modeling and simulation.

Figure 5G:
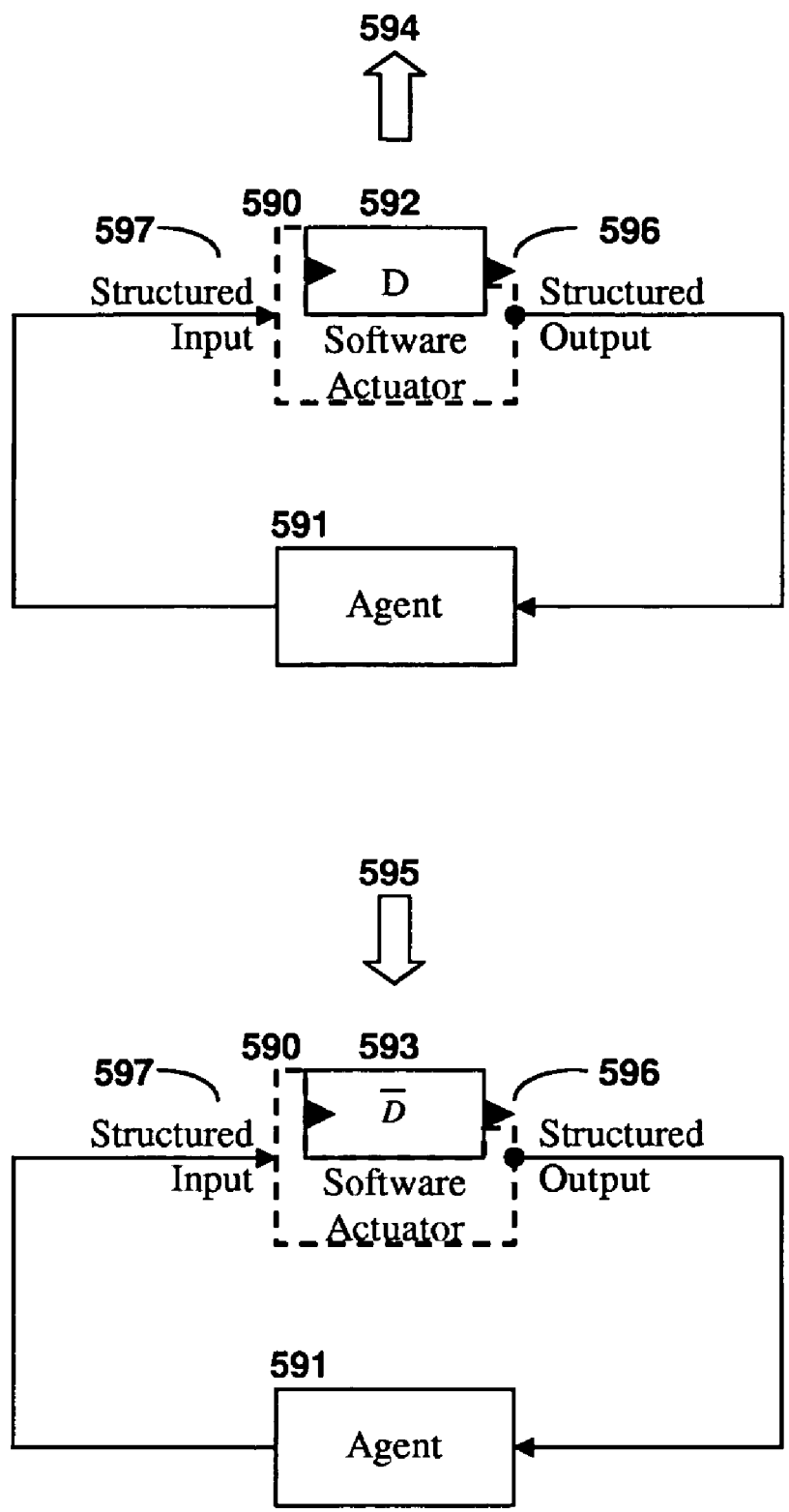
FIG. 5G is the description of the pluggable interface of the software actuator for the modeling and simulation processes.

The agent A acts as the controller programming to the software actuator rather than to the underlying algorithm engine D and D directly. The agent A senses its feedback input from the structured software output space. There is another advantage in modeling and preserving the control enabling structure in the software actuators. In referring to FIG. 5G, the software actuator 590 serves as a programmable interface between the controller and the plant. The agent A as an independent piece of software controller 591 is connected to the software actuator in both modeling and simulation processes. First, the algorithm engine D 592 is plugged into 590 through system and custom software actuators interface in the modeling process in order to identify $\overline{D}$. In the process, the agent A supplies the high level commands 597 to control the targeted D and gets the structured feedback 596 in real-time from 590 to make online decisions. Once $\overline{D}$ 593 has been identified, the switching from the modeling to the simulation can be performed in a modular way by pulling out D as 594, and plugging in $\overline{D}$ as 595 while keeping the same agent connected to the same software actuator models. When running in the simulation, the agent A supplies the same structured commands 597 and gets the same structured feedback 596 in real-time from the same actuator models 590 interfaced to it and to make the same online decision even though the internal implementation of the actuators have been switched, and the engine to power the controlled target is changed.

7. Re-sampling of Modeled Software Dynamics

In the modeling process, the agent A drives the software working as a device out a transition function $\phi$ and a sampling domain K that clocks the device while the process is being observed by the modeler in real-time. The sampling domain K is constructed by the agent commands and the software sensors that are planted by the software actuators that are controlled by the agent ultimately. The sampling K domain is non-uniformly but predictably modeled in the sequence of the agent execution. By connecting the same agent A in the simulation with the modeled software $\overline{S}$, it guarantees that the same sampling domain K will be reconstructed with the identical causality relationship.

A re-sampling or a causality-preserved transformation C on the sampling domain K is called valid if the order relation of K is preserved under the transformation C, that is if $k_1 < k_2$ in K, then $C(k_1) < C(k_2)$ in K'. The re-sampled domain K' preserves the causality of the modeled software dynamics (9).

The Compressing and Stretching are two of the most used causality-preserving transformations. In the modeling processing, one state transiting to another state may take minutes to evolve, such as rendering a complicated scene in 3-D software. With the Compressing transformation, the transition from $O(k_i')$ to $O(k_{i+1}')$ can be compressed into milliseconds/seconds for the simulation purpose. Another extreme is that the state transiting evolves so fast, say 100 transitions in less than a second that the process is beyond human comprehension. With the Stretching transformation, the transition from $O(k_j')$ to $O(k_{j+1}')$ can be stretched into seconds for better visual understanding state-by-state.

Figure 6A:
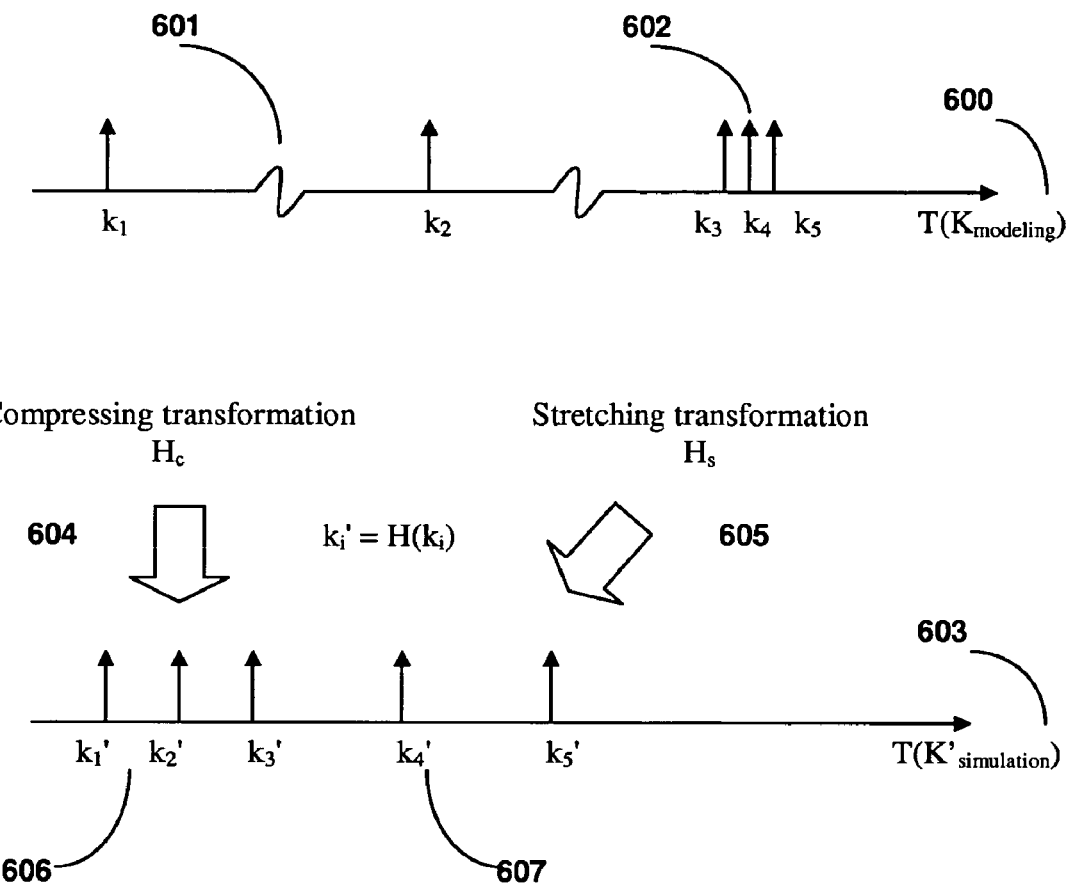
FIG. 6A is the re-sampling of the simulation process.

In FIG. 6A, 600 is the sampling domain K constructed in the modeling process, the state from $k_1$ to $k_2$ 601 and $k_3$ may take a long time to transit for the intensive internal computation from the algorithm engine D, but from $k_3$ to $k_4$ 602 and $k_5$, it may take less than 10 milliseconds. Obviously, the original process lost its interactivity since it is impossible for a human user to wait minutes and then catch millisecond changes on the computer screen. It is only made possible by the modeler that has the capability to observe the wide range of the software state changes in a mechanized way.

After the modeling process has been completed, the simulation needs to be executed on a transformed sampling domain K' as in 603. 604 is a compressing transformation where the durations between the sampling $k_1$, $k_2$ and k are compressed into the durations of $k_1'$, $k_2'$ 606 and $k_3'$ instead of minutes as of 601, the state transitions are simulated in seconds or milliseconds.

605 is a stretching transformation where the durations of the sampling $k_3$, $k_4$ and $k_5$ are stretched into the durations of $k_3'$, $k_4'$ 607 and $k_5'$; the states transition is simulated in seconds instead of milliseconds as of 602. With the transformations $C_c$, $C_s$, the interactivity is repaired and enhanced in the simulation process.

The causality-preserved transformations are implemented in the software probe. Taking the code segment (29) as an example, in the modeling process, suppose that the method probe( ) drives out a sampling sequence as depicted in FIG. 6A, 600, by the animation engine D. In the simulation process, the method probe( ) not only simulates 100 state transitions but also re-samples the states with the compressing and stretching transformations as in FIG. 6A, 603 depicted. Suppose the desirable sequence of durations is, { . . . , $T(k_2')-T(k_1')=0.1$ s, $T(k_3')-T(k_2')=0.4$ s, $T(k_4')-T(k_3')=1$ s, $T(k5')-T(k4')=0.5$ s, . . . }

Figure 6B:
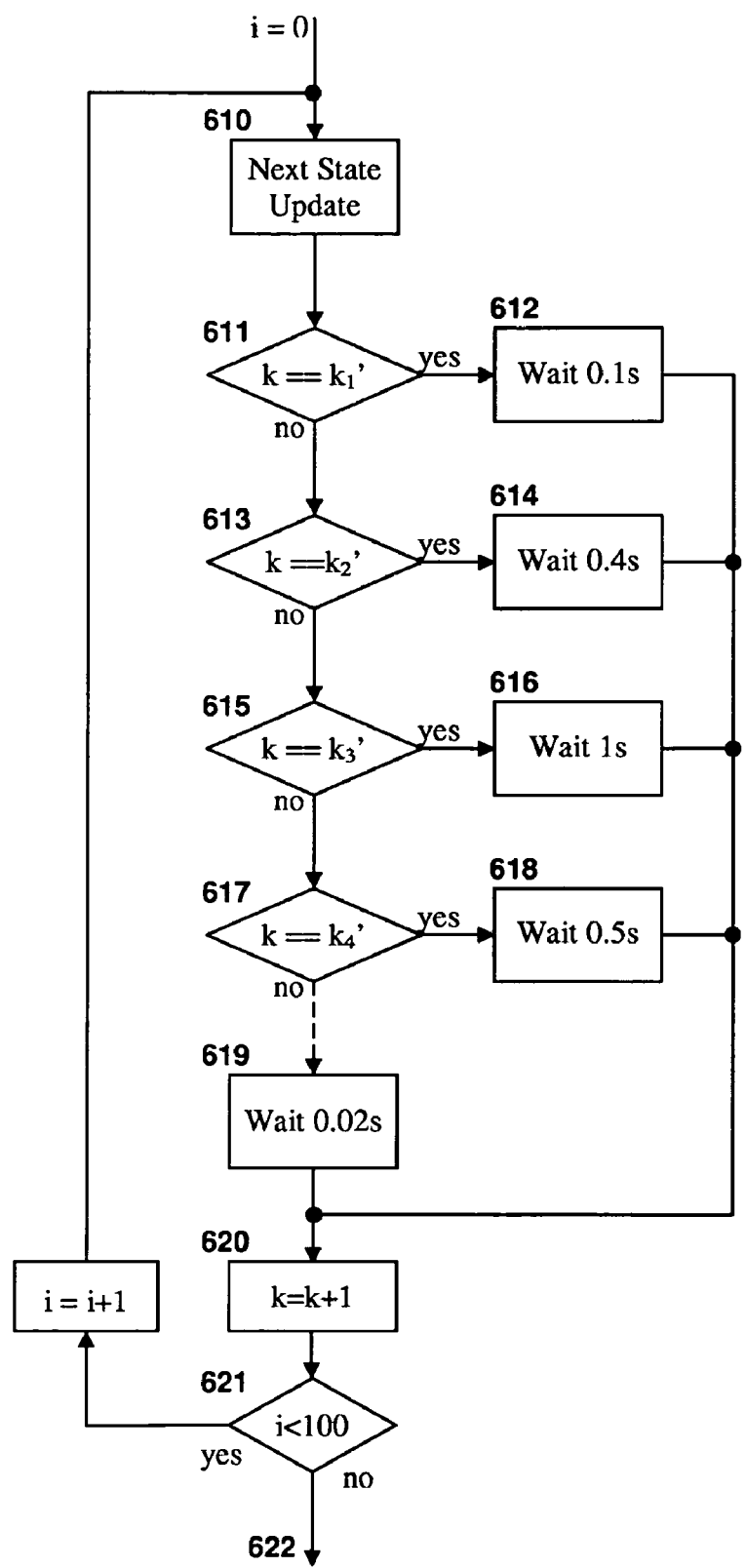
FIG. 6B is the implementation of the re-sampling in the function probe under the simulation mode.

FIG. 6B is the implementation of the re-sampling in the function probe under the simulation mode. When entering into probeo, 610 updates the software state $O(k)$ first. If current sampling k equals to $k_1'$ in 611, with $O(k_1')$ having been updated, it is forced to wait 0.1 s by executing 612; after 612 it adds k one and loops back to 610 to update the next state $O(k_2')$. So between $O(k_2')$ and $O(k_1')$, it is 0.1 s. Now in 613, if k equals to $k_2'$ after waiting 0.4 s in 614, it adds k one and loops back to 610 to update the state $O(k_3')$. The logic of 611, 612, 613, 614 is to effectively compress the minutes of computation time in the modeling process to a more desirable 0.1 s and 0.4 s per se in the simulation time. In the next execution in 615, if k equals to $k_3'$ it waits for 1 s in 616, then loops back to 610 to update $O(k_4')$. In 617, if k equals to $k_4'$, it waits for 0.5 s in 618, then loops back to 610 to update $O(k_5')$. For all other samplings, they will fall through the checks and wait for 0.02 s in 619, which represents a nominal simulation rate of 50 states/second. Here, the logic of 615, 616, 617, 618 is to stretch the fast state transitions in the order of milliseconds in the modeling to 1 s and 0.5 s for detailed study in the simulation. After the state is updated, 620 advances the sampling by one step. When the counter i equals to 100 in 621, it exits the method probeo in 622. Of course, if a re-sampling in a uniform rate like 619 is warranted, the logic can be simplified into one wait loop.

With the transformations, the simulation sampling domain K' becomes a programmable bus driven by the programmable agent A. The K' domain can be extended to add more payloads and contents with the only constraint that the extended K' must preserve the same causality as the original modeling domain K.

8. Simulation of Modeled Software Dynamics

After the modeling process is performed and the cursor engine model $\bar{\Phi}_C$, and the algorithm engine model $\bar{\Phi}_D$ are identified, the modeled engines are combined to replace the real software in the simulation of the software S, the human intelligence that is encapsulated in the agent A and their interaction in the software dynamic system (9).

Figure 7:
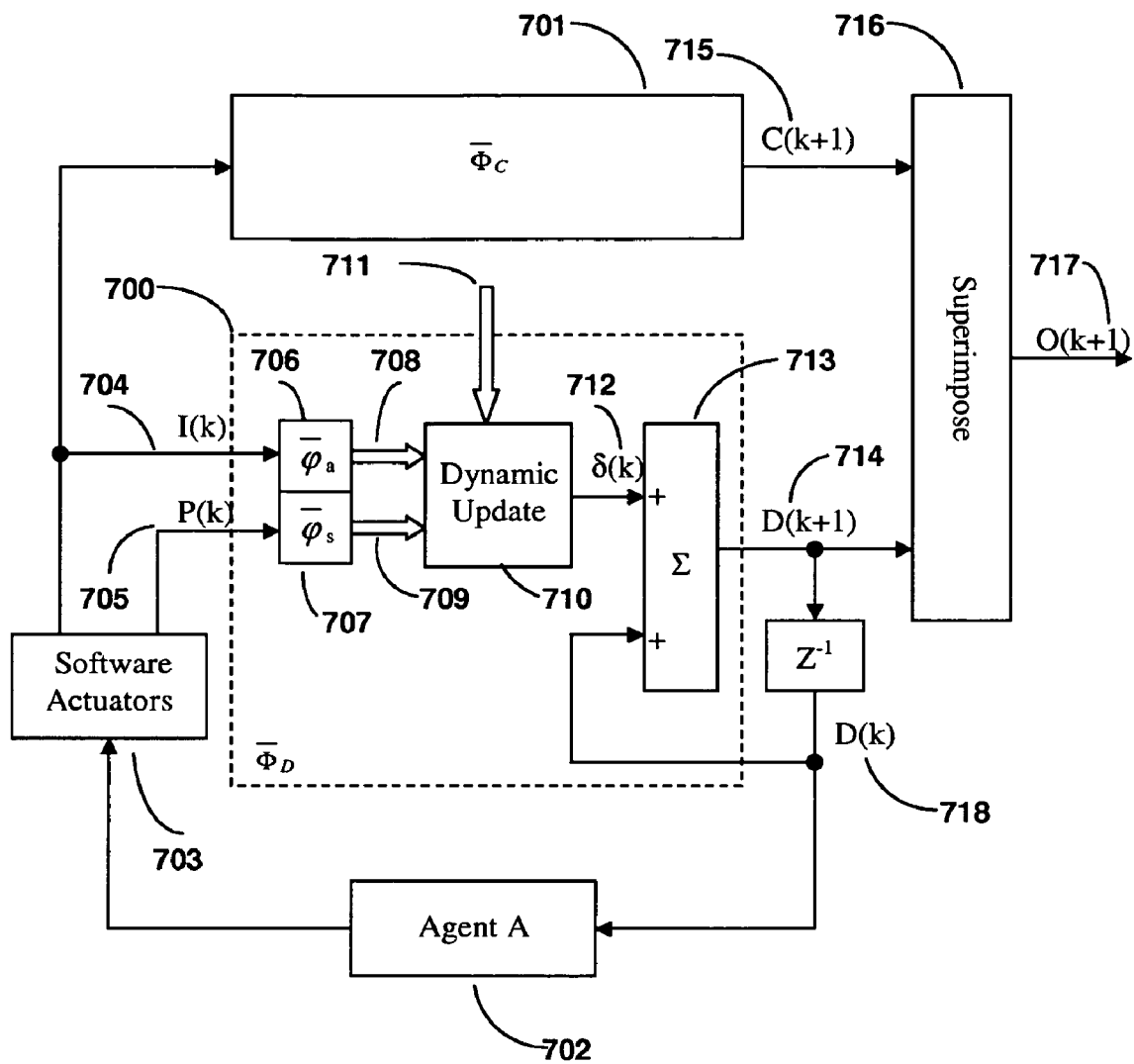
FIG. 7 is the description of the simulated software dynamic system.

In FIG. 7, the modeled algorithm engine $\bar{\Phi}_D$ 700 simulates the algorithm engine $\phi_D$, and the modeled cursor engine $\bar{\Phi}_C$ 701 simulates the cursor engine $\phi_C$. Both models are controlled by the agent A 702 through the software actuators 703 that are fully modeled and identified in the modeling process. Outputs from the modeled software actuators 703 are divided into two components; 704 as the simulated input commands I(k), and 705 as the simulated software sensor triggering signal that models and simulates the event that the internal computation unit is called before or after.

704 is the simulated input terminal to accept the low level primitive input commands I(k) that are fed directly to the simulated input of the modeled cursor engine 701 and the simulated input of the modeled algorithm engine 700.

The input of the modeled algorithm engine is directly connected to the simulated direct input and output sampler $\bar{\phi}_a$ 706 to simulate the direct input and output sampler $\phi_a$ as defined in (25). The sampler $\bar{\phi}_a$ 706 is driven by 704, the same low level primitive input commands I(k) that drive the sampler $\phi_a$ in the modeling process. Instead of being triggered to measure the software states as $\phi_a$ does, the output of $\bar{\phi}_a$ 708 reverses the process by controlling the Dynamic Update 710 to sample the updates from the external source 711, in which the software updates sampled in the modeling process is stored. 711 can be controlled to feed locally or remotely.

The simulated sampler $\bar{\phi}_a$ 706 is implemented symmetrically with respect to the sampler $\phi_a$. Any input command that leads to the update being sampled by the algorithm engine modeler δ under control of $\phi_a$ in the modeling process, will sample the same update from the external source 711 by the Dynamic Update 710 under control of simulated sampler $\bar{\phi}_a$ 706 synchronously.

After the output responses from the input commands have quieted down, the software probes aggregated inside the actuators 703 begin execution. The software actuator output P(k) 705 models every sampling event, after or before the internal computation unit of the algorithm engine is called, and rightfully simulates every occurrence of internal computation by calling the simulated internal computation sampler $\bar{\phi}_s$ 707 to sample a update. The output 709 of $\bar{\phi}_s$ 707 controls the Dynamic Update 710 to update the states from the external source 711, such as local files, and the Internet servers.

The simulated sampler $\bar{\phi}_s$ 707 is implemented symmetrically with respect to the sampler $\bar{\phi}_s$, also. How many state transitions that are expected to be triggered by the internal computation flow and programmed in the software probe in the modeling process, will be simulated to sample the exact same number of state transitions from the external source 711 by the Dynamic Update 710 under control of simulated sampler $\bar{\phi}_s$ 707 synchronously.

The Dynamic Update 710 coordinates the streaming activities from local or remote sources such as the Internet servers based on the progression of the modeled algorithm dynamics. The Dynamic Update 710 controls and times the transition of the modeled software states, which in turn is controlled by the agent 702 through the software actuators and synchronized with simulated samplers. The output of the dynamic update engine 710 is δ(k) 712.

Since the modeled algorithm dynamics can be expressed as, $$D(k+1)=D(k)+\delta(0);$$

and updated recursively as, $$D(1)=D(0)+\delta(0);$$

$$D(2)=D(1)+\delta(1);$$

...

$$D(k+1)=D(k)+\delta(k);$$

So the next state output 714 as the simulated output of the algorithm engine, can be reconstructed from the current state D(k) and the sampled update δ(k) 712 by 713, which serves as the special-purpose digital integrator. 713 adheres to the definition of (23) in calculating its output D(k+1) 714.

Now with the modeled algorithm engine outputs 714 in the background, the modeled cursor engine $\bar{\Phi}_C$ 701 reconstructs its cursor state from the modeled cursor data structures. Based on the current sampling k, 701 retrieves the cursor information from the saved data structure L such as the cursor shape image. 701 has its input connected to 704 with the primitive input commands I(k). Each input command I(k) from the software actuator 703 has the current cursor position (x,y) available so that the cursor engine 701 can update the new cursor image C(k+1) 715 at the right spot and the right sampling k. By superimposing 715 with 714 in 716, it furnishes the modeled software dynamics output O(k+1) 717 as the simulated output of the software.

In the process of updating the state of the modeled algorithm engine dynamically, the agent 702 taps into D(k) 718 online so that 702 can make the same decision based on the current software state as it does in the modeling process, even though 700 is the simulated algorithm engine $\bar{\Phi}_C$.

The modeled software dynamics provides a rich programmable framework for further enhancements and extensions of the software representation. The interaction between the modeled software S and the agent A now can be quantified in such detail that the output of a pixel at the exact sampling k and the exact location (x,y) is computable as the value of o(x,y;k). With the attached running context, every modeled pixel value o(x,y;k) is no longer just simulating what has been acquired from the modeling process; it simulates with the relevant programmatic information and structures both temporally and spatially. The fundamental process of the interaction such as what happened, when it happened and most importantly, the dynamic mechanism of how it happened is able to be represented and simulated in a new software system that includes the modeled software $\bar{S}$ and the agent A.

Mechanization of Software Amplification and Intelligence

Software representation amounts to manipulating models according to well-defined rules. Based on the disclosed techniques for the modeling, simulation of the software, the interaction between the software and the best human intelligence programmed in the agent can be extended in a more systematic way. The software can be utilized for new purposes that are not designed for in the first place as tools.

1. Mechanization of Software Modeling

Figure 8A:
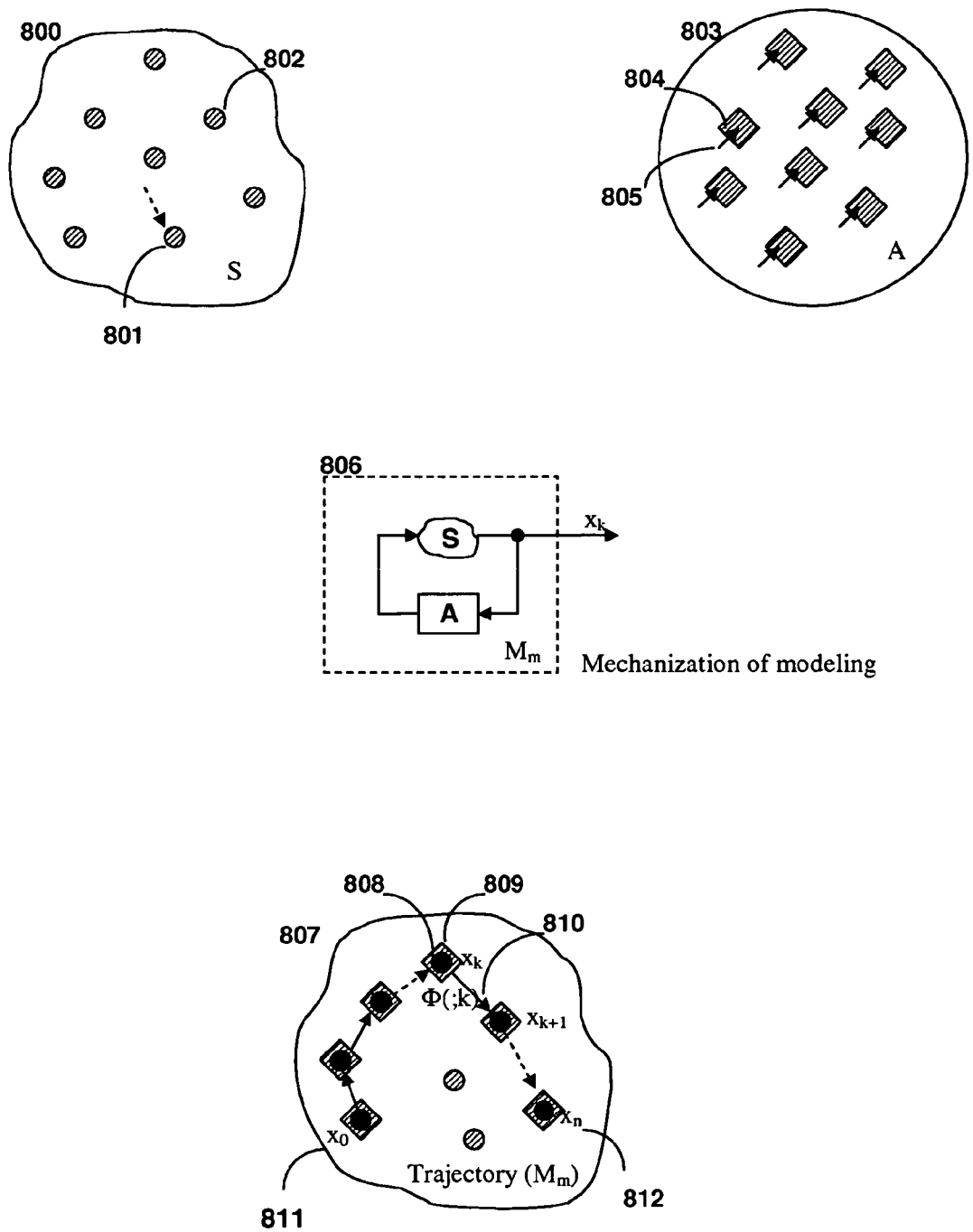
FIG. 8A is the mechanization of the software modeling machine.

In FIG. 8A, 800 is a binary software space where 801 is the fixed point idling for interaction. All small circles as 802 are programmed software features or what are defined as the software states. All the small circles are disconnected or uninstantiated, which means that those features or states can only be connected through the interaction dynamically. To emphasize the present invention addressing any interactive software, an irregular shape 800 is used to represent any software S running in its own binary space as pre-built without any modification in order to stress its limited manipulability as a black box.

803 is a programmable agent software space. Because the agent A is the new software that is developed independently from the underlying software, a regular shape circle is used to represent the fact that its source code is readily accessible and programmable. Items as 804 are the software actuators that are accessed and programmed by the agent and to be powered by the underlying software S. Items as 805 are the agent commands to drive its targeted plant through the actuator models 804. The agent 803 and the software 800 are connected to construct a modeling machine $M_m$ 806, the mechanized modeling machine 806 is also an automation machine. The modeling process is running in the extended binary space 807. The software states as 808 are instantiated and actively modeled. Attached to each software state is a running context as 809 that consists of the current active software actuator and the agent commands programmed into the actuator. While powered by the underlying software S, the model of software actuator 804 is identified in real-time. Evolving from software state to state is the transition functions $\overline{\Phi}(;k)$ 810 that are driven by the underlying software S under control of the agent A. The modeling process traverses a trajectory of the software dynamics that starts from the initial state 811 and ends at final state 812.

The results from running the modeling process are instantiated software states and running contexts with the modeled software actuators attached to states.

2. Mechanization of Software Simulation

Figure 8B:
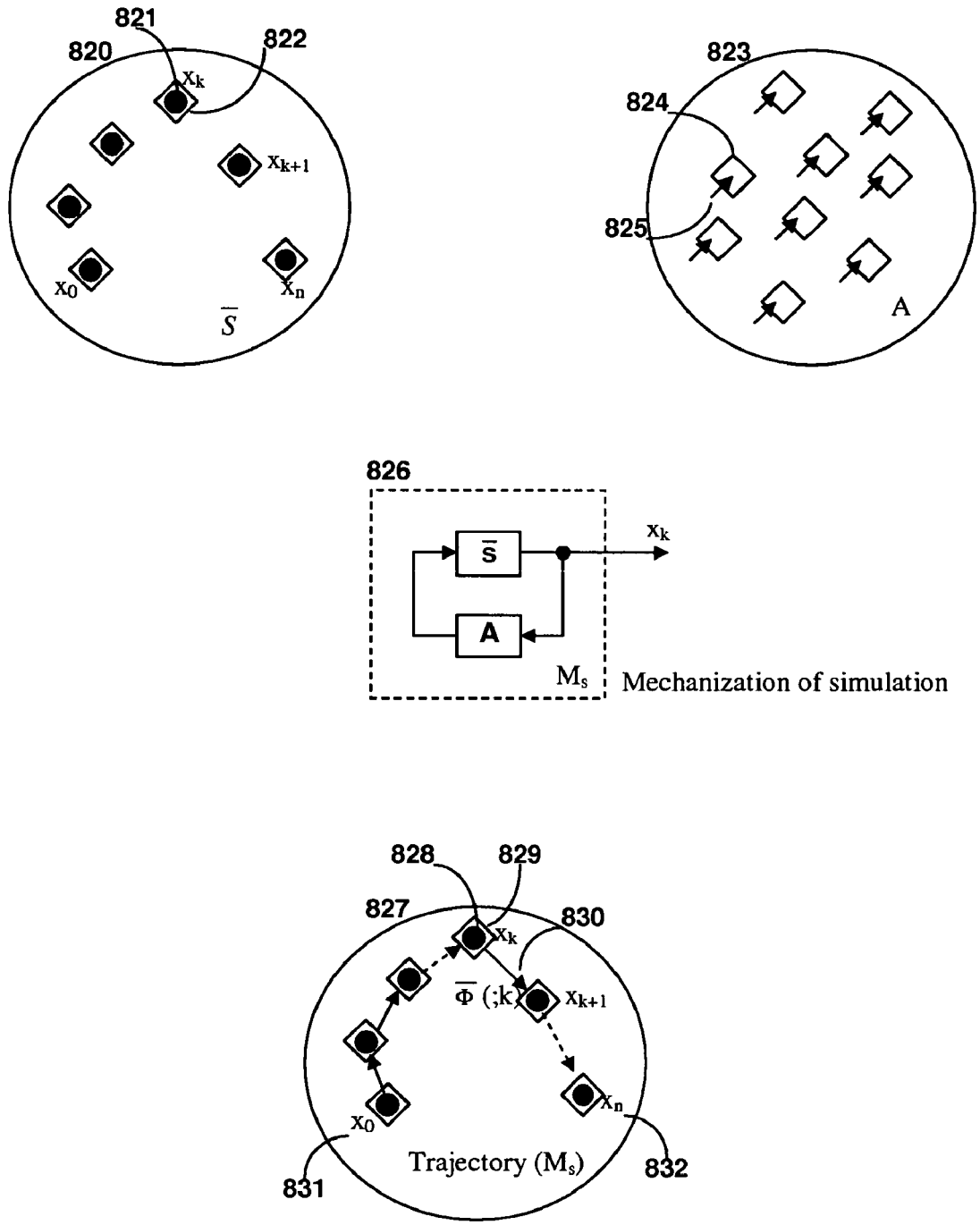
FIG. 8B is the mechanization of the software simulation machine.

In FIG. 8B, 820 is a modeled software space where items as 821 are the modeled software states that are instantiated from the modeling process. Items as 822 are the modeled running contexts attached to the states. The modeled software space 820 is structuralized by the modeled running contexts 822 that include the rich information about the current state such as where, how and when the interaction is carried out. 820 as the modeled software space is different from the original binary software space. A round circle is used to represent the structured software space that is more manipulable than the original binary space.

The modeled software space 820 like the underlying software S can not be instantiated without interaction from the agent A. 823 is the same agent as was used in the modeling process. The only difference from the modeling process is that the software actuators 824 have been already acquired while being powered by the underlying software S in the modeling process. The white color instead of the shaded as in FIG. 8A, contrasts the acquired models vs. models to be powered by the software S. Items as 825 are the same agent commands as programmed to the software actuators in the modeling process, to drive its targeted plant that is the modeled software $\overline{S}$ instead of the real software S.

The agent 823 and the modeled software $\overline{S}$ 820 are connected again to construct a simulation machine Ms 826, the mechanized simulation machine 826 as the modeling machine $M_m$ is an automation machine too. The simulation machine 826 is a new software system that is running in an extended and structured software space 827.

The software states as 828 are reconstructed from the sampled states dynamically. Attached to each software state simulated is an active running context as 829 that is generated dynamically from the current active software actuator and the agent commands programmed into it. Evolving from software state to state is the simulated transition functions $\overline{\Phi}(;k)$ 830 that are powered by the modeled software $\overline{S}$. The simulation process traverses the same trajectory of the software dynamics that starts from the initial state 830 and ends at final state 832 as the modeling process does.

The simulation machine $M_s$ has a life of its own, an autonomous dynamics independent of the underlying software S. Such a simulation machine $M_s$ itself is a software, much purer and much more readily malleable than $M_m$ that it can be further transformed and augmented with additional computation power while keeping the acquired software dynamics (9) invariant.

The present invention has built two models. One is $\overline{S}$ with the running context from the modeling process. The other is the agent model A that is used in both modeling and simulation processes as a high level abstraction of expert's strategies on the software S as well as the controlling host to interact with S and $\overline{S}$ automatically. If the best of the software can be represented in the mechanized interaction between the agent A and $\overline{S}$, then the challenge goes back to the root of the interactive software, which is to simulate the mechanized process interactively by human users.

3. Mechanization of Simulated Software Interaction

The first augmentation is to extend the automation process $M_s$ into an interactive process, $$M_i = \text{INTERACTION}(M_s); \tag{32}$$

Figure 8C:
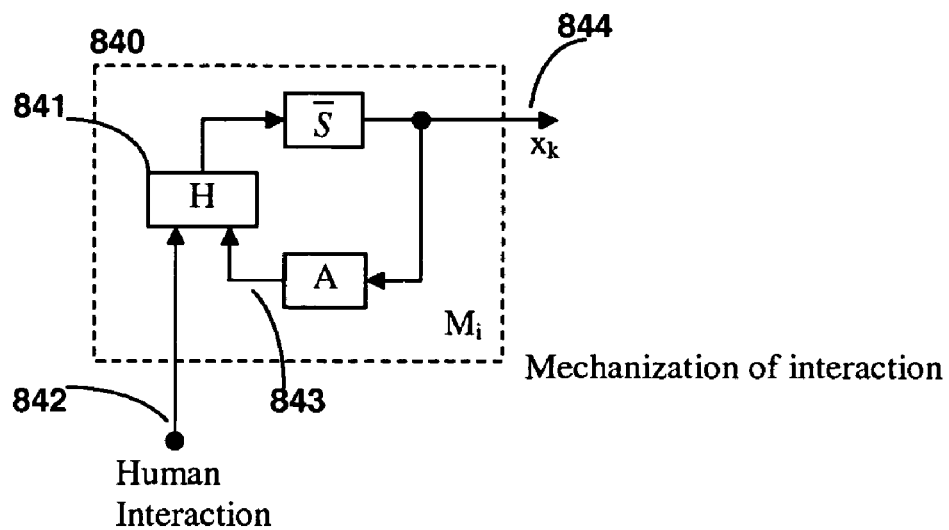
FIG. 8C is the interactive augmentation of the software simulation machine.
Figure 8C:
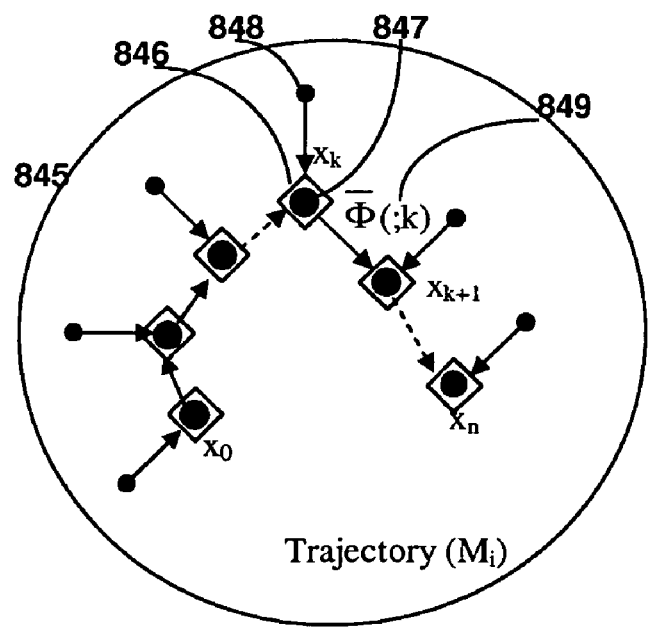
Figure 8D:
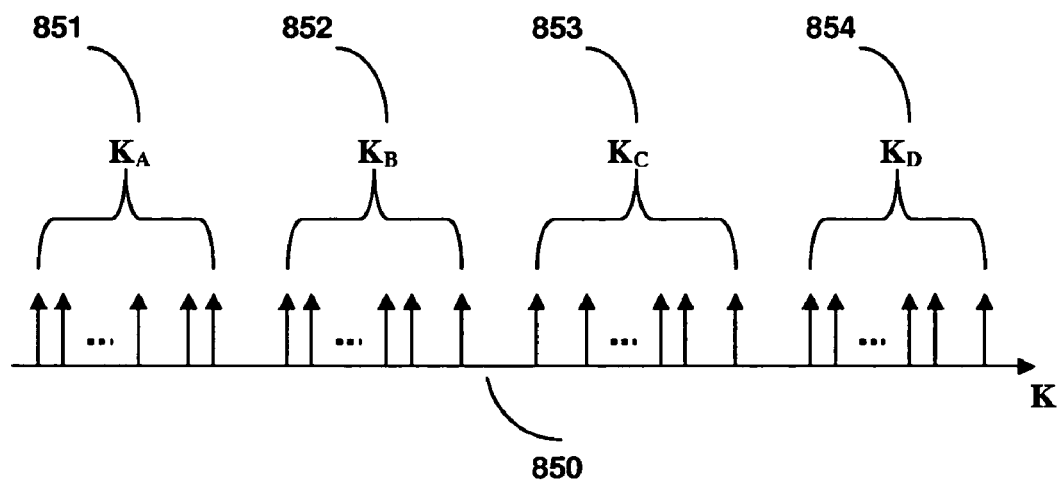
FIG. 8D is the description of the partitioned software sampling domains K.
Figure 8D:
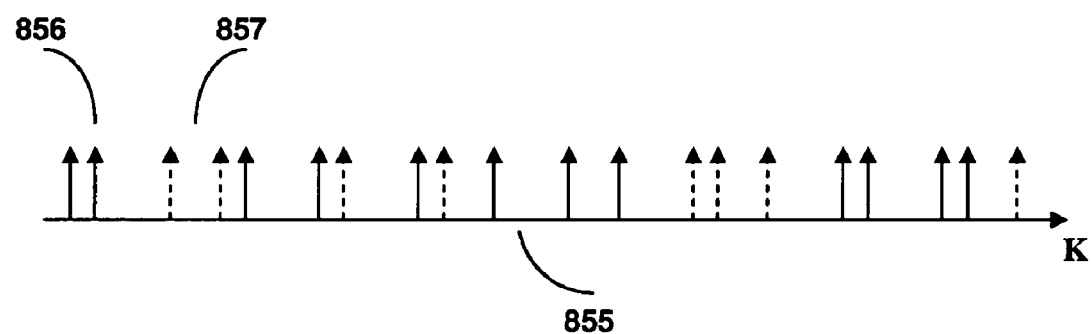

The simulation machine Ms is a system that comprises two subsystems. Referring to FIG. 8C, between the output from the agent A to the input of the software model $\overline{S}$, it can augment a new interaction input component 841 as H, which is implemented as a user interaction inference engine. The augmented system 840 takes a human input 842 in real-time. Connected to the inference engine 841 are two input streams, 843 is the programmed primitive commands driven by the software actuators, which is driven in turn from the high level agent commands. 842 is the interaction input from a human user. Input 843 is streamed mechanically as the agent executing its pre-programmed strategies that serves as a reference process here. Input 842 is the human user's interaction input to the Mi based on what he has sensed in the simulated software state $x_k$ 844.

845 is the dynamic trajectory evolving from start to end in the simulated software space. The inference engine H takes in two inputs at the current sampling k. It compares the user input 842 actively based on the agent's performance 843 that is updated dynamically as the modeled software dynamics progresses. The inference engine has access to the same running contexts as the simulated machine. Having proven its correctness in the modeling and simulation processes, the running context 846 encapsulates all the information necessary to engage a human user 842 to interact against the modeled software dynamics.

After the agent has performed its programmed interactions through the software actuators that have updated new running contexts, the automated simulation logic transfers control to the inference engine H 841. The engine 841 will hold the simulation execution until its designed logic is passed. One of the major functions implemented in the engine is to score and make inferences on the user interaction performances 842 against the agent's 843.

Once the execution falls into H 841, it will wait for or prompt the user for the next movement. Suppose that 847 is the current software state $x_k$ and 846 is the current running context generated from the agent command I(k). Under the simulated automation, both are enough to transit $x_k$ to next state $x_{k+1}$, but under the interaction extension, they serve to setup the scene $x_k$ and context that provide the visual state for the user's manual interactions 848 and the inference base for engine 841. The inference engine waits in the loop until the user makes the correct actions such as clicking a mouse button over a valid region, typing a specific key with a certain meta-key down and so on.

The real input 848 from the user is matched against the running context 846. If the input is matched, then the engine 841 releases its hold on the simulation machine and the software dynamics $\overline{\Phi}(;k)$ 849 transits one step forward to $x_{k+1}$, which starts a new cycle of interaction. But if the user's inputs 848 fail to match with the running context, such as clicking a wrong button and/or over a non-valid region, or typing a wrong key and/or with the wrong meta-key down, the inference engine detects the discrepancies and voids the user's actions by prompting the user to interact again while it makes the inference online with available knowledge on what's going wrong and firing the contextual-related guide to the user programmatically.

The inference engine H 841 can hold the simulation machine until the user 842 makes the correct moves or the user requests to have the inference engine perform the interaction for him. The inference engine is running dynamically in-sync with the simulated software dynamics.

There are other intelligence features that can be built into the inference engine. For example, the inference activities can be controlled by the events programmed locally or remotely. It can track and analyze an individual or a group of users performance under a specific tasking environment in order to build a better interaction process model between the software and the human users.

The inference engine H 841 is independent of the simulated software model, the agent and the complexity of the interactions involved. It is implemented as a generic component and applied universally to any simulation machine $M_s(A,\overline{S})$. Embedding H into $M_s$ can be programmatically controlled so that the augmented simulation machine $M_i$ can work in dual modes. Besides the interactive mode, it can work in the automation mode by bypassing the internal inference loop in H so that the output of A is routed to the input of $\overline{S}$ directly. The programmability can be implemented by pressing a hotkey to toggle the modes.

If the simulation is the power to see what software is capable of doing for a human user, then the simulated interaction is the power to see what a human user can do with the software. With the interactive simulation machine $M_i$, it becomes meaningful to simulate the complexity of not only the software S but also the best acts of minds, which represents in detail interactively an expert user at work on a particular task. Such a representation is a precise programmable model of the agent A on the basis of which pertinent specific aspects of the expert's problem solving behavior is simulated automatically or is imitated interactively by a large population without any constraint.

The highly complex and interactive simulation machine $M_i$ is built on two mechanized processes, modeling and simulation. Based on these mechanization processes, the interaction, opposite to the automation, is mechanized with augmentation of H, which is called the mechanization of interaction 840.

4. Mechanization of Simulated Software Indexation

The second augmentation is to index the simulation process $M_s$, $$M_x = \text{INDEX}(M_s); \qquad (33)$$

The simulation machine $M_s$ is defined on the sampling domain K. Each software state with the running context attached can be indexed numerically or symbolically. The index machine $M_x$ is a simulation machine that runs visually on a sub-domain of K, $K_I \subset K$. $K_I$ as a subset of K is developed based on some criteria. For example, in the FIG. 8E, the simulation sequence 850 is divided into 4 parts, $K_A$ 851, $K_B$ 852, $K_C$ 853, and $K_D$ 854. Now instead of running the whole simulation 851, 852, 853 and 854 sequentially, it may be desirable to run the dynamic process over $K_C$ only. Another example is to partition the sampling sequence 855 into two sub-sequences, $K_t$ 856 and $K_a$ 857, where 856 with solid lines indexes to those software states that are mapped to the software transactional operations and 857 with dashed lines to the software analytical operations. $K_t$ 856 and $K_a$ 857 are not necessarily numerically sequential. People who want to simulate how to use the software may just run the simulation on $K_t$ 856 while those who want to know how to design a mechanic part or author an artistic work may run the simulation on $K_a$ 857 only.

Figure 8E:
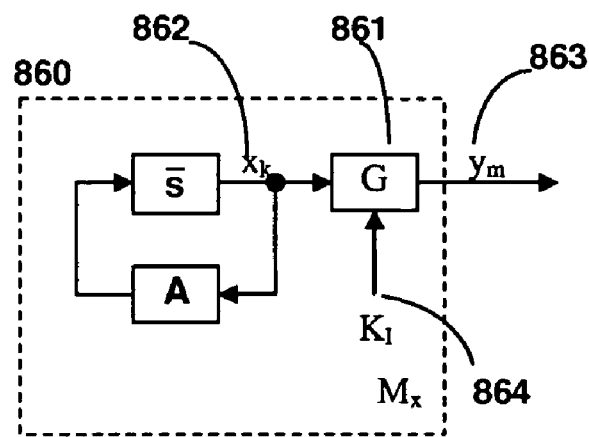
FIG. 8E is the index augmentation of the software simulation machine.
Figure 8E:
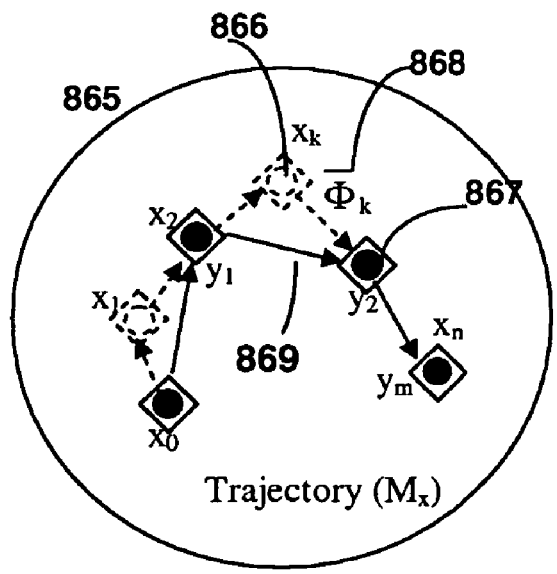

From the modeled software dynamics (9), there is no constraint on the physical implementation of the modeled software space even though it is acquired from the screen output of the real software in the modeling machine $M_m$. Therefore, the simulated software space can be implemented in the computer memory that is invisible to the outside. Referring to FIG. 8E, the augmented system 860 includes a gated output-mapping function G 861 that controls the state $x_k$ 862 from $\overline{S}$ to the screen $y_m$ 863. The simulated software dynamics now runs invisibly with its state 862 being updated in the memory instead of on the screen. The state that is updated invisibly in the memory is called the virtualized state.

861 partitions the software dynamics states into two classes, visible and invisible based on the supplied index set $K_I$ 864. The state $x_k$ is copied to the screen as visible if the current sampling $k \in K_I$; otherwise it becomes an internal computed state that is invisible. 865 is a dynamic trajectory running in the modeled software space. The modeled software dynamics runs its full course computationally, where internal states like 866 are run invisibly in the memory and states like 867 are run visibly showing to the screen. By running the software dynamics internally, it preserves the causality of the modeled (9). Since the internal states that are invisible are updated by the internal transition functions 868 as fast as computationally possible, the visual dynamic effect on the screen is the same as if it were running a new software dynamics with new states 867 and new transition functions 869.

With the modeled software dynamics, every state that is indexed by a sampling k can be associated with events or actions happening at that moment such as when a dialog pops up, or a button is clicked and so on. 864 $K_I$ can be described by more descriptive terms such as "When menu Copy command selected", "When dialog up", "when OK button clicked", and so on with each term associated with one sampling The index machine $M_x$ becomes a content engine that is up for the textual index and search. By providing some textual descriptions, a searching can be performed against the $M_x$. After samplings that are associated with provided textual descriptions are found, the software simulation can be conducted visually from one event and stopped at another. For example, by providing a pair of textual descriptions {"When dialog up", "when OK button clicked"}, the index machine $M_x$ can find $k_1$ and $k_2$ that are associated with the pair. By virtually advancing the software dynamics to $k_1$ invisibly then running visibly from $k_1$ to $k_2$, it effectively simulates a segment of software dynamics, which is indexed by paired textual descriptions.

If the textual description has more than two terms, then the indexed simulation can run multiple segments by segment visually. Within the modeled software dynamics, multiple index sets can be joined by the logical OR to partition the software states into two classes, visible and invisible, based on multiple criterions.

5. Mechanization of Simulated Software Extension

Running a reality-faithful simulation by the machine $M_s$ can be considered a form of continuous, quantitative simulation that represents the underlying software phenomena. However, the complete modeling of the system behavior requires an articulation of causal and functional relations between the agent and the software model, a qualitative simulation that involves a higher level of abstraction and modeling. Since the software's responses from the agent's actions are predictable and computable from the modeled software dynamics, the qualitative simulation can reason from the software's response vs. the agent's action over the temporal and the spatial domain and elaborate the different responses by the different actions in order to underline the effectiveness of the actions taken by the agent and carried out by the software.

The third new augmentation E is introduced to extend the simulation machine $M_s$, $$M_E = \text{EXTENSION}(M_s); \qquad (34)$$

Figure 8F:
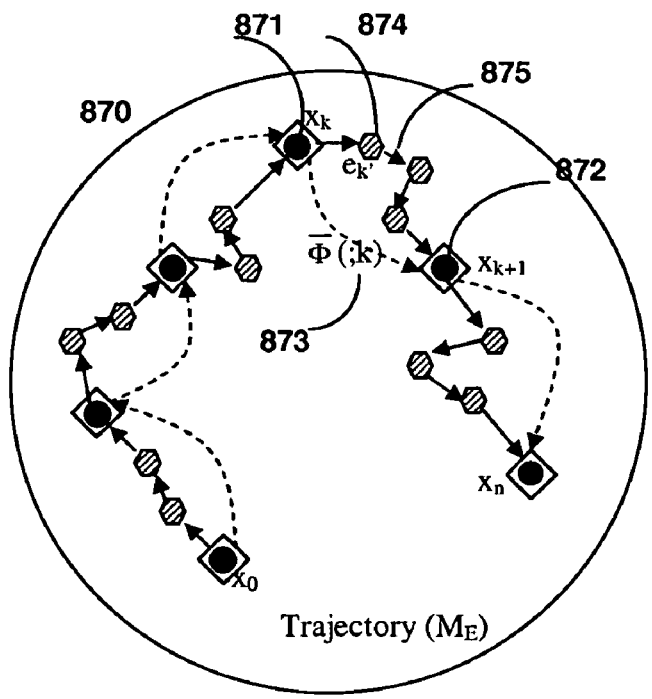
FIG. 8F is the extension augmentation of the software simulation machine and extensions with the web browser.
Figure 8F:
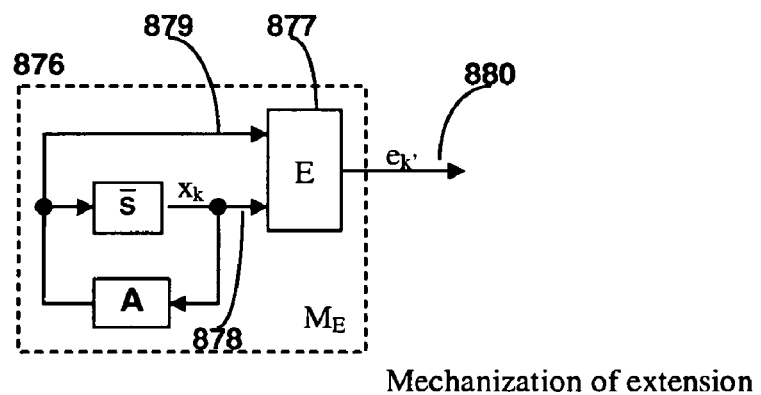
Figure 8F:
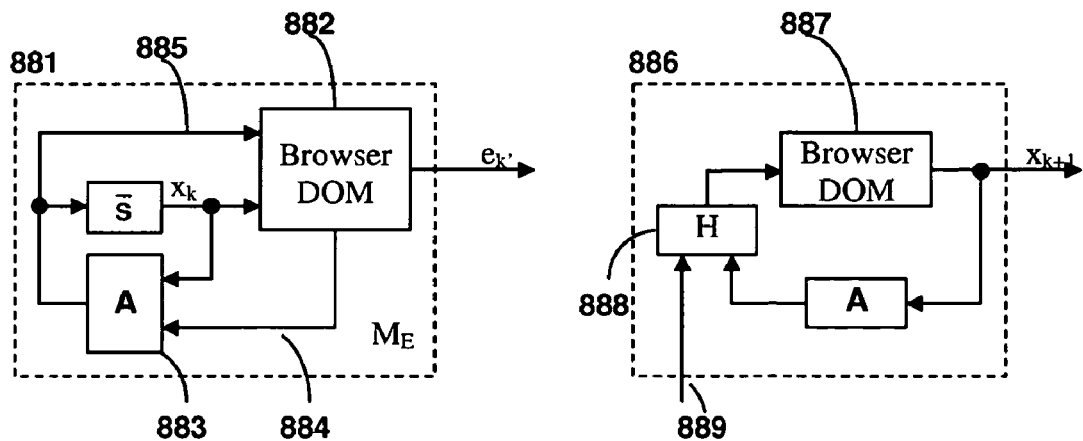

Referring in FIG. 8F, 870 is an extended software space, where items as 871 and 872 are the modeled software states and 873 as dashed line are state transition functions modeled from the modeling processing. Between any pair of states $x_k$ 871 and $x_{k+1}$ 872, within the sampling time [T(k),T(k+1)), the software state is held in $x_k$. Instead of mapping $x_k$ to $x_{k+1}$ by the state transition function $\Phi(;k)$ 873 in one step as the normal simulation does, the state $x_k$ 871 is carried over to $x_{k+1}$ 872 by a sub-process $\{e_k'\}$ in multiple steps where 874 and 875 are new sub-states and sub-transition functions that are added programmatically. The sub-process takes $x_k$ 871 as the initial state and $x_{k+1}$ 872 as the final state, and drives each success of the sub-states 874 forward with additional computations, algorithms and intelligence that were not originally present in the underlying software. The sub-states 874 can be any composition of current $x_k$, previous $x_{k-i}$ or external states and the interactions that are deemed fit in the current context. The sub-processes are used primarily to implement the qualitative simulations so that the hard state transition 873 from $x_k$ 871 to $x_{k+1}$ 872 is stretched into the sub-process that simulates the expert's higher level of reasoning and decision-making process. It can also be used to introduce programming activities interactively or automatically that are deemed to be appropriate for the current context. For example, it can introduce a new interactive process such as popping up a dialog to ask a few questions or provide a few hints to the user within the current state and running context, which are not the part of original software but extended as if they were. The sub-processes that are mounted on the base simulation process provide a programmatic mechanism to fuse the intelligence seamlessly into the otherwise mechanized agent-software simulation and interaction.

The simulation machine 876 is extended by adding block E 877. The extended block 877 is connected directly to 878, the output of the software model so that it has full access to the history of the modeled software dynamics including the states past and current. Its other input 879 is driven by the agent so that 877 has access to the running context too. Inside 876, there are two update processes flowing. One is running in the base mode by $\overline{S}$; the other is running in the extended mode by 877. After $\overline{S}$ updates its state $x_k$ 878 at the sampling k, it stops and lets 877 take over the execution. 877 uses $x_k$ 878 as its initial state and evolves the sub-states step by step until it reaches the point right before the next base sampling k+1. The rendered sub-process $\{e_k'\}$ outputs 880 from 877 are the base state $x_k$ immersed with renewed output from new extended computation sequentially in 877. The extended machine $M_E$ runs in the cycle of one base state update following by multiple sub-states updates.

The extended block 877 can be any software component programmable to the agent. Microsoft® Internet Explorer Browser component is freely available in any windows computer. It is one of the most accessible (API-wise) and programmable component in the market. Since the Browser component publishes its programmable model called Document Object Model (DOM) to allow outside accessing of its internal states and events programmatically, it can be integrated with other extended functions as the extended block 882 in the simulation machine as in 881. The agent 883 has access to the internal programming information of 882 such as when a web page navigation is completed and so on through the DOM interface 884. The agent 883 can control the Browser extension 882 through the DOM interface 885 to control when and where to navigate. Even though the underlying software does not have the Internet support, through the Browser Extension, the simulated software experience can be extended with the web browsing experience where the software dynamics update can be synchronized with live web page browsing and rendering. The simulated software state transitions can be suspended-resumed or co-run programmatically with web browsing activities.

In another embodiment of the present invention, further augmentation can be achieved by modeling a loaded DHTML page in 882 as a controlled target when the extended process is in progress. Since the agent 883 has access to every targeted item region through 884 lively, the agent 883 can drive and control the web browsing activities through its high level commands that are translated through the software actuator. A universal software actuator model for a DHTML page is developed. Even though it is running in the simulation mode, the DHTML actuator is powered by the real software component 882; it uses the DOM supplied APIs to access and identify its command region based on the tag that is defined uniquely by PCS relation as disclosed in the software actuator section.

Within this architecture, the agent 883 can automate web browsing activities in two ways. One is to programmatically navigate to the specific web page as the Browser component is designed to perform. The other is to systematically navigate to the URL link that is encoded in the page by mouse-clicking and key-typing activities from its graphical user interface. With the extensive support in the DOM, the causality between the input and output can be well modeled and preserved.

The Internet and HTML have become ubiquitous computing. There are numerous interactive software built on the Web Browser component including Microsoft® Internet Explorer. The interaction between the human and the web can be modeled and simulated using the invention by treating Microsoft® Internet Explorer as the targeted application, and going through the modeling and simulation processes as the other software. Since the Browser component is freely available and its internal API model is well published, instead of going through the modeling phase as is done for the other software, the Browser Extension can be modeled and controlled as a targeted software running lively in the software simulation machine as in 886. Instead of a software model $\overline{S}$, the browser component 887 is modeled as a controlled target from the agent. Augmented by the interaction inference engine H 888, a human user 889 can engage in the preprogrammed web browsing interactions. In other words, which spot to be clicked and which key to be typed as the best browsing experience can all be pre-programmed by the software—the agent, and a human user can simulate that designed experience automatically or interactively with guaranteed success.

6. Mechanization of Software Amplification

Figure 8G:
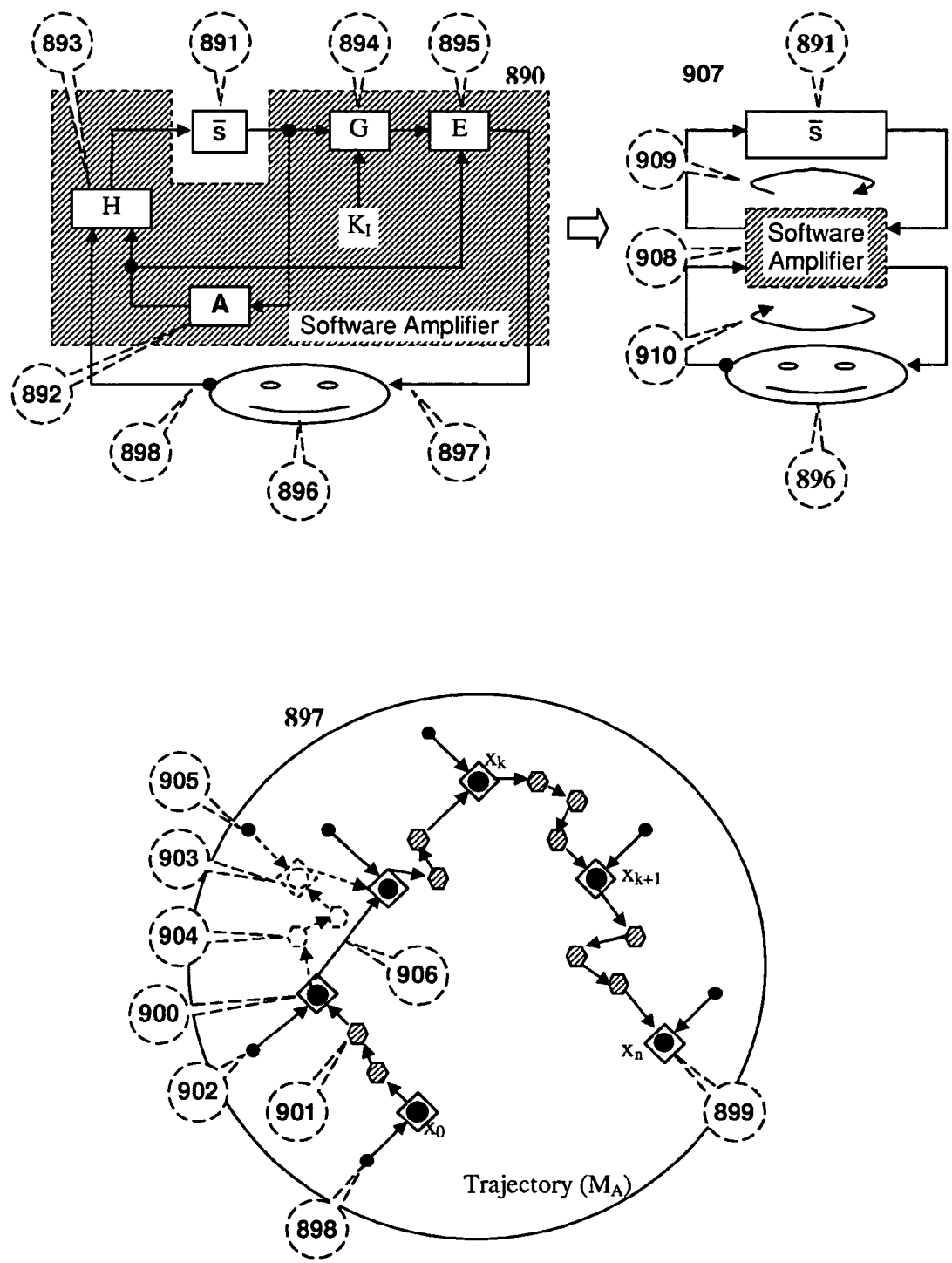
FIG. 8G is the configuration of the software amplifier.

All the augmentations introduced in the present invention can be combined in cascade into one machine setting. Referring to FIG. 8G, 890 is the augmented system. 891 $\overline{S}$ is the modeled software and 892 is the agent that is used to control the underlying software S to acquire 891 $\overline{S}$ in the modeling process. 893 is the augmentation to engage human interactions into an otherwise automation machine. 894 is the augmentation to index the simulation process. 895 is the augmentation to extend the software dynamics. 896 represents a human user who interacts with the augmented machine. The user 896 senses the visual stimulus from the output of the augmented machine 897 as an input in real-time and makes the motor movement as an output from 898. Three augmentations 893, 894 and 895 working in synergy programmatically can enhance the user's simulation and interaction experience to such a level that it would be impossible for the underlying software to ever deliver. For example, by working in tandem 894 can partition the software space based on the user's proficiency that is adapted in real-time based on the user's interactive performance that is tracked in 893. A more experienced user can shortcut automatically the activities that are necessary only for a less experienced user. By providing the qualitative simulation 895 that also is gated by 894, the visual input to the user 897 is more informed and educated than the underlying software could provide.

No matter how advanced and complex is the knowledge involved and what experience a human user has had previously, the interaction between the user and the augmented software simulation machine becomes a predictable process as 897. For any user with a minimum knowledge of how to click mouse buttons and type a key, he can perform the actions just as an expert user does by driving the software machine interactively or automatically from the initial state $x_0$ 898 to the final state $x_n$ 899.

Before the machine sets up the standard running context 900 and challenges the user 896, a high level reasoning sub-process 901 provided by 895 programmatically extends the context that is generated from the execution of the agent, and prepares the user to take the right actions 902. Inside sub-process 901, it can implement any programmable function, even introducing a new context sensitive interaction process with the user over the underlying base process. For example, it can pop up a dialog to ask a few questions or provide a few hints in order to further augment the user's capability to take an intelligent interaction, which is unavailable in the underlying software.

After that, the user's interaction 902 can be scored online. The scoring function built into 893 considers the factors of not only the accuracy of the actions qualitatively but also the time that the user takes to complete the interactions quantitatively. If his performance or experience that is judged by his score is higher than the level that is assigned to the next state 903, then the machine updates the states invisibly and forgoes all ensuing sub-states and sub-processes 904 under the control of 894. Since the software states and its running context 903 becomes invisible so does the expected action 905, which cancels the interaction 905 to make the simulation run as fast as computationally possible. The visual course can be best represented by an equivalent transition function 906. As the user gains the experience incrementally from the online interaction and simulation, the visual simulated course adapts accordingly. By the end, the user reaches his goal state 899 through the self-adapted process.

Since the augmentations are independent of the underlying software models, the augmentation infrastructure can be programmed and applied universally to the simulation of all the interactive software. The augmentations are implemented in modular ways so that each of them can be selectively reduced to the identity transformation that bypasses the internal functions. For example, if setting H=G=E=Identity;

Then 890 is reduced to the agent A 892 only. The augmented machine is reduced to the basic simulation machine $M_S$.

If the components are grouped based on its input/output relations as in 907, there are three sub-groups and two loops. The top and bottom blocks are the modeled software $\overline{S}$ and a human user. The grayed area in 890 is grouped as a third component 908 in 907. From the implementation viewpoint, 908 is feasible and implementable since the agent A and augmentations H, G, E are all programmable software units external to the other two components 891 and 896.

908 is closed in two loops 909, 910. Loop 909 is a mechanized process with the modeled software $\overline{S}$ 891 and the highly sophisticated agent and the augmentations inside. The modeled software $\overline{S}$ 891 inside the loop 909 is resonated and amplified by the new programmable augmentations that are impossible in the underlying software. Loop 910 is a predictable interactive process with a human user 896. Three augmentations H, G, and E connected with the agent A construct the programmable software device 908 that couples the modeled software $\overline{S}$ 891 with a human user 896.

The software device 908 becomes the new magnifying glass for the modeled software $\overline{S}$ 891. If the software S has intangible but intelligent content that can be acquired and processed like signals in a dynamic setting, then by working on that acquired signal that is the software model $\overline{S}$ 891 to clarify further its internal structures and dynamic interaction in 909 and have human users like 896 to see, do, feel and practice its external interaction in 910, that software device 908 constructs the Software Amplifier.

The process of software amplification can be viewed from two very different angles. From one angle stands the original software developers, who strive to find a media to represent the best of the underlying software. The mechanization of the software and agent interaction not only enables the software representation in software, but also further transforms and enhances the mental and visual image of the software through the programmable agent and the augmentations. With these augmentation working in synergy on the modeled software $\overline{S}$ 891, 908 puts forth a new simulated automation machine that behaves in a more structured and organized manner than the original software S, in front of the user 896.

Figure 8H:
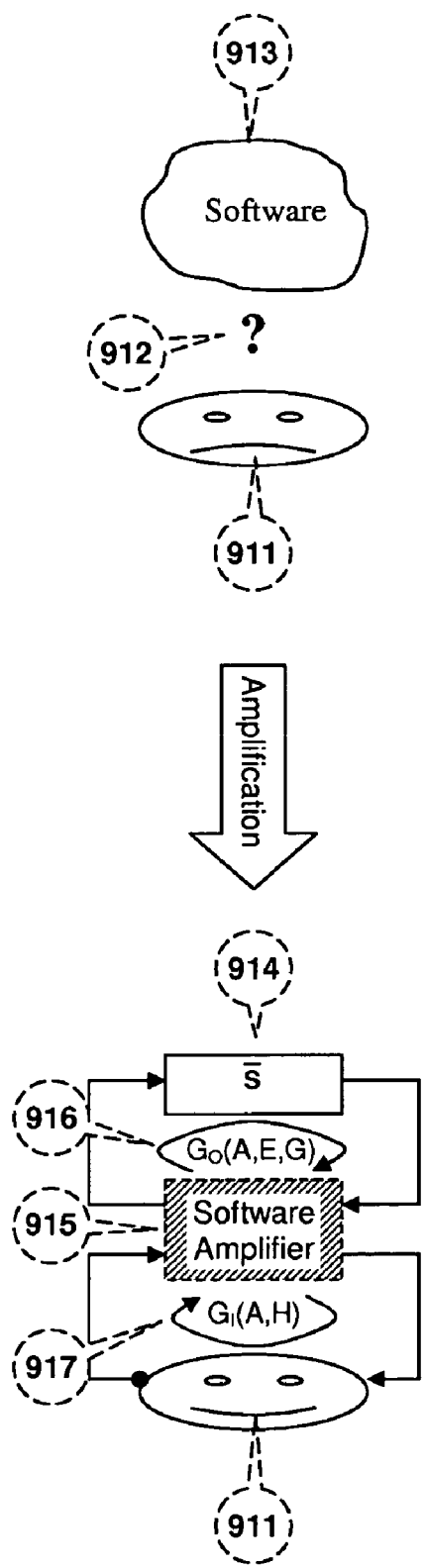
FIG. 8H is the software amplification transformation.

From the other angle stands a novice human user, who wants to learn the software or emulate a highly intelligent expert performance. As in FIG. 8H, the bewildered user 911 has very limited mental power 912 to interact with the real software 913 because he cannot navigate through or leap the gap between those complicated steps as an expert user does.

With all the power that computers can deliver, in the top loop 916, there is a highly intelligent process driven by the agent and augmentations. Obviously, the creation of the autonomous process 916 that can be communicated with and enhanced is a qualitative jump from the software 913 for simulation purpose. With the added agent A and the augmentations E and G, the autonomous loop 916 has a loop gain $G_O$ with $G_O(A, E, G) > 1$.

In the bottom loop 917, the user 911 is coupled through the software amplifier 915. With the help from the agent A and the interaction input augmentation H, the user 911 with the same mental preparedness or user power 912 can drive the modeled software $\bar{S}$ and interact step by step through the software space just as a high powered expert user does. The loop 917 has a loop gain $G_I$ with $G_I(A,H)>1$.

The total gain of the software amplification from the user 911 to the modeled software $\bar{S}$ 914 can be defined as, Amplifier Gain (915)=Augmented Power (916)/User Power (912)

$$=G_O(A, G, E)*G_I(A,H); \tag{35}$$

The software amplifier 915 couples two loops 916 and 917 mechanically. The top loop 916 defined as a Pull-loop serves as the representation purpose. Every software feature built into the software S now can be modeled to flow in an automation loop 916, which can be pulled and anchored to a mathematical process with the augmentations. The bottom loop 917 defined as a Push-loop serves as the delivery purpose. The pulled software dynamic process from the top loop 916 is now geared toward the bottom loop 917, in which an amplified software experience can be pushed and delivered to any human user 911 mechanically, yet interactively with guaranteed success.

The software amplifier 915 constitutes a single unified field of experience by providing a highly intelligent rendezvous. On one end, any software S can be represented in a dynamic process. For example, a vendor can model and package the best experience of the software in a dynamic process mechanically; experts can represent an intellectual process, such as designing a machine using a CAD software, or an artist authoring a masterpiece using Adobe® Photoshop, all in a dynamic process. On the other end, any human user 911 can engage that mechanized process interactively, literally click-by-click and key-by-key without any failure. For example, any one can engage a software amplifier developed for Photoshop actively to imitate a master authoring a masterpiece and practice every creative detail interactively that is modeled after the master in a stroke-by-stroke, paint-by-paint fashion toward completion.

The software amplifier brings the organic unity of the software representation and the delivery of that representation to fruition in a mechanized, yet interactive environment.

7. Mechanization of Software Intelligence

The present invention creates the new software use of software. Designing an agent that can attach to any released interactive software enables us to extract the software model in a highly structured way and discover the knowledge that is buried in bits and bytes of those binary executable files. The extracted model that represents the underlying domain knowledge encoded in the algorithm engine is remodeled and organized in a dynamic process, a natural framework for the representation of professional knowledge. With this invention, the professional knowledge embodied in those binary executable files and interactive processes to manipulate it can be modeled, extracted, augmented and simulated with the agent as the supervised tutor. The agent A running against the extracted model, which is extended further by the augmentations, creates a new class of interactive software.

Figure 8I:
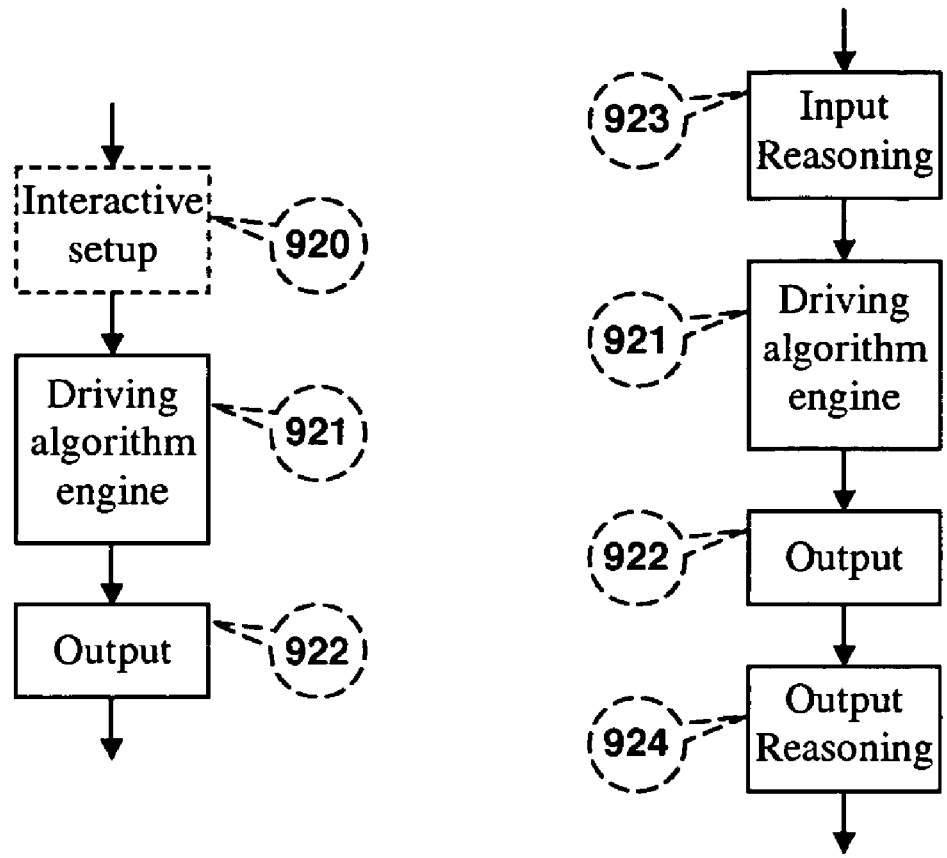
FIG. 8I is the modeling of knowledge encoded in the software.

The interactive software that renders its encoded knowledge can be modeled into three parts as in FIG. 8I. First part 920 is to setup interactively by going through lengthy menu and dialog operations to get data ready for the algorithm engine's manipulation. Second part 921 is to drive the algorithm engine based on the inputted data to compute results. Third part 922 is to render the results. Within these three divisions, the domain knowledge is encoded in the algorithm engine that can be extracted and modeled in the driving process 921. For example, to understand how a business process optimization works, it needs to study how various business factors to 921 can affect the optimized results in 922. If the user's interest is in optimization only, which is the domain knowledge encoded in the Excel algorithm engine, then how a spreadsheet is setup in Excel is irrelevant to him. But the setup 920 is still needed to be performed interactively to prepare the input to 921.

Suppose that the three parts of the software model $\bar{S}$ are extracted by the modeling machine $M_m$. By augmenting the simulation machine $M_s$, 920 can be virtualized by index extension G. Instead, two new sub-processes 923, 924 can be extended into the process. 923 is the input reasoning that replaces the mechanic setup from the software with more instruction roles; for example, how certain properties of business factors are important in the optimization of the business process can be explained in 923. 924 is the output reasoning that explains and enhances the output results from 922 with additional contextual instructions. This time, with more structured information available, 924 can construct a high level model about the encoded domain knowledge with the extended instructional value.

Figure 8J:
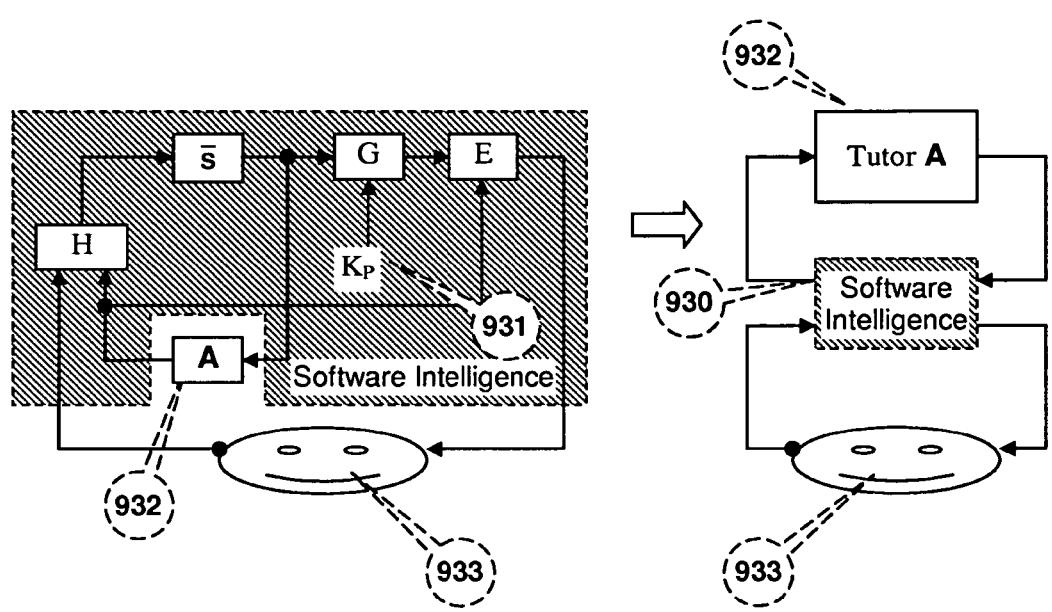
FIG. 8J is the configuration of the software intelligence.

If the system is regrouped as in FIG. 8J, the extracted model $\bar{S}$ and those augmentations contained in the grayed area constitute a new module as 930. 930 integrates the extracted domain knowledge embodied in the algorithm engine and the augmented processes that extend the domain knowledge in a dynamic process seamlessly. 931 is a special partition index setting that partitions the modeled software dynamics into two parts, the one with operational knowledge and the other with domain knowledge so that the states in the first part are virtualized. In this configuration, the agent A 932 becomes a tutor A to drive through those encoded knowledge path in a mechanized way. A human user 933 interacts with 930 dynamically to simulate the extracted domain knowledge. By modeling the software that in turn models various professional domains, 930 can model and simulate the professional knowledge encoded in the software. The new knowledge that is represented in the software dynamics is called software Intelligence.

Software Media and Software-2

Figure 9A:
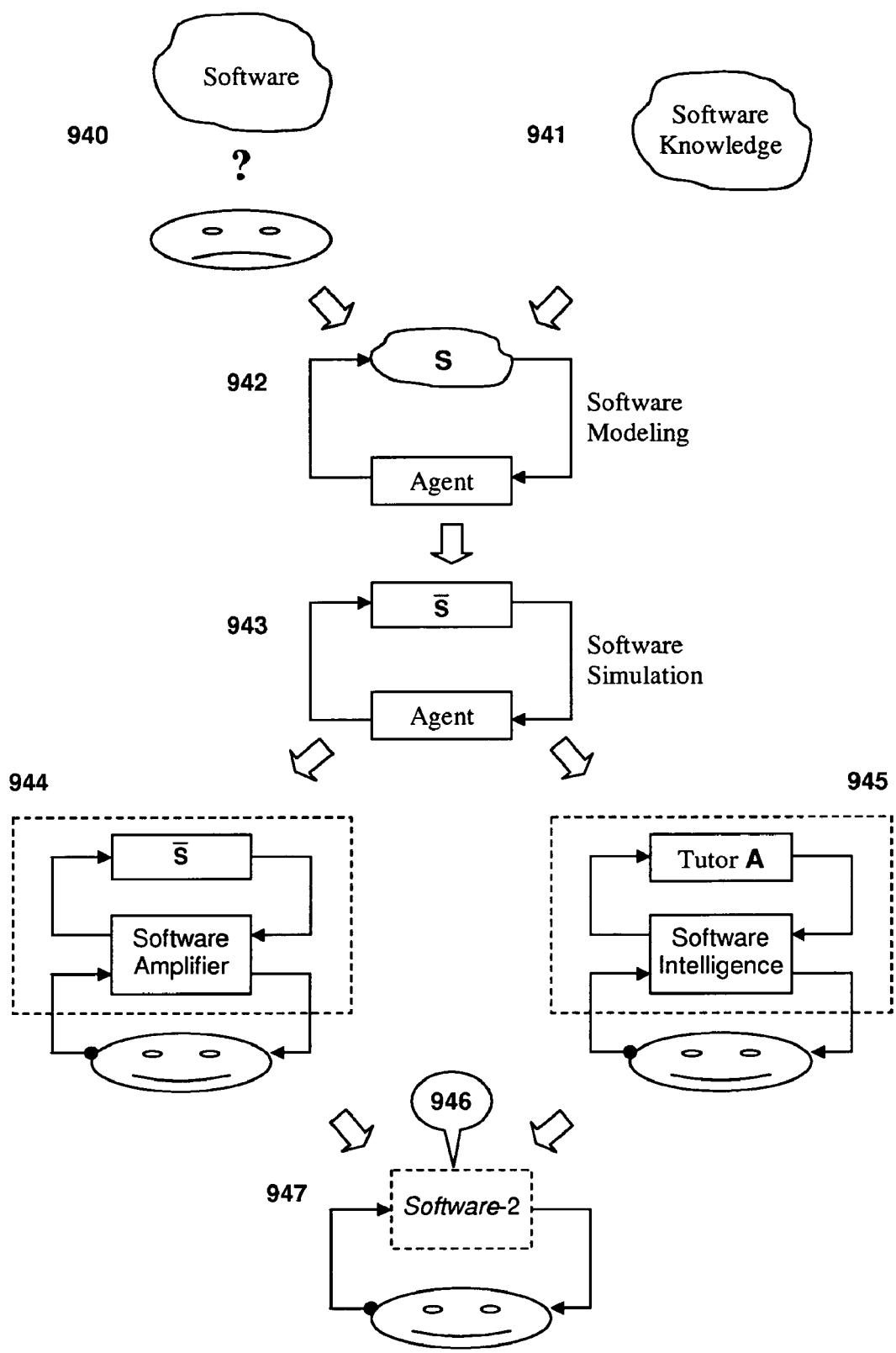
FIG. 9A is the mechanization of modeling, simulation, amplification and intelligence of software and software-2.

This invention starts with software S that either challenges its human users in 940 or hides its huge intellectual value behind those binary 0/1 bits in 941 in referring to FIG. 9A.

By designing and connecting a programmable agent to control and excite the software S in 942, the best of the software can be identified and extracted on-line as the software model $\bar{S}$.

By connecting the same agent to control the modeled software $\bar{S}$ in 943, the best of the software can be simulated automatically without the software S presence.

By augmenting 943, two classes of new software are created, both of which are interactive. 944 is the software amplification system in which any human user can engage interactively to simulate the software and imitate the expert performance with the best of the software S represented and amplified programmatically. 945 is the software intelligence system in which every aspect of the professional domain knowledge encoded in the software S can be precisely modeled with the extracted intelligence driven by the agent A as a tutor and simulated by a human user as a learner. 944 and 945 are created on the same agent-software dynamic system setting; the only difference is in the design of the agent A. In 944, the agent A is designed to attain its goals using the software as a tool. In 945, the agent A is designed to explore and discover the professional domain knowledge encoded in the software. Of course, both functions of 944, 945 can be combined into one and reconfigured dynamically by the index augmentation to fit different user's needs at run time.

944 and 945 both consist of two loops. One is an automation loop inside the dashed area. The other is an interaction loop with a human user. The logic inside the dashed area is really a new software 946. 946 can be run interactively as well as autonomously as in 947. Since 946 is a new kind of software that is built on the extraction of the software model, it is called software-2.

1. Distributed Software Amplification and Software Intelligence

The experience of running software-2 can be further magnified by incorporating the Internet and real-time communication technologies. Since the core of the simulated software machine contains the modeled software dynamic system that is controllable and malleable at run time, the simulation and interaction of the single augmented software machine can be extended into multiple-machines and multiple-loops that are distributed over the Internet.

Figure 9B:
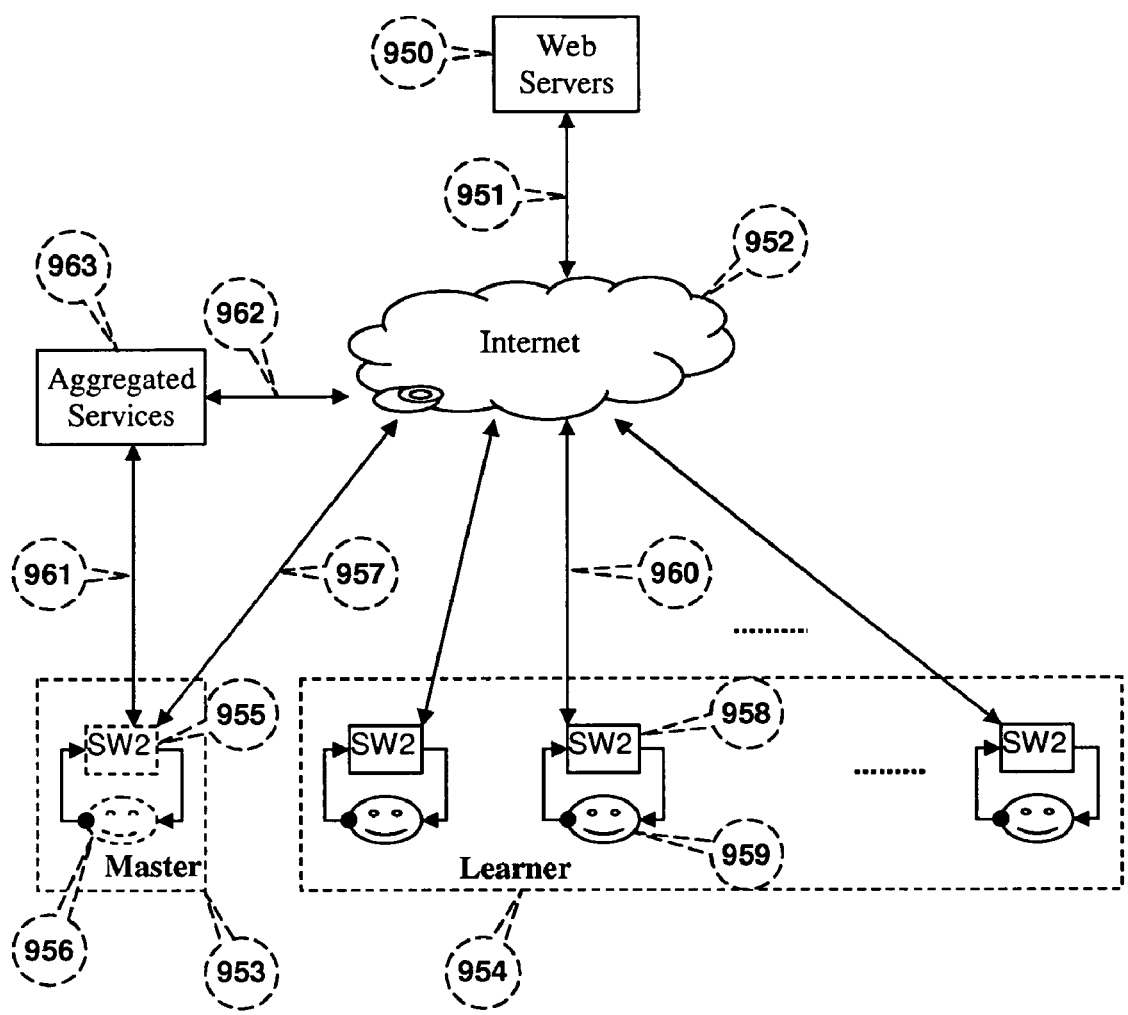
FIG. 9B is the distributed software-2 environment.

In FIG. 9B, on the servers side, 950 is a single or group of web servers that are connected to the Internet 952 through link 951 based on HTTP protocol.

On the client side, connected to the web servers through the Internet are two divided groups. Group 953 that is defined as the Master group, consists of one Master user 956 interactively running 955. 955 is a software-2 (SW2) application, either a software amplification or a software intelligence. Group 954 that is defined as the Learner group, consists of all other Learner users as 959s. 958s are the same software-2 running locally as 955 running in the Master group 953. Without any further communication, the Master 956 and the Learners 959s in 954 independently simulate or interact 955 or 958s.

Based on the disclosed augmentation techniques, the simulation machine can be controlled to pause and resume programmatically state-by-state by internal or external events. With communication link 957 and 960s alike, the execution of the simulation machine in 955 and 958s can be controlled by 957 and 960s, driven by the HTTP request/response protocol. Each machine including the Master's 955 posts a request to the web servers 950 through the Internet links 957 and 960s as it transits into certain states such as the expected interaction. After the request is posted, the software machine will wait for the response from the server 950. The posted request can include the current sampling k, the software machine mode (Master or Learner[i]), and the simulation conditions.

After the request is received by the web server 950, 950 will respond based on the machine mode at the other end. If the request is from the software machine 955, 950 will record the current Master's machine sampling as $k_m$, and respond immediately so that 955 is released to advance the simulation to the next stage.

If the request is from one of the software machines 958s in the Learner's group 954, for example Learner[i]'s, the server 950 will check the posted current sampling k[i] with the Master's sampling $k_m$. If $k[i] >= k_m$, 950 will suspend the response to the software machine, which in effect blocks the simulation thread of Learner[i]'s 958 in the other end. Until the Master machine 955 advances its current sampling $k_m$ to the condition $k_m > k[i]$, at that point, the server 950 will release the suspended machine that is Learner[i]'s by sending back a response.

On the other hand, if a Learner[i]'s machine 958 current sampling $k[i] < k_m$, 950 will respond immediately to let that machine catch up as fast as possible.

Because 955 is under control of the Master 956 interactively, ultimately all the simulation or interaction experience of 959 in the Learner group 954 are controlled by the Master 956 interactively.

The Master 956 knows what's going on in his and all other users' simulation machines visually since they are all run synchronously with the current sampling k of each Learner's machine 958 in 954 equals to the Master's $k_m$. While the simulation machine 955 is in the pause state to wait for the local interaction input from the Master 956, all the simulation machines 958s in the Learner's group 954 are in the wait mode for the response from the server 950. Since the wait mode in 958s only suspends the state update of the simulation, but does not block each 958 to receive other communication from link 960 and interact from the user, the Master 956 now can engage the users in the Learner's group 954 over the Internet. The 956 can exchange with other users 959s interactively and instantly. Users can post questions to him and receive his reply through the Internet links 957-960s in real-time. Messages exchanged between any two machines are routed by the server 950 that pushes them instantly to all the machines that have $k = k_m$.

The message can be a text, a script command, and a URL interactively created by any user locally. For example, based on the feedback from the Learner group 954, the Master can annotate and explain pointedly within the current running context of everyone's simulation machine that is synchronous with his machine. He can offer further deliberations based on the current state of the simulation through 957 or another communication link 961 in order to tap further services 963 from the web.

The Master 956 can bring more services to the Learner 959s. 963 represent a group of aggregated service providers that provide more real-time experiences through the link 962 and distribute them over the web through 960s. For example, one of the services is to encode the Master's voice and multicast it to every user 959 in the Learner's group 954. Each service is controlled through link 961 and synchronized with the simulation machine 955 under control of the Master 956 interactively.

With the machine 955 transiting step by step under the control of the Master 956, all other machines like the 958s in the Learner's group 954 are transiting in locked step. The conditions for the local simulation machines to go forward are extended including the Master's global interactions in addition to the user's local interactions. Through real-time communications the machine 955 and the Master 956 are extended virtually one-by-one into the machines 958s that reside in the Learner's group 954.

Figure 9C:
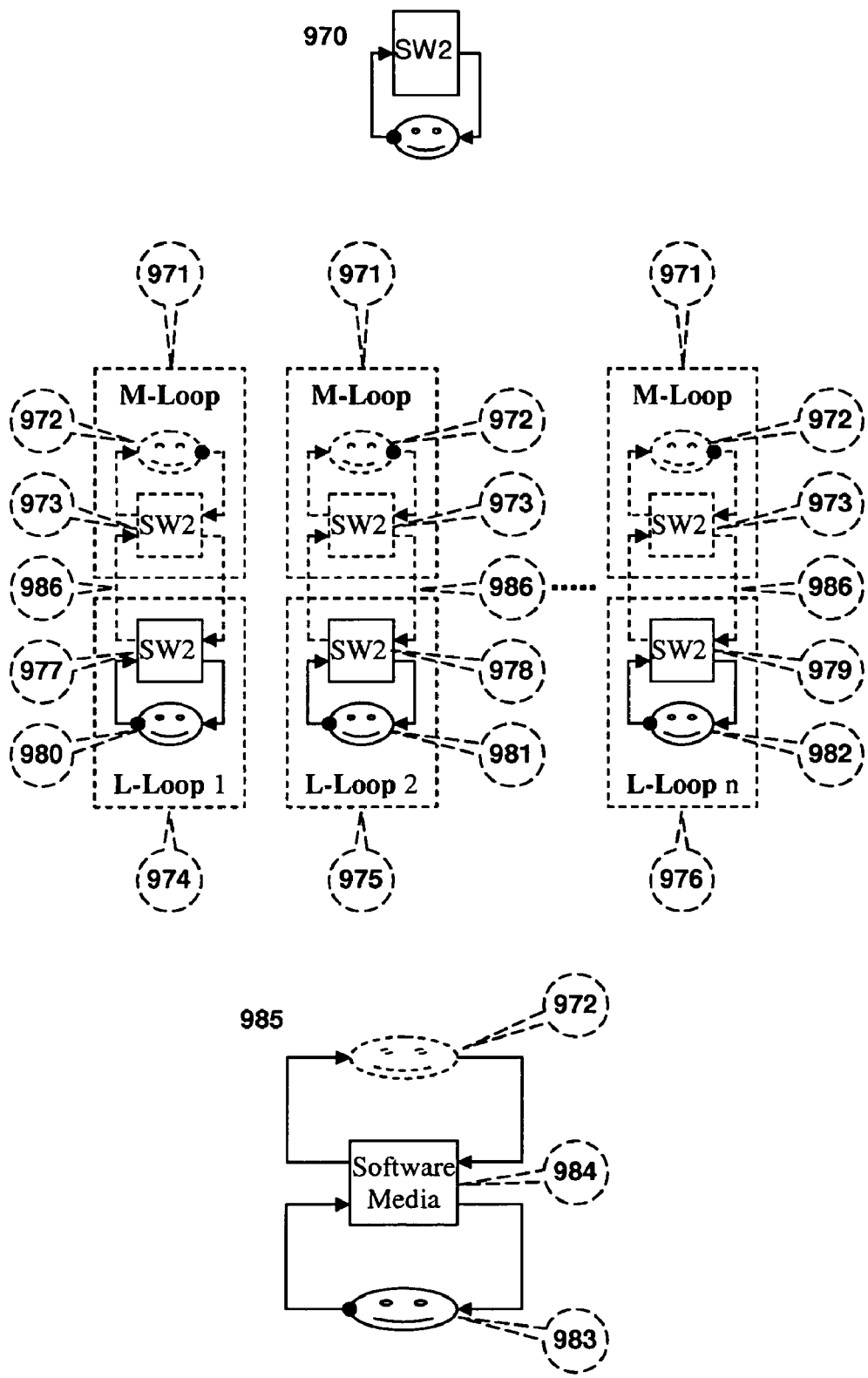
FIG. 9C is the distributed software media in Master-Machine-Human loops.

This invention is about how to build an automation machine to interact with a user as in FIG. 9C. 970 is called the Machine-Human loop. The loop 970 can be augmented again by incorporating the real-time communications and the Internet technologies as described above, in which two classes of loops are built. The first is the Master loop (M-Loop) 971, which has only one instance that is currently running and publishes its software machine as an interaction simulation service to be connected over the Internet. The second is the Learner loop (L-Loop) that has a local instance of the same software machine that is running and subscribes to the software machine service offered by M-Loop 971 over the Internet. Within the distributed environment, one instance of M-Loop 971 that has one Master 972 interacting with one software machine 973 is connected through real-time communication 986 over the Internet to every instance of the L-Loop such as 974, 975, 976 and so on. Each local copy of the L-Loop runs its own private software machine such as 977, 978, 979 and so on but remains synchronous with the Master's 973 and interacts with individual human users as Learner 980, 981, 982 and so on.

From each individual human user 983 viewpoint, the two machines running synchronously through communication 986 over the Internet can be virtualized into one 984. With other aggregated services integrated, 984 becomes a media that mediates between two human users 972 and 983 interactively in real-time. Underneath the media is an integrated software machine that has its dynamic content and structures extracted from the software and runs as software to simulate the software. 984 is called the software media.

Through the new software media, the multiple sources of the intelligence can be fused seamlessly. With the precision, the repeatability and the programmability on the machine side and the thinking, the decision making and the heuristic reasoning on the Master/User side, the engaged Master 972 and human users 983$s$ connected through the software media 984 construct a new Human-Machine-Human loop or Master-Machine-Learner loop 985.

2. Modeling of Software Media

This invention is built on the software. It is about the new software use of software. Its end product is a new breed of software, software-2. Within the framework of the present invention, the software is modeled like a giant content engine and a fountain of knowledge, which will change not only people's view of the software, of the intelligence, but also, of the representation and dissemination of knowledge.

Figure 9D:
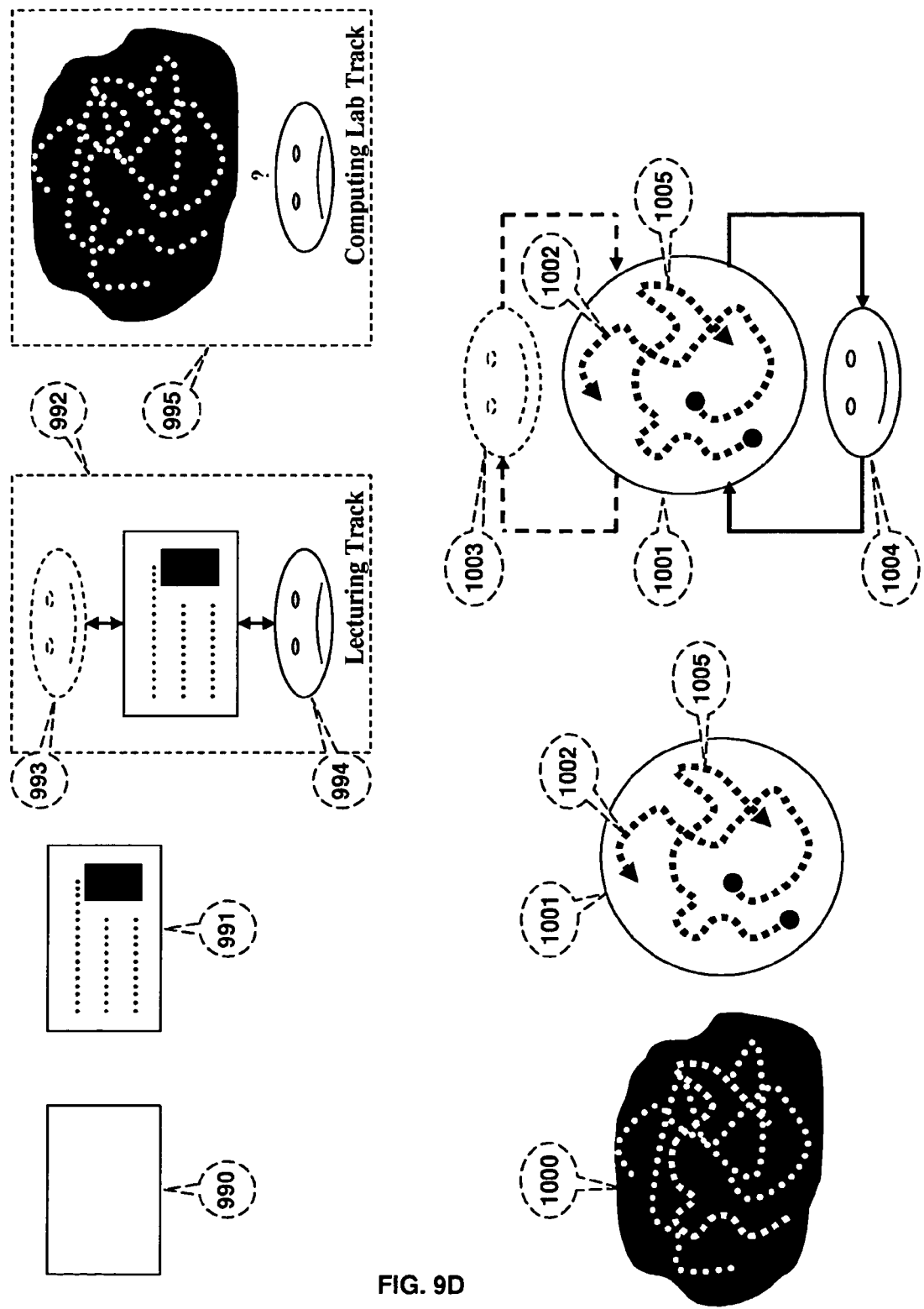
FIG. 9D is the description of the current media (planar, static) vs. the new software media (n-dimensional, dynamic) authoring and distribution.

Current education systems, especially in colleges and professional training, use books in paper or electronic formats as the representation media of knowledge. It requires a huge endeavor to represent the results or discoveries resulting from running the professional software. It uses the 2-dimensional document space to render the author's thought. The process can be best served by FIG. 9D. It starts with the blank space 990 as the representation canvas. To prepare a lecturing document, the author usually writes down manually his understanding and utilizes the software to simulate some subjects. Then he needs to cut and paste painstakingly those simulated results into the document as in 991. Delivering written knowledge usually starts with a classroom lecture as one track 992 with the lecturer 993 delivering the course to the students 994. It ends with requiring the students to run the software out of the classroom in a computer lab as another track 995. The separated class/lab track system disrupts the dynamic nature of knowledge that has been already captured in the software. Obviously, the current process is static and without structure.

The new education system based on this invention uses the software-2 as the representation medium. First, it uses the software 1000 that has been programmed with the features and the algorithms as the representation canvas. This is in stark contrast to the blank document as in 990. If each pixel within a given width and height region can have its own dynamics over the discrete sampling domain K, 1000 can be viewed as an n-dimensional software space where n=width× height. Instead of writing a page, a chapter or a book in the document statically, the author can design an programmable agent that projects a trajectory or multiple trajectories over the software space dynamically. In other words, instead of writing the book in a 2-dimensional document space, the author writes the book in an n-dimensional software space.

1001 is the modeled software dynamics that best represents the underlying domain knowledge. After the modeled software dynamics is acquired, the author now can use the index augmentation to partition the modeled software dynamics. First, he can create virtual states that are unrelated to the topic such as setting up the software for operational purposes. Next, he can structure the modeled software dynamics using chapters or keyword indices so that the simulation can be started at any structured point. He can incorporate the extension augmentation to integrate his understanding of the subject into the modeled software dynamics. Since the software is built to simulate the underlying domain knowledge, 1002 that is a modeled course trajectory can simulate the simulation of the underlying domain knowledge. By extending the software machines over the Internet, the lecturer 1003 is able to engage a group of students 1004 over the Internet to deliver his lecture within the modeled course trajectory 1002 state by state. The learning experience is no longer merely passively watching and listening; it is actively running and interacting with the software machinery on both ends (1003-1004$s$) in real-time to simulate the course content 1002.

While the course content is programmed into the course trajectory as 1002, another off-beat Lab track can also be designed in the software space as 1005. 1005 is the Lab trajectory that can be programmed to drive out an independent trajectory or integrated into the course trajectory 1002. The Lab trajectory 1005 can simulate the operation of the underlying software. The course trajectory 1002 and the Lab trajectory 1005 are molded into one software machine so that the learning and the lab experiences can be blended into one process. Thus, all the teaching-learning activities are organized into one track of the modeled software dynamics seamlessly.

With the modeled causality in vivid display, this mechanized higher level dynamic simulation process can provoke far more intellectual activities in the students' minds than the current system can. Students can study and simulate the course and the lab off-line all in one interactive process. Students also can join the course over the Internet by connecting his software machine to the Master machine to construct the Master-Machine-Learner loop. These enhanced software machines webbed together are organized as a giant classroom that is highly controllable. Now a human master or a lecturer can extend his intellectual mind into the students' mind through the structured teaching-learning machinery over real-time communications. Instead of watching a lecturer's talking face only, now learners can operate his own software machine that is in the same dynamic process state by state as the lecturer's. In sync with the machinery over the Internet, learners can raise questions while running his software machine and the lecturer can pause to answer the questions. Diametrically, the lecturers can pose the questions, provide visual hints, and wait for the learners to respond. All the activities performed interactively within the same running context in real-time by unlimited learners and one Master are surely not random, spontaneous acts since they are modeled and programmed in deliberation before coming on-line, executed and simulated in controlled machinery and interacted in person to person in real-time. The faculty of simulated machines and minds that are networked over the Internet bears the hallmark of human intuition and machine precision all in one.

Based on the invention, the value and power of software are no longer limited to performing tasks as tools originally were designed to accomplish; there exists such a renewed intellectual value and power that can be harvested mechanically from an epistemic viewpoint that every software becomes a learning organization. The best setting for teaching and learning for an individual or a group is built around the software-2 that contains knowledge mined from the software. For example, finite-element analysis for the mechanical engineering major can be taught and learned based on advanced algorithms programmed in some high-end CAD software. Instead of a 2-dimensional, static paper space, the class is built on an n-dimensional software dynamics space that is extracted from that CAD software and augmented programmatically. The extracted software space has every "genetic marker" of the underlying software, but is better structured, organized and anchored to a mathematical process—a software dynamic process. The teaching and learning experience becomes a co-simulating process that is dynamically and interactively performed over the Internet in real-time.

CONCLUSION

While the above is a complete description of preferred embodiments of the invention, various alternatives, modifications, and equivalents may be used. For example, in another embodiment of the present invention, the techniques disclosed here can be applied to the automatic software graphical user interface (GUI) test. Obviously, a failed software operation will fail the software modeling process. By utilizing the programmed test script as the agent A to control the software, it achieves two goals with one operation, an automatic test as well as a software modeling process that produces a model of the software if the software under test functions correctly. Directly from nothing comes a new software product made from an otherwise discarded test script. That is the modeled software and the reused test script connected as a software simulation system.

Although specific embodiments have been illustrated and described in Microsoft® Windows® environment, the principles of the present invention may be readily applied to other operating systems, including Macintosh OS X, Linux, Solaris, UNIX and the like. It will be appreciated by those of ordinary skill in the art that any arrangement which is calculated to achieve the same purpose may be substituted for the specific embodiments shown. This application is intended to cover any adaptations or variations of the present invention.

Therefore, it is manifestly intended that this invention be limited only by the following claims and equivalents thereof.

The invention claimed is:

1. A method for modeling and simulating software running interactively directly or indirectly on at least one digital computer, comprising the steps of:
   providing a display;
   providing an input, wherein said input connects at least one of a pointing device, a keyboard and external interactive devices to said software;
   providing an output, wherein said output connects a block of memory to said display;
   providing a software controller, wherein said software controller is a programmable agent controlling said software to perform tasks in a closed-loop fashion;
   providing a software modeling process, wherein said software modeling process models an interaction process between said software and said software controller, further comprising the sub-steps of:
   (a) connecting said software controller with said software through an input and an output of said software,
   (b) controlling said software by said software controller automatically and programmatically through a sequence of action steps; wherein said sequence of action steps is preprogrammed in said software controller and executed by said software controller, and
   (c) identifying a model of said software on-line under control of said software controller, wherein said model of said software includes models of input and output behavior of said software; wherein said model of input behavior of said software models at least one control enabling structure; wherein said at least one control enabling structure is identified and recorded while powered by said software; wherein said model of output behavior of said software models at least one display screen region; and
   providing a software simulation process, wherein said software simulation process simulates said interaction process between said software and said software controller, further comprising the sub-steps of:
   (d) connecting said software controller with said model of said software through a simulated input and a simulated output of said model of said software,
   (e) controlling said model of said software by said software controller automatically and programmatically through said sequence of action steps, and
   (f) simulating said interaction process between said software and said software controller without said software presence; and
   wherein said software simulation process is a new software that comprises said model of said software and said software controller.

2. The method of claim 1, further comprising the step of:
   providing a discrete sampling domain, wherein said discrete sampling domain is a finite integer sequence K driven by said software controller with a current sampling k indicating the most recent sampling.

3. The method of claim 2, further comprising the steps of:
   providing a software dynamic system to represent said software modeling process, wherein said software dynamic system is a discrete system defined over said discrete sampling domain K;
   wherein said software simulation process simulates said software dynamic system.

4. The method of claim 3, further comprising the steps of:
   factoring said software into an algorithm engine and a cursor engine;
   identifying a model of said algorithm engine and a model of said cursor engine in said software modeling process;
   controlling said model of said algorithm engine and said model of said cursor engine in parallel by said software controller in said software simulation process; and
   combining an output of said model of said algorithm engine and an output of said model of said cursor engine as said simulated output of said model of said software in said software simulation process.

5. The method of claim 4, wherein said cursor engine is modeled, identified and simulated, wherein the method further comprises the steps of:
   providing a cursor function, wherein said cursor function calculates a cursor output based on a cursor position, a data structure and a plurality of cursor images;
   wherein said cursor function models said cursor engine analytically;
   providing a cursor engine modeler, wherein said cursor engine modeler identifies said data structure and said plurality of cursor images while said cursor engine is controlled by said software controller in said software modeling process;
   wherein said model of said cursor engine under control of said software controller comprises said cursor function with said identified data structure and said identified cursor images;

wherein said model of said cursor engine simulates said cursor engine in said software simulation process, further comprising the sub-steps:
    controlling said model of said cursor engine by said software controller in said software simulation process;
    calculating said cursor output by said cursor function in said software simulation process based on,
        said identified data structure,
        said identified cursor images, and
        said cursor position that is supplied by said software controller;
    whereby said cursor engine is simulated by said model of said cursor engine that is controlled by said software controller in said software simulation process without said software presence.

6. The method of claim 4, wherein said algorithm engine is modeled and identified, wherein the method further comprises the steps of:
    providing an initial state of said algorithm engine, wherein said initial state of said algorithm engine is sampled at first output of said software;
    providing a update function, wherein said update function is a sequence of discrete updates over said discrete sampling domain;
    wherein said update function with said initial state models said algorithm engine;
    providing an algorithm engine modeler, wherein said algorithm engine modeler samples said sequence of discrete updates while said software is controlled by said software controller in said software modeling process;
    wherein said model of said algorithm engine identified comprises said sampled initial state and said sampled sequence of discrete updates as a modeled algorithm engine.

7. The method of claim 6, wherein said algorithm engine modeler is controlled by said software controller and said algorithm engine.

8. The method of claim 7, wherein said algorithm engine modeler is controlled by two sub-samplers, wherein the method further comprises the steps of:
    providing a direct input and output sampler;
    providing an internal computation sampler; and
    wherein said direct input and output sampler and said internal computation sampler run mutually exclusively.

9. The method of claim 8, wherein said direct input and output sampler controls said algorithm engine modeler to sample at least one discrete update induced directly by a command from said software controller, wherein the method further comprises the steps of:
    issuing said command by said software controller;
    waiting for $T(\alpha)$, wherein said $\alpha<1$;
    calling said direct input and output sampler by said software controller;
    triggering said algorithm engine modeler by said direct input and output sampler to sample said discrete update $D(k+\alpha)-D(k)$;
    holding said command by said software controller;
    advancing said current sampling k by one;
    modeling $D(k+\alpha)$ as $D(k+1)$.

10. The method of claim 9, wherein said direct input and output sampler is callable by said software controller programmatically.

11. The method of claim 8, wherein said internal computation sampler controls said algorithm engine modeler to sample at least one discrete update, wherein the method further comprises the steps of:

(a) providing an internal computation flow, wherein said internal computation flow is executed by said algorithm engine;
(b) providing at least one anchored point in said internal computation flow, wherein said anchored point is an internal computation unit of said algorithm engine with its computation state transition to be sampled precisely;
(c) providing a software sensor, wherein said software sensor is attached into said anchor point;
(d) setting up said software sensor with a numberOfStates argument, wherein said numberOfStates argument specifies computation state transitions to be observed;
(e) driving said algorithm engine to said internal computation unit;
(f) calling said software sensor before said internal computation unit is processed;
(g) processing said internal computation unit;
(h) calling said software sensor after said internal computation unit is processed;
(i) subtracting said numberOfStates argument by one;
(j) if said numberOfStates argument is not zero, repeating steps (e)-(j); otherwise
(k) removing said software sensor.

12. The method of claim 11, wherein said software sensor is an Event Probe that may perform any programmed function including triggering said sampling by said algorithm engine modeler, wherein the method further comprises the steps of:
    providing an anchored event, wherein said anchored event is a window message;
    wherein said anchored event processing is said anchored point;
    modifying a callback function address of an internal window message processing;
    driving said algorithm engine to said internal window message processing;
    providing a dispatch unit, wherein said dispatch unit checks a current message with said anchored event, if a match is found, then,
        calling a BeforeEvent Probe, wherein said BeforeEvent Probe is said Event Probe, and
        processing said anchored event processing,
        calling an AfterEvent Probe, wherein said AfterEvent Probe is said Event Probe, and
        returning from said internal window message processing;
    otherwise, processing an internal window message process.

13. The method of claim 11, wherein said software sensor is an API Probe that may perform any programmed function including triggering said sampling by said algorithm engine modeler, wherein the method further comprises the steps of:
    (a) providing a marker function, wherein said marker function is an application programming call that is modeled as said anchored point within said internal computation flow;
    (b) modifying a binary execution image of said software to reroute a calling to said marker function to a new function, wherein said new function includes at least one of said API probes and a call to said marker function;
    (c) driving said algorithm engine to said internal computation flow;
    (d) proceeding to said marker function;
    (e) calling a BeforeMarker probe before said marker function is processed, wherein said BeforeMarker is said API Probe;
    (f) processing said marker function;

(g) calling an AfterMarker probe after said marker function is processed, wherein said AfterMarker is said API Probe;

(h) subtracting said numberOfStates argument by one;

(i) if said numberOfStates argument is not zero, (repeating steps (c)-(i); otherwise (k) controlling said algorithm engine to stop said processing of said internal computation flow;

(l) removing said BeforeMarker and AfterMarker probes.

14. The method of claim 11, wherein said step of providing at least one anchored point in said internal computation flow is a part of an analytical modeling of said algorithm engine.

15. The method of claim 11, further comprising the step of:
providing a controlled target, wherein said controlled target is said software in said software modeling process, or said model of said software in said software simulation process;
providing an input of said controlled target, wherein said input of said controlled target is said input of said software in said software modeling process, or said simulated input of said model of said software in said software simulation process;
providing an output of said controlled target, wherein said output of said controlled target is said output of said software in said software modeling process, or said simulated output of said model of said software in said software simulation process.

16. The method of claim 15, wherein said software controller further comprises,
a work-flow controller, wherein said work-flow controller controls said controlled target to manipulate at least one user interface; and
a work-space controller, wherein said work-space controller controls said controlled target to perform at least one design function.

17. The method of claim 16, wherein said work-space controller comprises at least one of a coordinate controller and a functional controller.

18. The method of claim 17, wherein said coordinate controller performs said design function, wherein the method further comprises the step of:
providing a list of coordinates, wherein said list of coordinates are used to drive said input of said controlled target.

19. The method of claim 17, wherein said functional controller performs said design function, wherein the method further comprises the steps of:
providing at least one modelable function, wherein said modelable function is called with parameters to calculate coordinates;
wherein said coordinates are used to drive said input of said controlled target.

20. The method of claim 19, further comprising the step of:
providing at least one software actuator, wherein said software actuator connects said software controller to said controlled target.

21. The method of claim 20, wherein said software actuator models at least one graphical user interface element of said controlled target.

22. The method of claim 21, wherein said software actuator comprises a work-flow actuator interfacing to said work-flow controller of said software controller, wherein the method further comprises the steps of:
sending a high level command from said work-flow controller to said work-flow actuator, wherein said high level command comprises a tag and an input command;
calculating a valid region based on said tag by said work-flow actuator;
translating said command to at least one primitive action by said work-flow actuator;
if said command is for said pointing device, then
computing a target position by said work-flow actuator based on said valid region,
driving said input of said controlled target to said target position by said work-flow actuator, and
applying said primitive action to said target by said work-flow actuator;
else,
applying said primitive action to said valid region by said work-flow actuator.

23. The method of claim 22, wherein said step of calculating said valid region based on said tag further comprises the steps of:
if running in said software modeling process, then
powering said valid region by said software,
identifying said valid region based on said tag on-line,
calculating said valid region, and
saving said valid region with said tag as a part of said model of said software;
otherwise, running in said software simulation process,
simulating said valid region by said model of said software,
retrieving said valid region based on said tag from said model of said software, and
calculating said valid region.

24. The method of claim 23, wherein said step of identifying said valid region based on said tag in said software modeling process further comprises the steps of:
providing a unique textual name, wherein said unique textual name is said tag;
providing a unique relation, wherein said unique relation is coded in a string and assigned as said unique textual name;
finding a unique handle from said software based on said tag, wherein said handle is uniquely located by said unique relation that is coded in said tag;
identifying said valid region based on said unique handle that is powered by said software.

25. The method of claim 24, wherein said unique relation is a parent-children-sibling relation that is defined uniquely by said graphical user interface element of said software.

26. The method of claim 23, wherein said software actuator installs at least one software sensor.

27. The method of claim 23, further comprising the steps of:
providing a running context of said controlled target, wherein said running context is dynamically reconstructed by said software actuator in said software simulation process;
providing a structured input and output, wherein said structured input and output structuralizes said input and output of said controlled target based on said running context;
providing a feedback from said controlled target to said software controller through said structured output of said controlled target;
inferring a causal relationship from said running context.

28. The method of claim 21, wherein said software actuator comprises a work-space actuator interfacing to said work-space controller of said software controller, wherein the method further comprises the steps of:
(a) sending a high level command from said work-space controller to said work-space actuator;

(b) calculating a coordinate by said work-space actuator;
(c) translating said high level command to at least one primitive action by said work-space actuator;
(d) driving said input of said controlled target to said coordinate by said work-space actuator;
(e) applying said primitive action to said coordinate by said workspace actuator;
(f) repeating steps (b)-(f) if at least one coordinate remains.

29. The method of claim 28, wherein said step of calculating said coordinates further comprises the steps of:
providing a list of coordinates, wherein said list of coordinates is an array of elements with each element having a coordinate (x,y);
wherein said coordinate is retrieved sequentially from said array until the end of said array is reached.

30. The method of claim 28, wherein said step of calculating said coordinate further comprises the steps of:
providing at least one modelable function, wherein said modelable function calculates said coordinate based on at least one parameter that is supplied by said software controller;
wherein said modelable function implemented by said workspace actuator is a mathematical function that is scalable.

31. The method of claim 21, wherein said software actuator is a system actuator if a system standard graphical user interface element is modeled by said software actuator.

32. The method of claim 31, wherein said system actuator is reusable universally for a plurality of said software modeling processes and said software simulation processes.

33. The method of claim 21, wherein said software actuator is a custom actuator if a one custom-built graphical user interface element is modeled by said software actuator.

34. The method of claim 33, wherein said custom actuator is reusable for a plurality of said software controllers for said software modeling process and said software simulation process.

35. The method of claim 20, further comprising the steps of:
modularizing said software modeling process and said software simulation process;
replacing said software with said model of said software that is identified in said software modeling process;
switching from said software modeling process to said software simulation process;
preserving said connection between said software controller and said software actuator so that said software controller is kept invariant in said modeling process and said simulation process.

36. The method of claim 20, wherein said algorithm engine is simulated, wherein the method further comprises the steps of:
controlling said modeled algorithm engine by said software controller;
simulating said algorithm engine.

37. The method of claim 36, wherein said step of controlling said modeled algorithm engine in said software simulation process further comprises the steps of:
providing a Dynamic Update, wherein said Dynamic Update simulates said output of said algorithm engine;
reconstructing an output of said modeled algorithm engine, wherein said output of said modeled algorithm engine is updated by said Dynamic Update in sync with said software controller;
providing at least one simulated sampler, wherein said simulated sampler simulates said sampler used in said software modeling process;
controlling said Dynamic Update to update one output of said modeled algorithm engine by said simulated sampler if said sampler samples one discrete update of said algorithm engine in said software modeling process.

38. The method of claim 37, wherein said simulated sampler is controlled by said software controller through said software actuator.

39. The method of claim 38, wherein said simulated sampler is a simulated direct input and output sampler that symmetrically simulates said direct input and output sampler used in said software modeling process.

40. The method of claim 39, wherein said software actuator drives said simulated direct input and output sampler, wherein the method further comprises the steps of:
modeling a sampling that is induced directly by said command from said software controller;
simulating said sampling by calling said simulated direct input and output sampler.

41. The method of claim 39, wherein said software actuator simulates said internal computation flow of said algorithm engine, wherein the method further comprises the steps of:
modeling a sampling event, wherein said sampling event samples after or before said internal computation unit is processed;
simulating said sampling event by calling said simulated internal computation sampler.

42. The method of claim 38, wherein said simulated sampler is a simulated internal computation sampler that symmetrically simulates said internal computation sampler used in said software modeling process.

43. The method of claim 38, further comprising the step of:
creating a simulated discrete sampling domain from the execution flow of said software controller in said software simulation process, wherein said simulated discrete sampling domain is identical causally to said discrete sampling domain.

44. The method of claim 43, further comprising the steps of:
providing a compressing transformation on said simulated discrete sampling domain, wherein said compressing transformation reduces a time duration between two samplings in said software simulation process while causality is preserved;
providing a stretching transformation on said simulated discrete sampling domain, wherein said stretching transformation extends a time duration between two samplings in said software simulation process while causality is preserved.

45. The method of claim 37, wherein said Dynamic Update downloads and streams from an external source to update said output of said modeled algorithm engine.

46. The method of claim 45, wherein said external source is at least one local file.

47. The method of claim 45, wherein said external source is at least one Internet server.

48. The method of claim 3, wherein said software modeling process is a software modeling automation that runs autonomously.

49. The method of claim 48, wherein said software simulation process is a software simulation automation that runs autonomously, wherein the method further comprises the step:
providing an output of said software simulation automation, wherein said output of said software simulation automation is said output of said model of said software that is manipulable.

50. The method of claim 49, wherein said software simulation automation is augmented with additional computation while said software dynamic system is preserved.

51. The method of claim 50, wherein the step of augmenting said software simulation automation further comprises the steps of:
providing an interaction input component H, wherein said interaction input component H engages a user to interact with said software simulation automation;
providing an index component G, wherein said index component G controls visibility of said output of said software simulation automation;
providing a programmable extension component E, wherein said programmable extension component E extends programmatically said software simulation automation with additional computational process.

52. The method of claim 51, wherein said interaction input component H is inserted between said output of said software controller and said input of said model of said software, wherein the method further comprises the steps of:
(a) updating said software simulation automation at a current sampling k;
(b) executing a programmed interaction by said software controller;
(c) updating a running context, wherein said running context includes a valid region, a pointing device status, a keyboard status, and a current command which are generated from said programmed interaction by said software controller;
(d) transferring execution of said software simulation automation to said H;
(e) waiting for an interaction input from said user;
(f) receiving said interaction input from said user;
(g) comparing said interaction input with said running context;
(h) if said interaction input is matched with said running context, then continuing said execution of said software simulation automation;
(i) otherwise, repeating steps (e)-(i).

53. The method of claim 52, further comprising the steps of:
providing a controlled target, wherein said controlled target is said Microsoft Internet Explorer Browser component;
lively running said Internet Explorer Browser component in said software simulation automation;
programming web browsing activities by said software controller;
engaging said user with said web browsing activities interactively or automatically.

54. The method of claim 51, wherein said interaction input component H is independent of said software simulation automation and said His applicable universally to any software simulation automation.

55. The method of claim 51, wherein said interaction input component H can be plugged or unplugged into said software simulation automation programmatically so that said software simulation automation can run interactively or automatically.

56. The method of claim 51, wherein said index component G indexes said software simulation automation selectively, wherein the method further comprises the steps of:
(a) providing at least one index set $K_I$, wherein said $K_I$ is a subset of said discrete sampling domain K;
(b) updating said output of said software simulation automation in a memory that is invisible;
(c) providing a gated output-mapping function, wherein said gated output-mapping function controls copying from said memory to said display based on said index set $K_I$;
(d) running said software simulation automation;
(e) updating a current output of said software simulation automation at a current sampling k in said memory;
(f) if said current sampling k∈$K_I$, then,
copying said current output from said memory to said display by said gated output-mapping function,
continuing said simulation;
(g) otherwise,
advancing said current sampling k by one, repeating steps (e)-(q) as fast as computationally possible.

57. The method of claim 56, further comprising the steps of:
providing first textual term, wherein said first textual term is associated with a sampling $k_1$;
providing second textual term, wherein said second textual term is associated with a sampling $k_2$;
providing at least one pair of descriptive textual terms for searching, wherein one in said descriptive textual terms is said first textual term, and said other in said descriptive textual terms is said second textual term;
conducting searches based on said descriptive textual terms to find two samplings $k_1$ and $k_2$;
running said software simulation automation;
updating said current output of said software simulation automation in said memory;
if said current sampling k>=$k_1$ and k<$k_2$, then copying said output of said software simulation automation from said memory to said display by said gated output mapping function;
selectively running at least one segment of simulation from $k_1$ to $k_2$−1 visually while computationally running said software simulation automation internally.

58. The method of claim 51, wherein said programmable extension component E extends additional computation into said output of said software simulation automation, wherein the method further comprises the steps of:
providing a new programmable function, wherein said new programmable function implements a sub-process;
updating a current output of said software simulation automation at said current sampling k;
extending said new sub-process with said current output as an initial state and a next output of said software simulation automation as a final state;
computing at least one sub-state with said new programmable function, wherein said sub-state in said sub-process updates over said output of said software simulation automation;
updating said next output of said software simulation automation at said current sampling k+1.

59. The method of claim 58, wherein said new programmable function is a Microsoft Internet Explorer Browser component, wherein the method further comprises the steps of:
providing a DHTML page, wherein said DHTML page is loaded by said Microsoft Internet Explorer Browser component;
providing a Document Object Model (DOM), wherein said Document Object Model is programmed in said DHTML page;
providing a URL link, wherein said URL link is encoded in said DHTML page;
providing a target region, wherein said target region is defined by said Document Object Model;

clicking or typing in said target region;
navigating to said URL link.

60. The method of claim 51, further comprising the steps of:
providing a software amplification device, wherein said software amplification device comprises
said software controller,
said interaction input component H,
said index component G, and
said programmable extension component E;
wherein said software amplification device connects with said model of said software in a top loop;
feeding an augmented output of said model of said software through said software amplification device;
sensing said augmented output by a user as an input from said software amplification device;
engaging said user with said software amplification device in a bottom loop;
making an interaction movement by said user as an output to said software amplification device; and
interacting said model of said software by said user through said software amplification device.

61. The method of claim 60, further comprising the steps of:
(a) running a sub-process in said programmable extension component E to prepare said user to take a right interaction, wherein said sub-process implements at least one programmable function;
(b) executing a programmed interaction, wherein said programmed interaction is performed by said software controller;
(c) updating a running context, wherein said running context includes a valid region, a pointing device status, a keyboard status, and a current command which are generated from said programmed interaction by said software controller;
(d) waiting in said interaction input component H until said user taking a right interaction input against said running context;
(e) scoring said interaction input by said H;
(f) if said score is higher than a level assigned to a next output of said software simulation automation, then under control of said index component G,
updating said next output of said software simulation automation invisibly,
forgoing a next sub-process,
canceling a next programmed interaction;
(g) otherwise, visually updating said next output of said software simulation automation;
(h) repeating steps (a)-(h) until reaching a final of said software simulation automation.

62. The method of claim 60, wherein said interaction input component H, said index component G, and said programmable extension component E are implemented in modular ways so that each component can be bypassed programmatically.

63. The method of claim 51, further comprising the steps of:
providing a software intelligence device, wherein said software intelligence device comprises,
said model of said software,
said interaction input component H,
said index component G, and
said programmable extension component E;
wherein said software intelligence device connects with said software controller;
wherein said model of said software further comprises
a setup part,
a modeled algorithm engine part, and
an output part;
wherein said setup part is simulated invisibly under control of said index component G;
wherein said modeled algorithm engine part is extended with an input reasoning by said programmable extension component E;
wherein said output part is extended with an output reasoning by said programmable extension component E;
interactively simulating modeled algorithm engine through said interaction input component H by a human user.

64. The method of claim 51, further comprising the steps of:
providing a software-2, wherein said software-2 comprises an automation loop and an interaction loop;
wherein said automation loop simulates and augments a modeled software dynamic system that runs autonomously;
wherein said interaction loop engages a human user interactively into said automation loop;
wherein said interaction loop couples with said automation loop programmatically.

65. The method of claim 64, further comprising the steps of:
providing at least one web server;
providing a plurality of same software-2, wherein said plurality of same software-2 are connected to said web server through the Internet;
wherein each of said plurality of same software-2 is run interactively by a user locally;
providing a Master machine, wherein said Master machine is selected from said plurality of software-2;
providing a Master, wherein said Master runs said Master Machine;
providing a group of Learner machines, wherein said group of Learner machines are the rest of said plurality of software-2;
providing a group of Learner, wherein each Learner inside said group of Learners runs each Learner machine inside said group of Learner machines;
providing a HTTP request/response protocol over the Internet, wherein said HTTP request/response protocol is used to control the execution of said group of Learner machines by said Master machine;
synchronizing said state of said Learner machines with said state of said Master machine interactively by said Master through said web server;
communicating among said plurality of software-2 machines interactively through the Internet in real-time.

66. The method of claim 65, further comprising the steps, communicating between said Master machine and said web server, further comprising the sub-steps of:
(a) said Master machine transiting to a state, wherein said state expects an interaction input from said Master,
(b) said Master machine posting a request including a current sampling $k_m$ to said web server,
(c) said Master machine waiting for a response from said web server
(d) said web server recording said request information including said $k_m$,
(e) said web server sending said response to said Master, and
(f) releasing said Master machine to continue said simulation, (g) said Master machine pausing said simulation for a local interaction input from said Master in said local interaction input component H, (h) said Master machine exchanging message with said group of Learner instantly through the Internet in real-time while said local interaction input component H waits for said interaction input, (i) said Master making said interaction input to said simulation, and (j) said Master machine continuing said simulation; and communicating between anyone of said Learner machines and said web server, further comprising the sub-steps of:

(k) said Learner machine transiting to a state, wherein said state expects an interaction input from said Learner, (l) said Learner machine posting a request including a current sampling k to said web server, (m) said Learner machine waiting for a response from said web server, (n) said web server comparing between said k and said $k_m$ of said Master machine recorded most recently, if $k<k_m$ then, web server sending said response to said Learner machine by immediately, said Learner machine continuing said simulation, and if $k>=k_m$, then, web server suspending said response to said Learner machine, and said Learner machine blocking said simulation, if $k=k_m$, then, said Learner machine exchanging messages interactively and instantly through the Internet, until said Master machine posting its current sampling $k_m>k$ to said web server, then, said web server sending said response to said Learner machine, and said Learner machine releasing blocking to continue said simulation;

creating a Master-Machine-Learner interaction loop, wherein said Master-Machine-Learner interaction loop is a dynamic mechanism that couples said Master with said Learners virtually through said software-2 machines over the Internet.

67. The method of claim 66, wherein said step of exchanging messages instantly through the Internet further comprises the steps of:

providing a machine, wherein said machine has said current sampling $k=k_m$; said machine sending a message to said web server, wherein said message is selected from the group consisting of a text, an animation, a script command, a URL, and combination thereof; and web server sending said message to all other machines that have said current sampling $k=k_m$ instantly.

68. The method of claim 65, wherein said step of communicating among said plurality of software-2 machines interactively through the Internet in real-time, further comprises the steps of:

providing at least one service over the Internet to said group of Learner machines by at least one service provider, wherein said service is a multimedia service delivered in real-time;

controlling said service by said Master machine;

synchronizing said service with said Master machine and said Master.

69. The method of claim 65, further comprising the steps of:

providing a Master machine, wherein said Master machine is run interactively by a Master;

providing a simulation service over the Internet through real-time communication, wherein said simulation service is published by said Master machine;

providing at least one Learner machine, wherein said Learner machine is run interactively by a Learner;

wherein said Learner machine subscribes to said simulation service over the Internet through real-time communication;

providing a Master-Machine-Learner loop over the Internet, wherein said Master-Machine-Learner loop is a Human-Machine-Human interaction running the same software-2 machines in sync through real-time communication.

70. The method of claim 69, further comprising the steps of:

providing a book, wherein said book is authored by programming said software controller to drive said software;

projecting at least one of, (a) a course trajectory running over said software, wherein said course trajectory simulates simulation of the underlying domain knowledge, and (b) a Lab trajectory running over said software, wherein said Lab trajectory simulates operation of said software;

wherein said simulation of the underlying domain knowledge is programmed in said software;

wherein said operation of said software is programmed in said software;

identifying said model of said software in said software modeling process;

structuring said model of said software using chapters and keyword indices based on said index component G;

extending a new subject understanding into said model of said software based on said programmable extension component E;

simulating a course content interactively over the Internet in said Master-Machine-Learner loop or locally, wherein said course content is programmed in said course trajectory;

simulating a Lab track interactively over the Internet in said Master-Machine-Learner loop or locally, wherein said Lab track is programmed in said lab trajectory;

organizing teaching-learning activities in a web of software-2 simulation activities.

71. A system for modeling and simulating software running interactively directly or indirectly on at least one digital computer, comprising:

at least one processor;

a display;

a computer readable media;

a memory, wherein said memory is a part of said computer readable media coupled to said at least one processor;

an input, wherein said input connects at least one of a pointing device, a keyboard and external interactive devices to said software;

an output, wherein said output connects a block of memory to said display;

a software controller stored on said computer readable media, wherein said software controller is a programmable agent controlling said software to perform tasks in a closed-loop fashion;

a software modeling process implemented on said computer readable media, wherein said software modeling process models an interaction process executed on said at least one processor between said software and said software controller, further configured to,
- (a) connect said software controller with said software through an input and an output of said software,
- (b) control said software by said software controller automatically and programmatically through a sequence of action steps; wherein said sequence of action steps is preprogrammed in said software controller and executed by said software controller, and
- (c) identify a model of said software on-line under control of said software controller, wherein said model of said software includes models of input and output behavior of said software; wherein said model of input behavior of said software models at least one control enabling structure;

wherein said at least one control enabling structure is identified and recorded while powered by said software; wherein said model of output behavior of said software models at least one display screen region; and a software simulation process implemented on said computer readable media, wherein said software simulation process simulates said interaction process executed on said at least one processor between said software and said software controller, further configured to:
- (d) connect said software controller with said model of said software through a simulated input and a simulated output of said model of said software,
- (e) control said model of said software by said software controller automatically and programmatically through said sequence of action steps, and
- (f) simulate said interaction process between said software and said software controller without said software presence; and wherein said software simulation process is a new software that includes said model of said software and said software controller.

72. The system of claim 71, further comprising:
a discrete sampling domain, wherein said discrete sampling domain is a finite integer sequence K driven by said software controller with a current sampling k indicating the most recent sampling.

73. The system of claim 72, further comprising:
a software dynamic system to represent said software modeling process, wherein said software dynamic system is a discrete system defined over said discrete sampling domain K;
wherein said software simulation process simulates said software dynamic system.

74. The system of claim 73, further comprising:
an algorithm engine residing in said memory and a cursor engine residing in said memory, wherein said software is factored into said algorithm engine and said cursor engine;
a model of said algorithm engine, wherein said model of said algorithm engine is identified in said software modeling process;
a model of said cursor engine residing in said memory, wherein said model of said cursor engine is identified in said software modeling process;
wherein said model of said algorithm engine and said model of said cursor engine are controlled in parallel by said software controller in said software simulation process; and wherein an output of said model of said algorithm engine and an output of said model of said cursor engine are combined as said simulated output of said model of said software in said software simulation process.

75. The system of claim 74, wherein said cursor engine is modeled, identified and simulated, further comprising:
a cursor function residing in said memory, wherein said cursor function calculates a cursor output based on a cursor position, a data structure and a plurality of cursor images;
wherein said cursor function models said cursor engine analytically;
a cursor engine modeler residing in said memory, wherein said cursor engine modeler identifies said data structure and said plurality of cursor images while said cursor engine is controlled by said software controller in said software modeling process;
wherein said model of said cursor engine under control of said software controller comprises said cursor function with said identified data structure and said identified cursor images;
wherein said model of said cursor engine simulates said cursor engine in said software simulation process, wherein said software simulation process is executed on said at least one processor, further configured to:
control said model of said cursor engine by said software controller;
calculate said cursor output by said cursor function based on,
said identified data structure,
said identified cursor images, and
said cursor position that is supplied by said software controller;
whereby said cursor engine is simulated by said model of said cursor engine that is controlled by said software controller in said software simulation process without said software presence.

76. The system of claim 74, wherein said model of said algorithm engine is modeled and identified in said software modeling process, further comprising:
an initial state of said algorithm engine residing in said memory, wherein said initial state of said algorithm engine is sampled at first output of said software;
a update function residing in said memory, wherein said update function is a sequence of discrete updates over said discrete sampling domain;
wherein said update function with said initial state models said algorithm engine;
an algorithm engine modeler residing in said memory, wherein said algorithm engine modeler samples said sequence of discrete updates while said software is controlled by said software controller in said software modeling process;
wherein said model of said algorithm engine identified comprises said sampled initial state and said sampled sequence of discrete updates as a modeled algorithm engine.

77. The system of claim 76, wherein said algorithm engine modeler is controlled by said software controller and said algorithm engine.

78. The system of claim 77, wherein said algorithm engine modeler is controlled by two sub-samplers, further comprising:
a direct input and output sampler residing in said memory;
an internal computation sampler residing in said memory; and wherein said direct input and output sampler and said internal computation sampler run mutually exclusively.

79. The system of claim 78, wherein said direct input and output sampler controls said algorithm engine modeler to sample at least one discrete update induced directly by a command from said software controller, further comprising means for:
- issue said command by said software controller;
- wait for T($\alpha$), wherein said $\alpha$<1;
- call said direct input and output sampler by said software controller;
- trigger said algorithm engine modeler by said direct input and output sampler to sample said discrete update D(k+$\alpha$)–D(k);
- hold said command by said software controller;
- advance said current sampling k by one;
- model D(k+$\alpha$) as D(k+1).

80. The system of claim 79, wherein said direct input and output sampler is callable by said software controller programmatically.

81. The system of claim 78, wherein said internal computation sampler controls said algorithm engine modeler to sample at least one discrete update that is driven by an internal computation flow inside said algorithm engine, further comprising:
   (a) an internal computation flow residing in said memory, wherein said internal computation flow is executed by said algorithm engine;
   (b) at least one anchored point in said internal computation flow, wherein said anchored point is an internal computation unit of said algorithm engine with its computation state transition to be sampled precisely;
   (c) a software sensor residing in said memory, wherein said software sensor is attached into said anchor point;
   (d) means for setting up said software sensor with a numberOfStates argument, wherein said numberOfStates argument specifies computation state transitions to be observed;
   (e) means for driving said algorithm engine to said internal computation unit;
   (f) means for calling said software sensor before said internal computation unit is processed;
   (g) means for processing said internal computation unit;
   (h) means for calling said software sensor after said internal computation unit is processed;
   (i) means for subtracting said numberOfStates argument by one;
   (j) a logic residing in said memory to check said numberOfStates argument is not zero, wherein if said logic is true, repeating steps (e)-(j); otherwise
   (k) means for removing said software sensor.

82. The system of claim 81, wherein said software sensor is an Event Probe that may perform any programmed function including triggering said sampling by said algorithm engine modeler, further comprising:
   an anchored event communicating in said memory, wherein said anchored event is a window message;
   wherein said anchored event processing is said anchored point;
   means for modifying a callback function address of an internal window message processing;
   means for driving said algorithm engine to said internal window message processing;
   a dispatch unit residing in said memory, wherein said dispatch unit checks a current message with said anchored event, if a match is found, then,
      means for calling a BeforeEvent Probe, wherein said BeforeEvent Probe is said Event Probe, and
      means for processing said anchored event processing,
      means for calling an AfterEvent Probe, wherein said AfterEvent Probe is said Event Probe, and
      means for returning from said internal window message processing;
   otherwise, means for processing an internal window message process.

83. The system of claim 81, wherein said software sensor is an API Probe that may perform any programmed function including triggering said sampling by said algorithm engine modeler, further comprising:
   (a) a marker function residing in said memory, wherein said marker function is an application programming call that is modeled as said anchored point within said internal computation flow;
   (b) means for modifying a binary execution image of said software to reroute a calling to said marker function to a new function, wherein said new function includes at least one of said API probes and a call to said marker function;
   (c) means for driving said algorithm engine to said internal computation flow;
   (d) means for proceeding to said marker function;
   (e) means for calling a BeforeMarker probe before said marker function is processed, wherein said BeforeMarker is said API Probe;
   (f) means for processing said marker function;
   (g) means for calling an AfterMarker probe after said marker function is processed, wherein said AfterMarker is said API Probe;
   (h) means for subtracting said numberOfStates argument by one;
   (i) a logic residing in said memory to check said numberOfStates argument is not zero, wherein if said logic is true, repeating steps (c)-(i); otherwise
   (j) means for controlling said algorithm engine to stop said processing of said internal computation flow;
   (k) means for removing said BeforeMarker and AfterMarker probes.

84. The system of claim 81, further comprising:
   a controlled target residing in said memory, wherein said controlled target is said software in said software modeling process, or said model of said software in said software simulation process;
   an input of said controlled target residing in said memory, wherein said input of said controlled target is said input of said software in said software modeling process, or said simulated input of said model of said software in said software simulation process;
   an output of said controlled target residing in said memory, wherein said output of said controlled target is said output of said software in said software modeling process, or said simulated output of said model of said software in said software simulation process.

85. The system of claim 84, wherein said software controller further comprises,
   a work-flow controller residing in said memory, wherein said work-flow controller controls said controlled target to manipulate at least one user interface; and
   a work-space controller residing in said memory, wherein said work-space controller drives said controlled target to perform at least one design function.

86. The system of claim 85, wherein said work-space controller comprises at least one of a coordinate controller residing in said memory and a functional controller residing in said memory.

87. The system of claim 86, wherein said coordinate controller performs said design function, further comprising:
a list of coordinates residing in said memory, wherein said list of coordinates are used to drive said input of said controlled target.

88. The system of claim 86, wherein said functional controller performs said design function, further comprising:
at least one modelable function residing in said memory, wherein said modelable function is called with parameters to calculate coordinates;
wherein said coordinates are used to drive said input of said controlled target.

89. The system of claim 88, further comprising:
at least one software actuator residing in said memory, wherein said software actuator connects said software controller to said controlled target.

90. The system of claim 89, wherein said software actuator models at least one graphical user interface element of said controlled target.

91. The system of claim 90, wherein said software actuator comprises a work-flow actuator interfacing to said work-flow controller of said software controller, further comprising means for:
sending a high level command from said work-flow controller to said work-flow actuator, wherein said high level command comprises a tag and an input command;
calculating a valid region based on said tag by said work-flow actuator;
translating said command to at least one primitive action by said work-flow actuator;
if said command is for said pointing device, then
computing a target position by said work-flow actuator based on said valid region,
driving said input of said controlled target to said target position by said work-flow actuator, and
applying said primitive action to said target by said workflow actuator;
else,
applying said primitive action to said valid region by said work-flow actuator.

92. The system of claim 91, wherein said means for calculating said valid region based on said tag further comprises means for:
if running in said software modeling process, then
(a) powering said valid region by said software,
(b) identifying said valid region based on said tag on-line,
(c) calculating said valid region, and
(d) saving said valid region with said tag as a part of said model of said software;
otherwise, running in said software simulation process,
(e) simulating said valid region by said model of said software,
(f) retrieving said valid region based on said tag from said model of said software, and
(g) calculating said valid region.

93. The system of claim 92, wherein said means for identifying said valid region based on said tag in said software modeling process further comprises:
a unique textual name residing in said memory, wherein said unique textual name is said tag;
a unique relation residing in said memory, wherein said unique relation is coded in a string and assigned as said unique textual name;
means for finding a unique handle from said software based on said tag, wherein said handle is uniquely located by said unique relation that is coded in said tag;
means for identifying said valid region based on said unique handle that is powered by said software.

94. The system of claim 93, wherein said unique relation is a parent-children-sibling relation that is defined uniquely by said graphical user interface element of said software.

95. The system of claim 92, wherein said software actuator installs at least one software sensor.

96. The system of claim 92, further comprising:
a running context of said controlled target residing in said memory, wherein said running context is dynamically reconstructed by said software actuator in said software simulation process;
a structured input and output residing in said memory, wherein said structured input and output structuralizes said input and output of said controlled target based on said running context;
a feedback residing in said memory from said controlled target to said software controller through said structured output of said controlled target;
means for inferring a causal relationship from said running context.

97. The system of claim 90, wherein said software actuator comprises a work-space actuator interfacing to said work-space controller of said software controller, further comprising means for:
(a) sending a high level command from said work-space controller to said work-space actuator;
(b) calculating a coordinate by said work-space actuator;
(c) translating said high level command to at least one primitive action by said work-space actuator;
(d) driving said input of said controlled target to said coordinate by said work-space actuator;
(e) applying said primitive action to said coordinate by said workspace actuator;
(f) repeating steps (b)-(f) if at least one coordinate remains.

98. The system of claim 97, wherein said coordinates are calculated by said work-space actuator, further comprising:
a list of coordinates residing in said memory, wherein said list of coordinates is an array of elements with each element having a coordinate (x,y);
wherein said coordinate is retrieved sequentially from said array until the end of said array is reached.

99. The system of claim 97, wherein said coordinates are calculated by said work-space actuator, further comprising:
at least one modelable function residing in said memory, wherein said modelable function calculates said coordinate based on at least one parameter that is supplied by said software controller;
wherein said modelable function implemented by said workspace actuator is a mathematical function that is scalable.

100. The system of claim 90, wherein said software actuator is a system actuator if a system standard graphical user interface element is modeled by said software actuator.

101. The system of claim 100, wherein said system actuator is reusable universally for a plurality of said software modeling processes and said software simulation processes.

102. The system of claim 90, wherein said software actuator is a custom actuator if a custom-built graphical user interface element is modeled by said software actuator.

103. The system of claim 102, wherein said custom actuator is reusable for a plurality of said software controllers for said software modeling process and said software simulation process.

104. The system of claim 89, further comprising means for:
- modularizing said software modeling process and said software simulation process;
- replacing said software with said model of said software that is identified in said software modeling process;
- switching from said software modeling process to said software simulation process;
- preserving said connection between said software controller and said software actuator so that said software controller is kept invariant in said modeling process and said simulation process.

105. The system of claim 89 wherein said modeled algorithm engine is controlled by said software controller in said software simulation process further comprises:
- a Dynamic Update residing in said memory, wherein said Dynamic Update simulates said output of said algorithm engine;
- means for reconstructing an output of said modeled algorithm engine, wherein said output of said modeled algorithm engine is updated by said Dynamic Update in sync with said software controller;
- at least one simulated sampler residing in said memory, wherein said simulated sampler simulates said sampler used in said software modeling process;
- means for controlling said Dynamic Update to update one output of said modeled algorithm engine by said simulated sampler if said sampler samples one discrete update of said algorithm engine in said software modeling process.

106. The system of claim 105 wherein said simulated sampler is controlled by said software controller through said software actuator.

107. The system of claim 106 wherein said simulated sampler is a simulated direct input and output sampler that symmetrically simulates said direct input and output sampler used in said software modeling process.

108. The system of claim 107 wherein said software actuator drives said simulated direct input and output sampler, further comprising means for:
- modeling a sampling that is induced directly by said command from said software controller;
- simulating said sampling by calling said simulated direct input and output sampler.

109. The system of claim 107 wherein said software actuator simulates said internal computation flow of said algorithm engine, further comprising means for:
- modeling an sampling event, wherein said sampling event samples after or before said internal computation unit is processed;
- simulating said sampling event by calling said simulated internal computation sampler.

110. The system of claim 106 wherein said simulated sampler is a simulated internal computation sampler that symmetrically simulates said internal computation sampler used in said software modeling process.

111. The system of claim 106 further comprising:
- a simulated discrete sampling domain residing in said memory, wherein said simulated discrete sampling domain is created from the execution flow of said software controller in said software simulation process;
- wherein said simulated discrete sampling domain is identical causally to said discrete sampling domain.

112. The system of claim 111 further comprising:
- a compressing transformation residing in said memory on said simulated discrete sampling domain, wherein said compressing transformation reduces a time duration between two samplings in said software simulation process while causality is preserved;
- a stretching transformation residing in said memory on said simulated discrete sampling domain, wherein said stretching transformation extends a time duration between two samplings in said software simulation process while causality is preserved.

113. The system of claim 105 wherein said Dynamic Update downloads and streams from an external source to update said output of said modeled algorithm engine.

114. The system of claim 113 wherein said external source is at least one local file.

115. The system of claim 113 wherein said external source is at least one Internet server.

116. The system of claim 73, wherein said software modeling process is a software modeling automation that runs autonomously.

117. The system of claim 116 wherein said software simulation process is a software simulation automation that runs autonomously, further comprising:
- an output of said software simulation automation residing in said memory, wherein said output of said software simulation automation is said output of said model of said software that is manipulable.

118. The system of claim 117 wherein said software simulation automation is augmented with additional computation while said software dynamic system is preserved.

119. The system of claim 118 wherein said software simulation automation is augmented, further comprising:
- an interaction input component H residing in said memory, wherein said interaction input component H engages a user to interact with said software simulation automation;
- an index component G residing in said memory, wherein said index component G controls visibility of said output of said software simulation automation;
- a programmable extension component E residing in said memory, wherein said programmable extension component E extends programmatically said software simulation automation with additional computational process.

120. The system of claim 119 wherein said interaction input component H is inserted between said output of said software controller and said input of said model of said software, further comprising means for:
- (a) updating said software simulation automation at a current sampling k;
- (b) executing a programmed interaction by said software controller;
- (c) updating a running context, wherein said running context includes a valid region, a pointing device status, a keyboard status, and a current command which are generated from said programmed interaction by said software controller;
- (d) transferring execution of said software simulation automation to said H;
- (e) waiting for an interaction input from said user;
- (f) receiving said interaction input from said user;
- (g) comparing said interaction input with said running context;
- (h) if said interaction input is matched with said running context, then continuing said execution of said software simulation automation;
- (i) otherwise, repeating steps (e)-(i).

121. The system of claim 120 wherein said software simulation automation further comprises:
- a controlled target residing in said memory, wherein said controlled target is a Microsoft Internet Explorer Browser component;
- means for lively running said Internet Explorer Browser component in said software simulation automation;
- means for programming web browsing activities by said software controller;
- means for engaging said user with said web browsing activities interactively or automatically.

122. The system of claim 119 wherein said interaction input component H is independent of said software simulation automation and said H is applicable universally to any software simulation automation.

123. The system of claim 119 wherein said interaction input component H can be plugged or unplugged into said software simulation automation programmatically so that said software simulation automation can run interactively or automatically.

124. The system of claim 119 wherein said index component G indexes said software simulation automation selectively, further comprising:
- (a) at least one index set $K_I$ residing in said memory, wherein said $K_I$ is a subset of said discrete sampling domain K;
- (b) means for updating said output of said software simulation automation in said memory that is invisible;
- (c) a gated output-mapping function residing in said memory, wherein said gated output-mapping function controls copying from said memory to said display based on said index set $K_I$;
- (d) means for running said software simulation automation;
- (e) means for updating a current output of said software simulation automation at a current sampling k in said memory;
- (f) if said current sampling k∈$K_I$, then,
  - means for copying said current output from said memory to said display by said gated output-mapping function,
  - means for continuing said simulation;
- (g) otherwise,
  - means for advancing said current sampling k by one,
  - means for repeating steps (e)-(q) as fast as computationally possible.

125. The system of claim 124 further comprising:
- first textual term residing in said memory, wherein said first textual term is associated with a sampling $k_1$;
- second textual term residing in said memory, wherein said second textual term is associated with a sampling $k_2$;
- at least one pair of descriptive textual terms residing in said memory for searching, wherein one in said descriptive textual terms is said first textual term, and said other in said descriptive textual terms is said second textual term;
- means for conducting searches based on said descriptive textual terms to find two samplings $k_1$ and $k_2$;
- means for running said software simulation automation;
- means for updating said current output of said software simulation automation in said memory;
- if said current sampling k>=$k_1$ and k<$k_2$, then means for copying said output of said software simulation automation from said memory to said display by said gated output-mapping function;
- means for selectively running at least one segment of simulation from $k_1$ to $k_2$−1 visually while computationally running said software simulation automation internally.

126. The system of claim 119 wherein said programmable extension component E extends additional computation into said output of said software simulation automation, further comprising:
- a new programmable function, wherein said new programmable function implements a sub-process;
- means for updating a current output of said software simulation automation at said current sampling k;
- means for extending said new sub-process with said current output as an initial state and a next output of said software simulation automation as a final state;
- means for computing at least one sub-state with said new programmable function, wherein said sub-state in said subprocess updates over said output of said software simulation automation;
- means for updating said next output of said software simulation automation at said current sampling k+1.

127. The system of claim 126 wherein said new programmable function is a Microsoft Internet Explorer Browser component, further comprising:
- a DHTML page residing in said memory, wherein said DHTML page is loaded by said Microsoft Internet Explorer Browser component;
- a Document Object Model (DOM) residing in said memory, wherein said Document Object Model is programmed in said DHTML page;
- a URL link residing in said memory, wherein said URL link is encoded in said DHTML page;
- a target region residing in said memory, wherein said target region is defined by said Document Object Model;
- means for clicking or typing in said target region;
- means for navigating to said URL link.

128. The system of claim 119 further comprising:
- a software amplification device residing in said memory, wherein said software amplification device comprises
  - said software controller,
  - said interaction input component H,
  - said index component G, and
  - said programmable extension component E;
- wherein said software amplification device connects with said model of said software in a top loop;
- an augmented output of said model of said software residing in said memory, wherein said augmented output of said model of said software is fed through said software amplification device;
- a user, wherein said user senses said augmented output as an input from said software amplification device;
- wherein said user is engaged with said software amplification device in a bottom loop;
- an output residing in said memory to said software amplification device, wherein said output to said software amplification device is an interactive movement by said user; and
- means for interacting said model of said software by said user through said software amplification device.

129. The system of claim 128 further comprising means for:
- (a) running a sub-process in said programmable extension component E to prepare said user to take a right interaction, wherein said sub-process implements at least one programmable function;
- (b) executing a programmed interaction, wherein said programmed interaction is performed by said software controller;
- (c) updating a running context, wherein said running context includes a valid region, a pointing device status, a keyboard status, and a current command which are generated from said programmed interaction by said software controller;

(d) waiting in said interaction input component H until said user taking a right interaction input against said running context;

(e) scoring said interaction input by said H;

(f) if said score is higher than a level assigned to a next output of said software simulation automation, then under control of said index component G, updating said next output of said software simulation automation invisibly, forgoing a next sub-process, canceling a next programmed interaction;

(g) otherwise, visually updating said next output of said software simulation automation;

(h) repeating steps (a)-(h) until reaching a final of said software simulation automation.

130. The system of claim 128 wherein said interaction input component H, said index component G, and said programmable extension component E are implemented in modular ways so that each component can be bypassed programmatically.

131. The system of claim 119 further comprising:

a software intelligence device residing in said memory, wherein said software intelligence device comprises said model of said software, said interaction input component H, said index component G, and said programmable extension component E;

wherein said software intelligence device connects with said software controller;

wherein said model of said software further comprises a setup part residing in said memory, a modeled algorithm engine part residing in said memory, and an output part residing in said memory;

wherein said setup part is simulated invisibly under control of said index component G;

wherein said modeled algorithm engine part is extended with an input reasoning by said programmable extension component E;

wherein said output part is extended with an output reasoning by said programmable extension component E;

means for interactively simulating modeled algorithm engine through said interaction input component H by a human user.

132. The system of claim 119 further comprising:

a software-2, wherein said software-2 comprises an automation loop and an interaction loop;

wherein said automation loop simulates and augments a modeled software dynamic system that runs autonomously;

wherein said interaction loop engages a human user interactively into said automation loop;

wherein said interaction loop couples with said automation loop programmatically.

133. The system of claim 132 further comprising:

at least one web server;

a plurality of same software-2 residing in said memory, wherein said plurality of same software-2 are connected to said web server through the Internet;

wherein each of said plurality of same software-2 is run interactively by a user locally;

a Master machine, wherein said Master machine is selected from said plurality of software-2;

a Master, wherein said Master runs said Master Machine;

a group of Learner machines, wherein said group of Learner machines are the rest of said plurality of software-2;

a group of Learner, wherein each Learner inside said group of Learners runs each Learner machine inside said group of Learner machines;

a HTTP request/response protocol, wherein said HTTP request/response protocol is used to control the execution of said group of Learner machines by said Master machine;

means for synchronizing said state of said Learner machines with said state of said Master machine interactively by said Master through said web server;

means for communicating among said plurality of software-2 machines interactively through the Internet in real-time.

134. The system of claim 133 further comprising means for, communicating between said Master machine and said web server, further comprising means for:

(a) transiting by said Master machine to a state, wherein said state expects an interaction input from said Master, (b) said Master machine posting a request including a current sampling $k_m$ to said web server, (c) said Master machine waiting for a response from said web server;

(d) said web server recording said request information including said k, m (e) said web server sending said response to said Master, and (f) releasing said Master machine to continue said simulation, (g) said Master machine pausing said simulation for a local interaction input from said Master in said local interaction input component H, (h) said Master machine exchanging message with said group of Learner instantly through the Internet in real-time while said local interaction input component H waits for said interaction input, (i) said Master making said interaction input to said simulation, and (j) said Master machine continuing said simulation; and communicating between anyone of said Learner machines and said web server, further comprising means for:

(k) said Learner machine transiting to a state, wherein said state expects an interaction input from said Learner, (l) said Learner machine posting a request including a current sampling k to said web server, (m) said Learner machine waiting for a response from said web server, (n) said web server comparing between said k and said $k_m$ of said Master machine recorded most recently, if $k<k_m$ then, said web server sending said response to said Learner machine immediately, said Learner machine continuing said simulation, and if $k>=k_m$, then, said web server suspending said response to said Learner machine, and said Learner machine blocking said simulation, if $k==k_m$, then, said Learner machine exchanging messages interactively and instantly through the Internet, until said Master machine posting its current sampling $k>k_m$ to said web server, then, said web server sending said response to said Learner machine, and said Learner machine releasing blocking to continue said simulation;

creating a Master-Machine-Learner interaction loop, wherein said Master-Machine-Learner interactive loop is a dynamic mechanism that couples said Master with said Learners virtually through said software-2 machines over the Internet.

135. The system of claim 134 wherein said exchanging messages instantly through the Internet further comprises:

a machine, wherein said machine has said current sampling $k=k_m$;

means for said machine sending a message to said web server, wherein said message is selected from the group consisting of a text, an animation, a script command, a URL, and combination thereof; and means for said web server sending said message to all other machines that have said current sampling $k=k_m$ instantly.

136. The system of claim 133 wherein said communicating among said plurality of software-2 machines interactively through the Internet in real-time, further comprises:

at least one service over the Internet to said group of Learner machines by at least one service provider, wherein said service is a multimedia service delivered in real-time;

means for controlling said service by said Master machine;

means for synchronizing said service with said Master machine and said Master.

137. The system of claim 133 further comprising:

a Master machine, wherein said Master machine is run interactively by a Master;

a simulation service over the Internet through real-time communication, wherein said simulation service is published by said Master machine;

at least one Learner machine, wherein said Learner machine is run interactively by a Learner;

wherein said Learner machine subscribes to said simulation service over the Internet through real-time communication;

a Master-Machine-Learner loop over the Internet, wherein said Master-Machine-Learner loop is a Human-Machine-Human interaction running the same software-2 machines in sync through real-time communication.

138. The system of claim 137 further comprising:

a book residing in said memory, wherein said book is authored by programming said software controller to drive said software;

projecting at least one of,
(a) a course trajectory residing in said memory running over said software, wherein said course trajectory simulates simulation of the underlying domain knowledge, and
(b) a Lab trajectory residing in said memory running over said software, wherein said Lab trajectory simulates operation of said software;

wherein said simulation of the underlying domain knowledge is programmed in said software;

wherein said operation of said software is programmed in said software;

means for identifying said model of said software in said software modeling process;

means for structuring said model of said software using chapters and keyword indices based on said index component G;

means for extending a new subject understanding into said model of said software based on said programmable extension component E;

means for simulating a course content interactively over the Internet in said Master-Machine-Learner loop or locally, wherein said course content is programmed in said course trajectory;

means for simulating a Lab track interactively over the Internet in said Master-Machine-Learner loop or locally, wherein said Lab track is programmed in said lab trajectory;

means for organizing teaching-learning activities in a web of software-2 simulation activities.

139. A method for modeling and simulating software running interactively directly or indirectly on at least one digital computer, comprising the steps of:

providing a first software, wherein said first software is a binary software that is runnable in the form of executable files (EXE) or Dynamic Link Libraries (DLL);

providing a second software, wherein said second software is preprogrammed to synthesize at least one of a plurality input actions, wherein said plurality of input actions comprise,
at least one pointing device action,
at least one keyboard action, or
at least one external input action;

executing said first software under control of said second software in a closed-loop fashion automatically and programmatically by applying said synthesized at least one input action to said first software by said second software;

identifying a model of said first software under control of said second software, wherein said model of said first software includes models of input and output behavior of said first software; wherein said model of input behavior of said first software includes at least one control enabling structure; wherein said at least one control enabling structure is identified and recorded while powered by said first software; wherein said model of output behavior of said first software models at least one display screen region;

controlling said model of said first software by said second software automatically and programmatically through said synthesized at least one input action to simulate said input and output behavior of said first software under control of said second software;

creating a third software, wherein said third software comprises said model of said first software and said second software.

140. A system for modeling and simulating software running interactively directly or indirectly on at least one digital computer, comprising:

at least one processor;

a computer readable media;

a memory, wherein said memory is a part of said computer readable media coupled to said at least one processor;

a first software residing in said memory, wherein said first software is a binary software that is runnable in the form of executable files (EXE) or Dynamic Link Libraries (DLL);

a second software residing in said memory, wherein said second software is preprogrammed to synthesize at least one of a plurality input actions, wherein said plurality of input actions comprise:
at least one pointing device action,
at least one keyboard action,
at least one external input action;

wherein said at least one processor is configured to,
  execute said first software under control of said second software in a closed-loop fashion automatically and programmatically by applying said synthesized at least one input action to said first software by said second software,
identify a model of said first software under control of said second software, wherein said model of said first software includes models of input and output behavior of said first software; wherein said model of input behavior of said first software models at least one control enabling structure; wherein said at least one control enabling structure is identified and recorded while powered by said first software; wherein said model of output behavior of said first software models at least one display screen region;
control said model of said first software by said second software automatically and programmatically through said synthesized at least one input action to simulate said input and output behavior of said first software under control of said second software;
create a third software, wherein said third software comprises said model of said first software and said second software.

* * * * *